United States Patent
Shirakawa et al.

(10) Patent No.: US 9,712,316 B2
(45) Date of Patent: Jul. 18, 2017

(54) RECEPTION APPARATUS, PHASE ERROR ESTIMATION METHOD, AND PHASE ERROR CORRECTION METHOD

(71) Applicant: Panasonic Corporation, Osaka (JP)

(72) Inventors: Yoshinori Shirakawa, Kanagawa (JP); Koichiro Tanaka, Hyogo (JP); Takenori Sakamoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/770,406

(22) PCT Filed: Feb. 20, 2014

(86) PCT No.: PCT/JP2014/000885
§ 371 (c)(1),
(2) Date: Aug. 25, 2015

(87) PCT Pub. No.: WO2014/132599
PCT Pub. Date: Sep. 4, 2014

(65) Prior Publication Data
US 2016/0006557 A1   Jan. 7, 2016

(30) Foreign Application Priority Data

Feb. 27, 2013 (JP) .................. 2013-037684
Mar. 1, 2013 (JP) .................. 2013-041054
Mar. 12, 2013 (JP) .................. 2013-049364

(51) Int. Cl.
*H04L 7/00* (2006.01)
*H04L 27/22* (2006.01)
(Continued)

(52) U.S. Cl.
CPC .......... *H04L 7/0041* (2013.01); *H04L 7/0054* (2013.01); *H04L 7/04* (2013.01);
(Continued)

(58) Field of Classification Search
CPC . H04L 27/22; H04L 27/2657; H04L 27/2672; H04L 27/2675; H04L 7/0041; H04L 7/0054; H04L 7/04
See application file for complete search history.

(56) References Cited

U.S. PATENT DOCUMENTS

| 5,734,972 A | 3/1998 | Hayashino et al. |
| 6,104,767 A * | 8/2000 | Atarius .............. H03J 7/02 |
| | | 375/344 |

(Continued)

FOREIGN PATENT DOCUMENTS

| JP | H06-30070 A | 2/1994 |
| JP | 7-297870 A | 11/1995 |

(Continued)

OTHER PUBLICATIONS

International Search Report dated Mar. 25, 2014, for corresponding International Application No. PCT/JP2014/000885, 4 pages.

*Primary Examiner* — Freshten N Aghdam
(74) *Attorney, Agent, or Firm* — Seed Intellectual Property Law Group LLP

(57) ABSTRACT

In a phase error corrector, a signal extractor extracts received reference signals from received signals, and an error vector calculator calculates the error vectors of phase errors by comparing the extracted received reference signals with a known reference signal that is to be transmitted. A representative vector calculator divides, according to frequency, the error vectors into two or more groups and calculates representative vectors for the respective groups. A correction value calculator calculates, on the basis of the representative vectors, phase correction values for the respective frequencies. A phase corrector uses the calculated phase correction values to correct the phase errors for the respective frequencies.

23 Claims, 70 Drawing Sheets

(51) Int. Cl.
*H04L 27/26* (2006.01)
*H04L 7/04* (2006.01)

(52) U.S. Cl.
CPC .......... *H04L 27/22* (2013.01); *H04L 27/2657* (2013.01); *H04L 27/2672* (2013.01); *H04L 27/2675* (2013.01)

(56) References Cited

U.S. PATENT DOCUMENTS

| | | | |
|---|---|---|---|
| 7,020,459 | B2 | 3/2006 | Nagayasu |
| 7,397,869 | B2* | 7/2008 | Ginesi ................. H04L 27/0014 348/385.1 |
| 7,545,870 | B1 | 6/2009 | Shirakata et al. |
| 8,379,763 | B2* | 2/2013 | Sawai ................. H04L 25/0204 375/260 |
| 8,619,744 | B2 | 12/2013 | Yoshida et al. |
| 8,654,893 | B2 | 2/2014 | Dateki |
| 8,660,197 | B2 | 2/2014 | Lindgren et al. |
| 8,761,319 | B2 | 6/2014 | Shirakata et al. |
| 2002/0176520 | A1* | 11/2002 | Heegard ............. H04L 27/2272 375/327 |
| 2003/0012310 | A1 | 1/2003 | Nagayasu |
| 2003/0128660 | A1 | 7/2003 | Ito et al. |
| 2004/0008618 | A1* | 1/2004 | Shirakata ............ H04L 27/2679 370/208 |
| 2006/0013336 | A1* | 1/2006 | Yang ................... H04L 27/2275 375/316 |
| 2006/0233225 | A1 | 10/2006 | Omoto |
| 2008/0267320 | A1 | 10/2008 | Dateki |
| 2009/0141836 | A1 | 6/2009 | Shirakata et al. |
| 2009/0274199 | A1 | 11/2009 | Onodera et al. |
| 2010/0208718 | A1 | 8/2010 | Yoshida et al. |
| 2012/0014467 | A1 | 1/2012 | Lindgren et al. |
| 2013/0136216 | A1 | 5/2013 | Shirakata et al. |

FOREIGN PATENT DOCUMENTS

| | | |
|---|---|---|
| JP | H08-330910 A | 12/1996 |
| JP | 2811002 B2 | 10/1998 |
| JP | 2000-068971 A | 3/2000 |
| JP | 2002-314506 A | 10/2002 |
| JP | 2003-273829 A | 9/2003 |
| JP | 2004-104744 A | 4/2004 |
| JP | 3811002 B2 | 8/2006 |
| JP | 2006-522553 A | 9/2006 |
| JP | 2007-228332 A | 9/2007 |
| JP | 2011-022770 A | 2/2011 |
| JP | 2011-109522 A | 6/2011 |
| JP | 2012-519986 A | 8/2012 |
| JP | 2012-209886 A | 10/2012 |
| JP | 2013-214819 A | 10/2013 |
| WO | 2005/101711 A1 | 10/2005 |
| WO | 2006/075547 A1 | 7/2006 |
| WO | 2007/077608 A1 | 7/2007 |
| WO | 2008/047776 A1 | 4/2008 |

* cited by examiner

FIG. 2

| STF (SHORT TRAINING FIELD) | CEF (CHANNEL ESTIMATION FIELD) | GI | HEADER | GI | HEADER | GI | DATA1 | GI | DATA2 | ... |

FIG. 64

| TIME | 1 | 2 | 3 | 4 | 5 |
|---|---|---|---|---|---|
| π/2 SHIFT | 0 | +π/2 | +π | +3π/2 | 0 |
| -π/2 SHIFT | 0 | -π/2 | -π | -3π/2 | 0 |
| REVERSE ROTATION RESULT | 0 | 0 | 0 | 0 | 0 |

FIG. 65

| TIME | 1 | 2 | 3 | 4 | 5 |
|---|---|---|---|---|---|
| π/2 SHIFT | 0 | +π/2 | +π | +3π/2 | 0 |
| -π/2 SHIFT | -π/2 | -π | -3π/2 | 0 | -π/2 |
| REVERSE ROTATION RESULT | -π/2 | -π/2 | -π/2 | -π/2 | -π/2 |

FIG. 66

| TIME | 1 | 2 | 3 | 4 | 5 |
|---|---|---|---|---|---|
| π/2 SHIFT | 0 | +π/2 | +π | +3π/2 | 0 |
| -π/2 SHIFT | -3π/2 | 0 | -π/2 | -π | -3π/2 |
| REVERSE ROTATION RESULT | +π/2 | +π/2 | +π/2 | +π/2 | +π/2 |

RECEPTION APPARATUS, PHASE ERROR ESTIMATION METHOD, AND PHASE ERROR CORRECTION METHOD

TECHNICAL FIELD

The present disclosure relates to a reception apparatus, a phase error estimation method, and a phase error correction method in wireless communication.

BACKGROUND ART

In wireless communication systems, a carrier frequency error and a symbol synchronization shift caused between a transmitter and a receiver are corrected. For example, in a wireless communication apparatus compliant with an OFDM (Orthogonal Frequency Division Multiplexing) wireless communication method, as a carrier frequency error correction method, normally, a method is adopted where rough frequency correction and rough symbol synchronization shift correction are performed and then, a phase error caused by a residual carrier frequency offset and a residual symbol synchronization shift is estimated and corrected.

Examples of conventional phase error estimation methods include a method shown in Patent Document 1. Moreover, examples of conventional phase error correction methods include methods shown in Patent Documents 2 and 3.

PRIOR ART DOCUMENTS

Patent Documents

Patent Document 1: JP-A-2004-104744
Patent Document 2: JP-T-2012-519986
Patent Document 3: WO2008/047776

SUMMARY OF THE INVENTION

Problem to be Solved by the Invention

An object of the present disclosure is to provide a reception apparatus and a phase error estimation method capable of obtaining a highly precise phase correction value even when the phase error or the noise level is high.

Another object of the present disclosure is to provide a reception apparatus and a phase error estimation method capable of appropriately correcting the carrier frequency offset and making it possible to correctly demodulate the received data.

Means for Solving the Problem

The present disclosure provides a reception apparatus having: a phase error estimator that extracts a specific reference signal from a received signal which is a received transmitted signal having the specific reference signal and obtains a received reference signal in a frequency domain in a receiver, compares, for each frequency, the received reference signal in the frequency domain and a transmitted reference signal which is the specific reference signal in the transmitted signal expressed in the frequency domain and obtains a plurality of error vectors, and obtains, from the error vectors, a phase error inclination and a phase error offset in the frequency domain possessed by the received reference signal and estimates a phase error according to the frequency by the phase error inclination and the phase error offset; and a phase error corrector that corrects the phase error for the received signal by using a phase error estimation value obtained by the phase error estimator.

The present disclosure provides a phase error estimation method of a reception apparatus, having: extracting a specific reference signal from a received signal which is a received transmitted signal having the specific reference signal and obtaining a received reference signal in a frequency domain in a receiver; comparing, for each frequency, the received reference signal in the frequency domain and a transmitted reference signal which is the specific reference signal in the transmitted signal expressed in the frequency domain and obtaining a plurality of error vectors; dividing the error vectors into not less than two groups, obtaining a representative value of each group and obtaining a plurality of representative vectors; and obtaining the phase error inclination and the phase error offset in the frequency domain possessed by the received reference signal based on the representative vectors and estimating a phase error according to the frequency by the phase error inclination and the phase error offset.

The present disclosure provides a phase error correction method of a reception apparatus, having: extracting a specific reference signal from a received signal which is a received transmitted signal having the specific reference signal and obtaining a received reference signal in a frequency domain after rough carrier frequency offset correction and rough symbol synchronization shift correction in a receiver; comparing, for each frequency, the received reference signal in the frequency domain and a transmitted reference signal which is the specific reference signal in the transmitted signal expressed in the frequency domain and obtaining a plurality of error vectors; estimating a phase error by linear approximation in the frequency domain from the error vectors and obtaining the phase error inclination as a residual symbol synchronization shift and the phase error offset as a residual carrier frequency offset; performing correction of the residual symbol synchronization shift in the frequency domain; and performing correction of the residual carrier frequency offset on the received signal converted from the frequency domain into the time domain.

The present disclosure provides a phase error correction method of a reception apparatus, having: extracting a specific reference signal from a received signal which is a received transmitted signal having the specific reference signal and obtaining a received reference signal in a frequency domain after rough carrier frequency offset correction and rough symbol synchronization shift correction in a receiver; comparing, for each frequency, the received reference signal in the frequency domain and a transmitted reference signal which is the specific reference signal in the transmitted signal expressed in the frequency domain and obtaining a plurality of error vectors; estimating a phase error by linear approximation in the frequency domain from the error vectors and obtaining the phase error inclination as a residual symbol synchronization shift and the phase error offset as a residual carrier frequency offset; and performing correction of the residual symbol synchronization shift and correction of the residual carrier frequency offset on the received signal converted from the frequency domain into the time domain.

Advantage of the Invention

According to the present disclosure, a highly precise phase correction value can be obtained even when the phase error or the noise level is high.

According to the present disclosure, the carrier frequency offset can be appropriately corrected and it can be made possible to correctly demodulate the received data.

BRIEF DESCRIPTION OF THE DRAWINGS

FIG. 2 A view showing a signal format of the WiGig.

FIG. 64 A schematic view showing an example of the relationship between the amount of phase rotation by the π/2 shift and the amount of phase reverse rotation by the −π/2 shift in a case where Fs_t=Fs_r in the twelfth embodiment.

FIG. 65 A schematic view showing an example of the relationship between the amount of phase rotation by the π/2 shift and the amount of phase reverse rotation by the −π/2 shift in a case where Fs_t<Fs_r in the twelfth embodiment.

FIG. 66 A schematic view showing an example of the relationship between the amount of phase rotation by the π/2 shift and the amount of phase reverse rotation by the −π/2 shift in a case where Fs_t>Fs_r in the twelfth embodiment.

MODE FOR CARRYING OUT THE INVENTION

Figure 1:
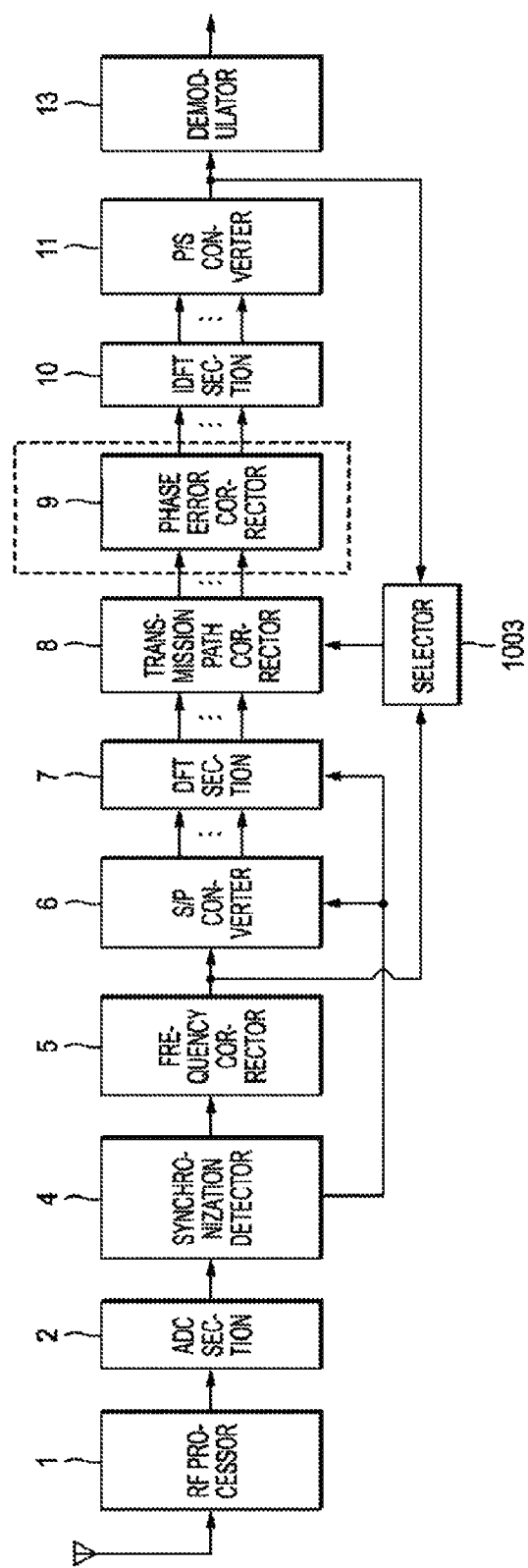
FIG. 1 A block diagram showing the structure of a receiver of a wireless communication apparatus compliant with the WiGig.

Circumstances Leading up to the Contents of an Embodiment of the Present Disclosure In the phase error estimation and correction, if the phase error becomes large when a residual carrier frequency offset and a residual symbol synchronization shift are corrected, there are cases where the phase exceeds a range of −π to π [rad]. In this case, a discontinuous phase change occurs as a phase error detected in the range of −π to π [rad]. For this reason, the linearity of the phase with respect to the frequency is spoiled, so that a phase correction value is not correctly obtained.

For example, in a conventional example of the phase error estimation method shown in the above-mentioned Patent Document 1, when no phase discontinuity is detected by the determiner, a correction value of the obtained phase error is calculated and phase correction is performed. On the other hand, when phase discontinuity is detected, phase correction is performed by using the correction value obtained in the immediately preceding correction. Moreover, a method called phase unwrapping processing is generally known where when it is determined that the absolute value of the difference between adjoining phases has exceeded π, the phases are made continuous by adding ±2π to one of the phases.

In the above-described conventional example, a problem arises in that a correct correction value is not obtained in a situation where the phase error or the noise level is high. When the phase error or the noise level is high and phase discontinuity occurs, for example, in the earliest period, a correct correction value is not obtained by a method of the conventional example using the immediately preceding correction value. Moreover, even if a correct correction value is obtained in the earliest period, since the correction value is not updated if phase discontinuity continuously occurs thereafter, the correction value becomes away from the one that has to be calculated. Moreover, when the phase unwrapping processing is used, there are cases where the determination as to whether the absolute value of the phase difference has exceeded π or not is erroneously made because of the noise contained in the received signal. In particular, in the wireless communication standard WiGig (trademark; the same applies hereafter) (Wireless Gigabit) using a millimeter waveband, since the requirement for the PER (Packet Error Rate) is strict, highly precise phase error estimation is necessary. Accordingly, a phase error estimation method for obtaining a highly precise phase correction value even when the phase error or the noise level is high is desired.

The present disclosure shows an example of a wireless communication apparatus including DFT (Discrete Fourier Transformation) and IDFT (Inverse Discrete Fourier Transformation) in a receiver such as OFDM (Orthogonal Frequency Division Multiplexing) like a wireless LAN standard IEEE 802.11a,g,n or SC-FDE (Single Carrier Frequency Domain Equalizer) like the WiGig.

Correction of a phase error caused between a transmitter and a receiver due to a residual carrier frequency offset and a residual symbol synchronization shift in a wireless communication apparatus of this kind will be described below.

FIG. 1 is a block diagram showing the structure of a receiver of a wireless communication apparatus compliant with the WiGig. The wireless communication apparatus shown in FIG. 1 has an RF (Radio Frequency) processor 1, an ADC (Analog-Digital Converter) 2, a synchronization detector 4, a frequency corrector 5, an S/P (serial-parallel)

converter 6, a DFT section 7, a transmission path corrector 8, a phase error corrector 9, an IDFT section 10, a P/S (parallel-serial) converter 11, a demodulator 13 and a selector 15.

The RF processor 1 converts a received signal of a radio frequency received by the antenna into a baseband signal which is a complex signal. The ADC section 2 periodically samples the baseband signal which is the complex signal, and converts it into a digital complex baseband signal.

The synchronization detector 4 detects a known preamble signal for synchronization (STF described later) from the complex baseband signal. The frequency corrector 5 calculates the error of the carrier frequency by using the known preamble signal (STF described later), and performs rough carrier frequency offset correction. The S/P converter 6 converts the complex baseband signal which is a serial signal into a parallel signal. The DFT section 7 converts the complex baseband signal in the time domain having undergone the rough carrier frequency offset correction, into a complex signal in the frequency domain after rough symbol synchronization according to the timing of the preamble signal detected by the synchronization detector 4.

The transmission path corrector 8 corrects the transmission path error between the transmitter and the receiver by using a known preamble signal (CEF described later). The selector 15 selects the output signal of the frequency corrector 5 or the P/S converter 11, and outputs it to the transmission path corrector 8. The phase error corrector 9 corrects, by using a known reference signal (GI described later), a residual phase error caused by a residual carrier frequency offset and a residual symbol synchronization shift.

The IDFT section 10 converts the phase-error-corrected signal in the frequency domain outputted from the phase error corrector 9, into a complex baseband signal in the time domain. The P/S converter 11 converts the parallel signal which is the output of the IDFT section 10, into a serial signal. The demodulator 13 demodulates a digitally modulated signal by using the complex baseband signal converted into the time domain by the IDFT section 10.

FIG. 2 is a view showing a signal format of the WiGig. The signal transmitted in a WiGig wireless communication system has, from the head, an STF (Short Training Field), a CEF (Channel Estimation Field), a GI (Guard Interval), a header (Header), . . . , and data portions (Data1, Data2, . . . ). Here, the STF and the CEF are provided as preamble signals.

The STF is the repetition of the known preamble signal used in the synchronization detector 4 and the frequency corrector 5 of FIG. 1. During the AGC period from the head of the STF, an AGC operation by an AGC section (not shown) is performed, and during the remaining rough CFO period, the calculation of the rough carrier frequency offset by the frequency corrector 5 is performed. The last one symbol of the STF is a synchronization detection period when rough symbol synchronization is performed by the detection of the preamble signal by the synchronization detector 4.

The CEF is the known preamble signal different from the above-described STF used in the transmission path corrector 8 of FIG. 1.

The header contains information representative of the attributes of the transmission data such as the modulation method and the number of transmitted symbols. The data portions contain the data to be transmitted itself. The GI is a known reference signal different from the above-mentioned STF and CEF and repetitively inserted at regular time intervals in the headers and the data portions. The GI is used for the phase error estimation (phase error correction value calculation) in the phase error corrector 9 of FIG. 1.

Next, the residual carrier frequency offset and the residual symbol synchronization shift corrected in the phase error corrector 9 will be described. The carrier frequency offset is a phase error caused because the carrier frequency used when the complex baseband signal is orthogonally modulated in the RF processor of the transmitter (not shown) and the carrier frequency used for the orthogonal modulation in the RF processor 1 of the receiver are subtly different.

The frequency corrector 5 estimates the error of the carrier frequency (rough carrier frequency offset) to perform correction, and since an error is caused in the estimation of the carrier frequency offset because of the influence of the signal noise and the phase noise of the carrier, the phase error remains and accumulates. This is the residual carrier frequency offset. For this reason, it is necessary to correct the residual carrier frequency offset while continuously updating the correction value of the phase error.

The residual symbol synchronization shift is a phase error caused because the sampling frequency of the DAC (Digital Analog Converter) section generating the complex baseband signal in the transmitter (not shown) and the sampling frequency of the ADC section 2 of the receiver are subtly different. Because of the sampling frequency error between the transmitter and the receiver, even if phase error correction is performed in the earliest period, the symbol synchronization shift remains and accumulates with the lapse of time, and the symbol timing error increases. For this reason, it is necessary to correct the residual symbol synchronization shift while continuously updating the phase error correction value.

In the DFT section 7, the timing of the DFT is controlled in accordance with the head of the CEF by the preamble signal detected in the synchronization detector 4. If the timing error of the symbol increases, the window synchronization in the DFT section 7 is shifted.

Figure 3:
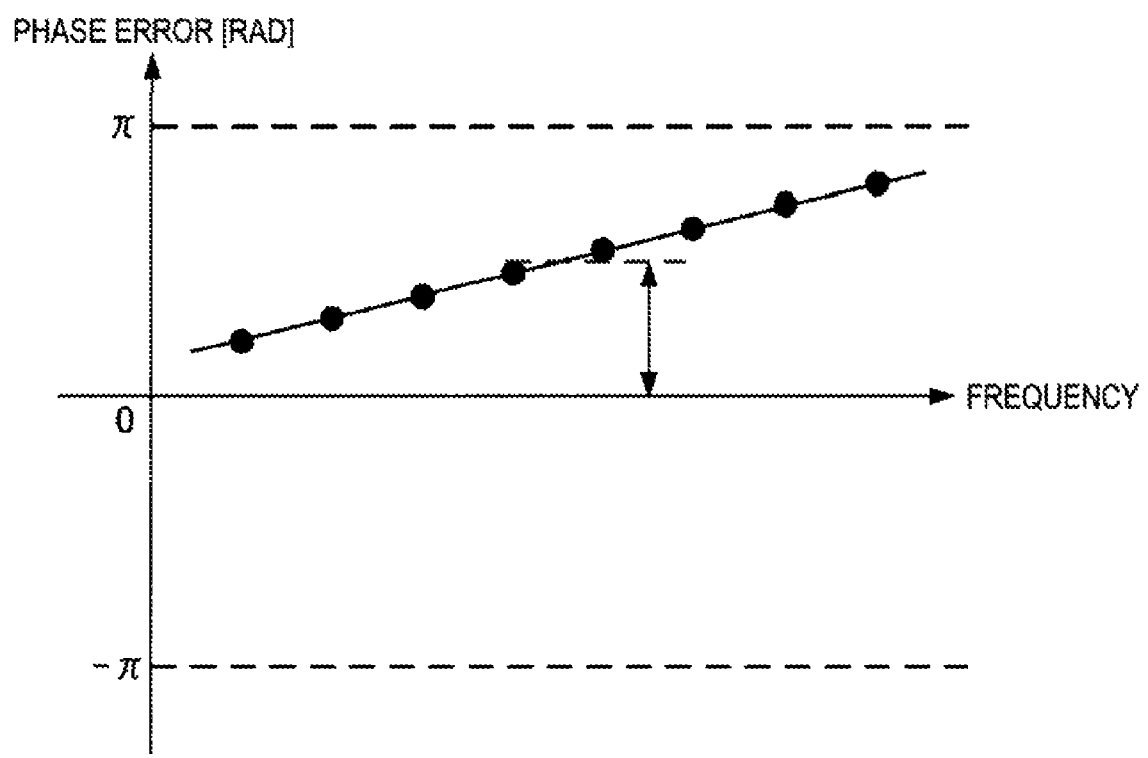
FIG. 3 A view showing a residual carrier frequency offset and a residual symbol synchronization shift in the frequency domain.

FIG. 3 is a view showing the residual carrier frequency offset and the residual symbol synchronization shift in the frequency domain. In FIG. 3, the horizontal axis shows the frequency, and the vertical axis shows the phase error in the range of $-\pi$ to $\pi$ [rad]. As shown in the figure, since the phase error has linearity, the offset of the phase error (the mean of the phase errors of the frequencies, that is, the offset quantity at the mean value of the frequencies) represents the residual carrier frequency offset, and the inclination of the phase error (the amount of phase error change with respect to the frequency) represents the residual symbol synchronization shift.

Here, the phase error is the phase difference between the reference signal GI extracted from the received signal and the known reference signal GI to be transmitted. When the phase error is y, the frequency is x, the inclination of the phase error is a and the offset of the phase error is b, the phase error can be expressed by a linear interpolation formula like the following expression [1]:

$$y = ax + b \quad [1]$$

The phase error is obtained by performing linear approximation on the measurement values of the phase errors at a plurality of frequencies. For the linear approximation, for example, the LSM (Least Squares Method) is used. The LSM processing can be realized by using a generally known method by approximation.

Figure 4:
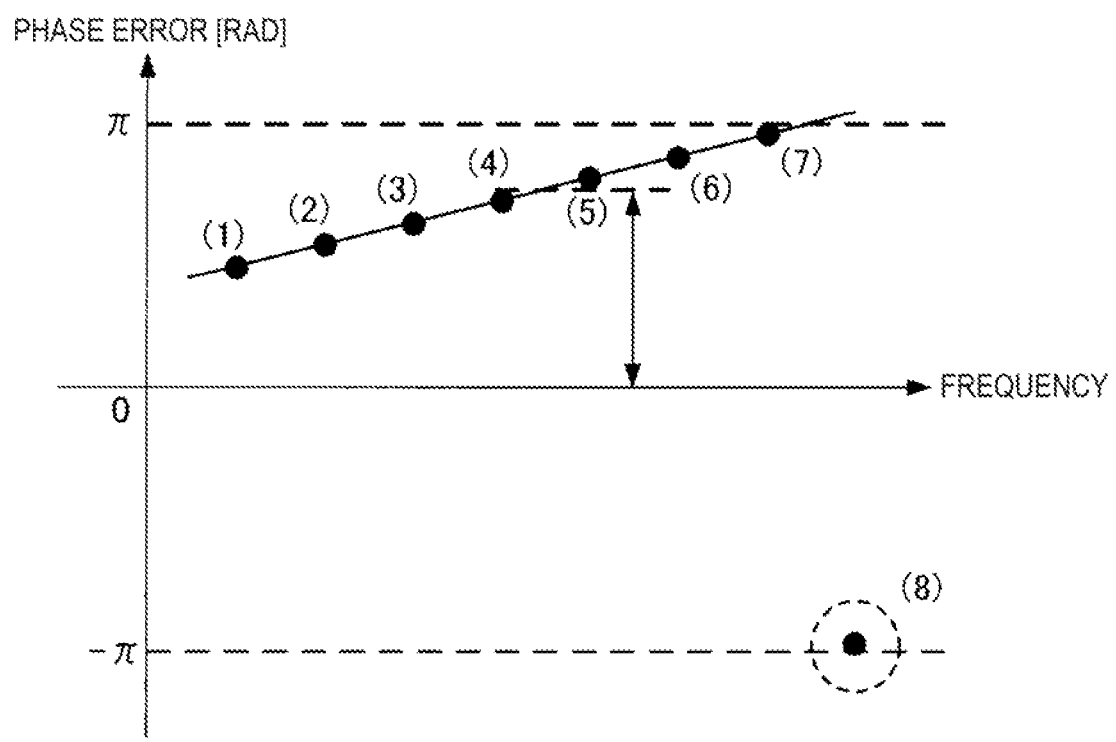
FIG. 4 A view showing an example of the occurrence of phase discontinuity in the frequency domain.

FIG. 4 is a view showing an example of the occurrence of phase discontinuity in the frequency domain. When the phase error increases, as shown in the example of FIG. 4, the phase (8) changes from π [rad] to −π [rad], and a discontinuous phase change occurs. In this case, the linearity of the phase with respect to the frequency is spoiled, so that the phase correction value cannot be obtained correctly.

Figure 5:
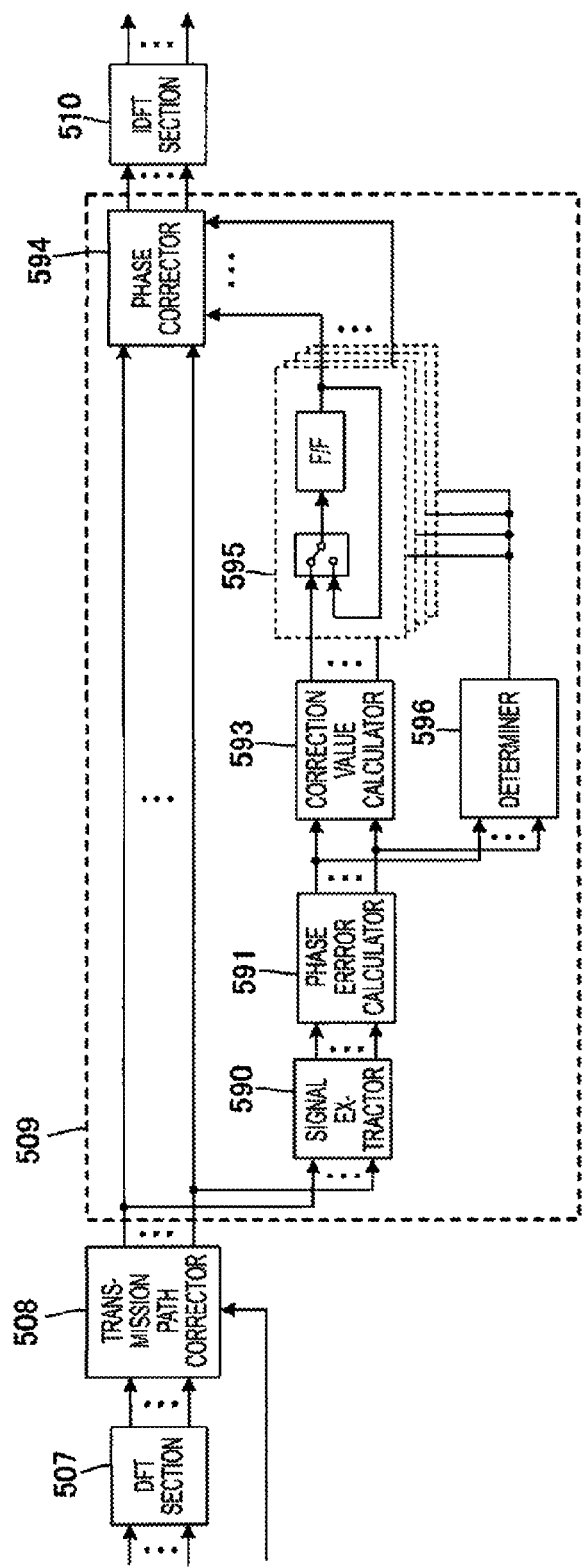
FIG. 5 A block diagram showing the structure of a receiver of a wireless communication apparatus using the conventional phase error estimation method.

Conventionally, as a measure to counter the discontinuous phase change, as shown in the above-described Patent Document 1, a method is adopted where when phase discontinuity is detected, phase correction is performed by using the correction value used in the immediately preceding correction. FIG. 5 is a block diagram showing the structure of a receiver of a wireless communication apparatus using the conventional phase error estimation method. In this conventional example, when no phase discontinuity is detected by a determiner 596, the phase error correction value calculated in a correction value calculator 593 is outputted from a correction value output section 595, and phase correction is performed in a phase corrector 594. On the other hand, when phase discontinuity is detected in the determiner 596, the correction value used in the immediately preceding correction is outputted from the correction value output section 595 and phase correction is performed.

Moreover, a method is available where when it is determined that the absolute value of the difference between adjoining phases has exceeded π by using the phase unwrapping processing, the phases are made continuous by adding ±2π to one of the phases. In the example of FIG. 4, unwrapping processing is performed where by a comparison between phases (7) and (8), the phase is returned by adding +2π to the phase (8).

In the conventional example, by the method using the immediately preceding correction value when phase discontinuity occurs, an erroneous correction value is used, for example, when phase discontinuity occurs in the earliest period. Moreover, even if a correct correction value is obtained in the earliest period, since the correction value is not updated if phase discontinuity continuously occurs thereafter, the correction value becomes away from the one that has to be calculated. Moreover, when the phase unwrapping processing is used, there are cases where the determination as to whether the absolute value of the phase difference has exceeded π or not is erroneously made because of the noise contained in the received signal.

These problems frequently arise when the phase error measurement value is disturbed in a low SNR (Signal-to-Noise Ratio) situation. For example, in the wireless LAN standard, PER=10% is a required specification, whereas in the WiGig, requirement for PER is as strict as PER=1% at a low SNR. In order that PER is not deteriorated, it is necessary to realize more highly precise phase error correction.

In view of the above-mentioned problems, the present disclosure provides a reception apparatus and a phase error estimation method and apparatus capable of easily and precisely determining phase discontinuity and obtaining a highly precise phase correction value when phase discontinuity occurs in a phase error even when the phase error or the noise level is high.

An Embodiment of the Present Disclosure

Hereinafter, an embodiment according to the present disclosure will be described in detail with reference to the drawings. A reception apparatus, a phase error estimation method and a phase error estimation apparatus according to the present disclosure are realized in a wireless communication apparatus of the embodiment. With respect to the drawings used in the following description, the same elements are denoted by the same reference numerals and signs and overlapping descriptions are omitted.

First Embodiment

Figure 6:
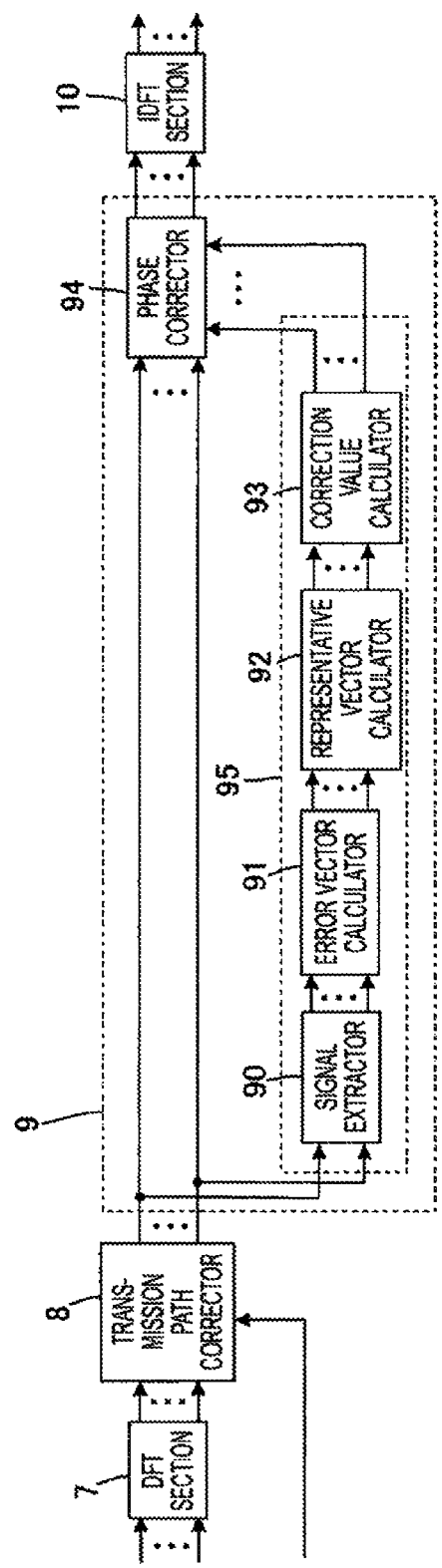
FIG. 6 A block diagram showing the structure of a phase error corrector in a first embodiment.

FIG. 6 is a block diagram showing the structure of a phase error corrector in a first embodiment of the present disclosure. Here, the structure and the operation in the receiver of the wireless communication apparatus compliant with the WiGig shown in FIG. 1 are illustrated.

In FIG. 1, the RF processor 1 amplifies a received signal of a radio frequency received by the antenna, and performs orthogonal modulation thereon to convert it into a baseband signal. The baseband signal having undergone the orthogonal modulation is a complex signal.

The ADC section 2 periodically samples the signal having undergone the orthogonal modulation in the RF processor 1, and converts it into a digital complex baseband signal.

The synchronization detector 4 detects the known preamble signal for synchronization (STF) from the complex baseband signal, and outputs a timing signal for synchronization. The preamble signal is used for window synchronization, that is, rough symbol synchronization of the DFT section 7.

The frequency corrector 5 calculates the rough carrier frequency offset as the carrier frequency error by using the known preamble signal (STF), and outputs a complex baseband signal obtained by correcting the rough carrier frequency offset.

The S/P converter 6 which is a buffer for operating the DFT section 7 converts the complex baseband signal which is a serial signal into a parallel signal. The DFT section 7 which corresponds to an example of a time-frequency converter performs time-frequency conversion according to the timing of the STF detected by the synchronization detector 4 with respect to the complex baseband signal in the time domain having undergone the rough carrier frequency offset correction, and outputs a complex signal in the frequency domain.

The transmission path corrector 8 calculates the amplitude and the phase which are transmission characteristics possessed by the transmission path between the transmitter and the receiver, by using the known preamble signal (CEF), and corrects the transmission path error.

The selector 15 selects the signal of the frequency corrector 5 or the P/S converter 11, and outputs it to the transmission path corrector 8. The selection of the signal used for the transmission path error correction is determined by the designer. By selecting the signal from the frequency corrector 5, the correction value can be calculated faster. By selecting the signal from the P/S converter 11, a correction value considering the occurrence error between the DFT section 7 and the IDFT section 10 caused in circuitization can be calculated.

The phase error corrector 9 calculates the residual carrier frequency offset and the residual symbol synchronization shift by using the periodically inserted known reference signal (GI) as a specific reference signal, and corrects the phase error due to the residual carrier frequency offset and the residual symbol synchronization shift in the frequency domain.

The IDFT section 10 which corresponds to an example of a frequency-time converter performs frequency-time conversion of the output signal of the phase error corrector 9, and converts it into a complex baseband signal in the time domain.

The P/S converter 11 converts the parallel signal which is the output of the IDFT section 10, into a serial signal.

The demodulator 13 demodulates a digitally modulated signal by using the complex baseband signal converted into the time domain and having undergone the residual phase error correction, and obtains the received data.

In the above-described structure, the synchronization detector 4, the frequency corrector 5, the S/P converter 6, the DFT section 7, the transmission path corrector 8, the phase error corrector 9, the IDFT section 10, the P/S converter 11 and the demodulator 13 can be implemented as an information processing circuit including a processor and a memory, and the functions can be realized by operating a software program in the processor to execute predetermined processing.

In FIG. 6, the phase error corrector 9 has a signal extractor 90, an error vector calculator 91, a representative vector calculator 92, a correction value calculator 93 and a phase corrector 94. Here, the signal extractor 90, the error vector calculator 91, the representative vector calculator 92 and the correction value calculator 93 correspond to a phase error estimator 95.

In the signal extractor 90, in the frequency domain, the periodically and repetitively received reference signal (GI) (corresponding to an example of the received reference signal) is extracted from the received signal. In the error vector calculator 91, the reference signal extracted from the received signal and the known reference signal (GI) to be transmitted (corresponding to an example of the transmitted reference signal) are compared, and a plurality of error vectors due to the difference therebetween are calculated.

In the representative vector calculator 92, the error vectors obtained in the error vector calculator 91 are divided into not less than two groups according to the frequency, and calculates the representative value of each group. Here, as an example of the representative value, the mean value of the error vectors of the groups is calculated and outputted. As the mean value calculation method, a simple vector mean may be used, or a predetermined weight may be assigned by the frequency to calculate the mean. While a different value such as the median value of each group may be used as the representative value, it is preferable to use the mean value in the situation assumed in the present embodiment where a phase error due to a random noise component is added under a low SNR environment.

In the correction value calculator 93, the phase correction value of each frequency is calculated according to the frequency based on a plurality of representative vectors (vector mean values) of the groups obtained in the representative vector calculator 92. In the phase corrector 94, the phase error of each frequency is corrected by using the phase correction value calculated in the correction value calculator 93.

Figure 7:
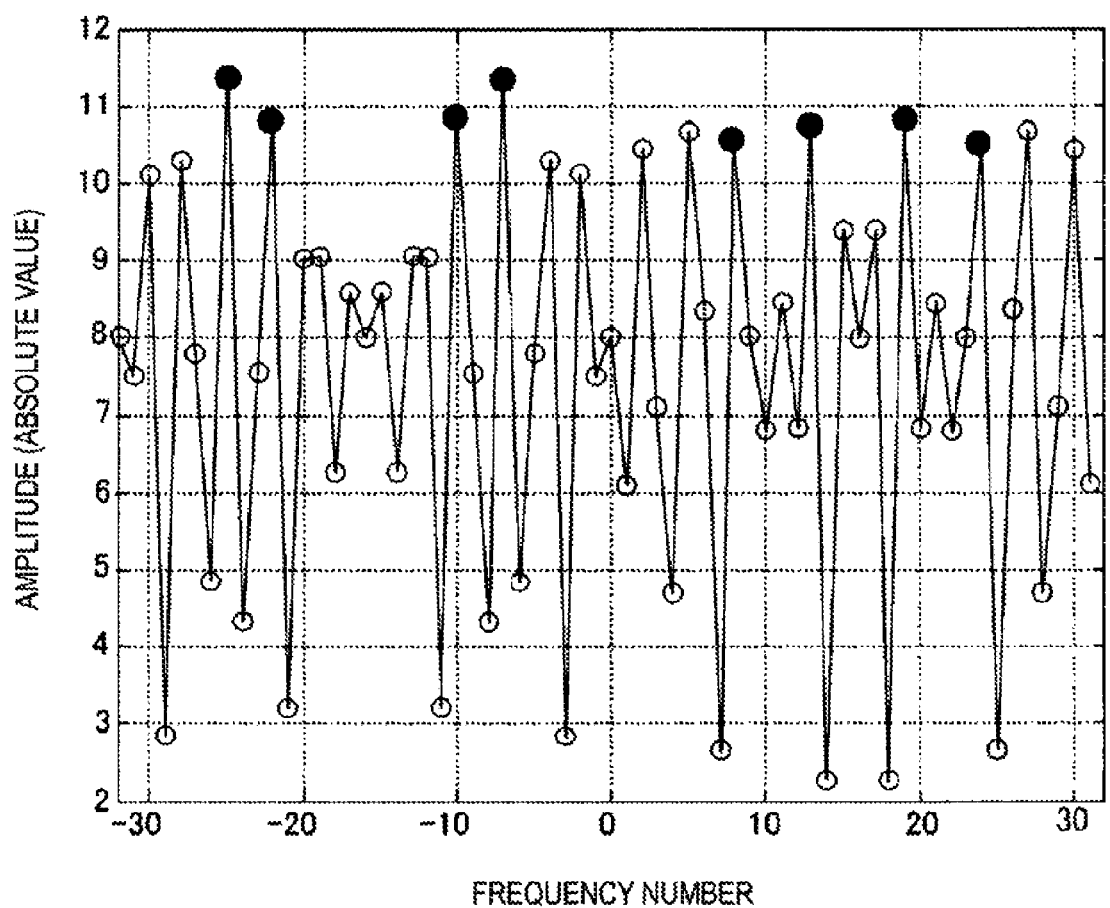
FIG. 7 A view showing the spectrum of a reference signal GI in the frequency domain and the frequency number used for the error vector calculation.

FIG. 7 is a view showing the spectrum of the reference signal GI in the frequency domain and the frequency number used for the error vector calculation. In FIG. 7, the horizontal axis shows the frequency number corresponding to each frequency, and the vertical axis shows the absolute value of the amplitude of the spectrum of the GI.

In the signal extractor 90, the reference signal GI is extracted from the received signal, and the spectrum shown in FIG. 7 where the reference signal GI of 64 symbols is Fourier-transformed is obtained. Here, the frequency number is the number representative of each frequency where 27.5 MHz which is the quotient when 1.76 GHz (−880 MHz to +880 MHz) which is the symbol rate of the WiGig standard is divided by 64 symbols is one unit.

Of the spectrum in the frequency domain, particularly, one with a high absolute value is high in noise tolerance, and is hardly affected by phase noise. Therefore, here, as an example, a spectrum of a predetermined number (eight symbols in the illustrated example) in decreasing order of the absolute value of the amplitude is used as the representative value, and the frequency numbers −25, −22, −10 and −7, and 8, 13, 19 and 24 shown by black circles in FIG. 7 are further extracted.

Figure 8:
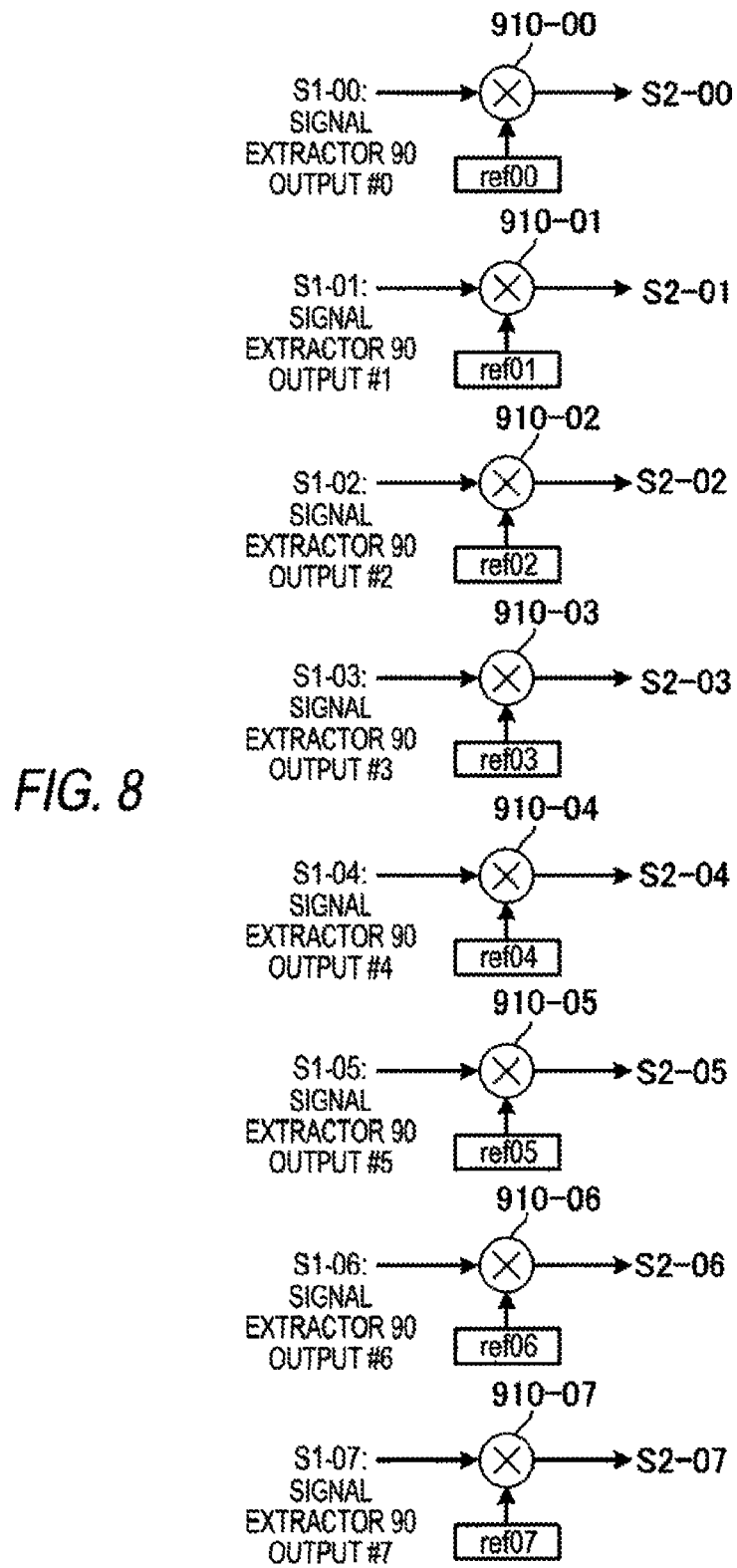
FIG. 8 A view showing the structure of an error vector calculator.

FIG. 8 is a view showing the structure of the error vector calculator 91. The error vector calculator 91 has complex multipliers 910-00 to 910-07. Here, since the error vector of the reference signal GI is calculated for eight frequencies, eight systems of circuits are provided in parallel. To calculate the error vector, the reference signal extracted from the received signal and the known reference signal to be transmitted are compared by using the complex multipliers 910-00 to 910-07.

The complex multipliers 910-00 to 910-07 are supplied with coefficients ref00 to ref07 of the known reference signal serving as the reference, respectively, and the values S1-00 to S1-07 of the reference signals GI of the frequencies extracted in the signal extractor 90 and the coefficients ref00 to ref07 are complex-multiplied for the frequencies, respectively. The coefficients ref00 to ref07 are conjugate complex numbers of the known reference signal, and by performing the complex multiplication, error vectors S2-00 to S2-07 with the periodically received reference signal are obtained. By previously adding a weighting coefficient to the coefficients, the magnitudes of the error vectors can be made the same.

Figure 9:
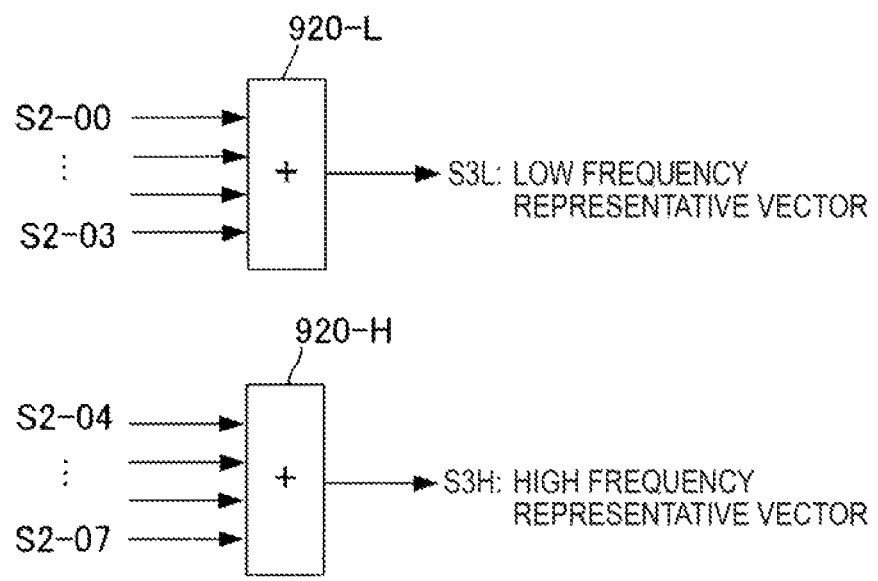
FIG. 9 A view showing the structure of a representative vector calculator.

FIG. 9 is a view showing the structure of the representative vector calculator 92. The representative vector calculator 92 has two complex adders 920-L and 920-H. In the representative vector calculator 92, the error vectors S2-00 to S2-07 outputted from the error vector calculator 91 are divided into two groups of low frequency and high frequency, and complex addition is performed for the groups by the complex adders 920-L and 920-H. Thereby, representative vectors S3L and S3H of the two groups of low frequency and high frequency are obtained. The representative vectors which indicate the mean values of the groups may be divided by the numbers of inputs of the complex adders. However, since what is important is the phases of the representative vectors, they are only necessarily positive real multiples of the mean value and it is not specifically necessary to perform the division.

Now, using FIG. 10 to FIG. 13, the behaviors of the signal values when the SNR of the received signal is low will be described. FIG. 10 to FIG. 13 show examples of the operations in the error vector calculator 91 and the representative vector calculator 92.

Figure 10:
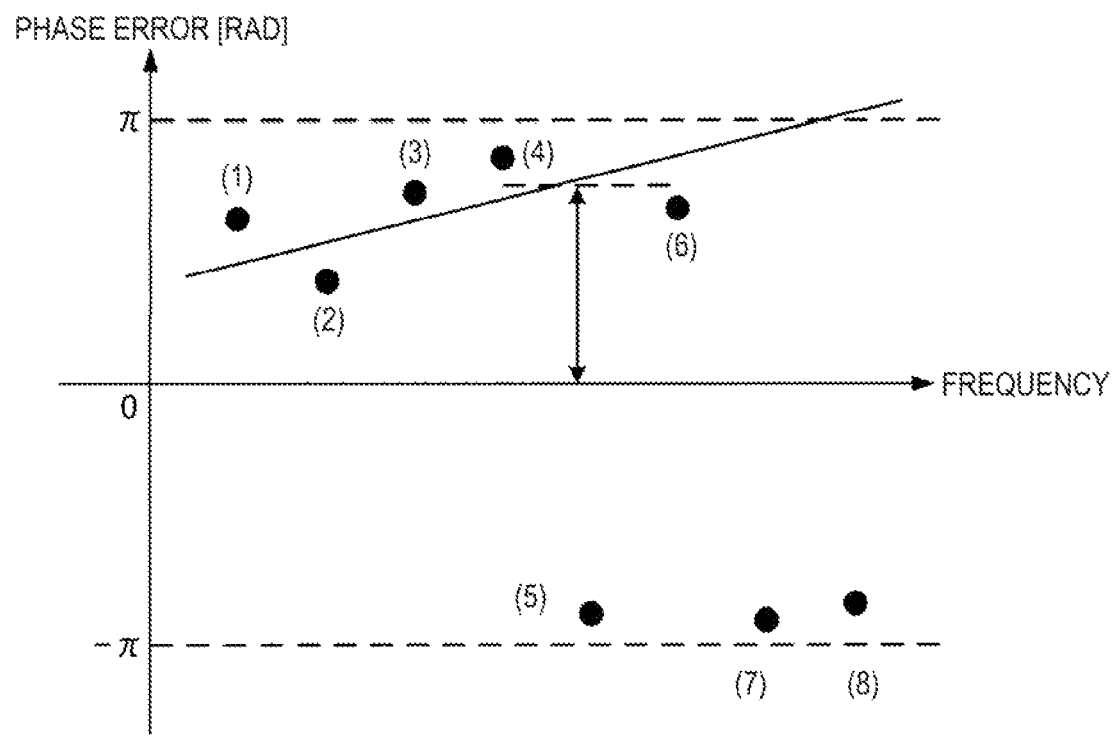
FIG. 10 A view showing the phase errors due to the residual carrier frequency offset and the residual symbol synchronization shift in the frequency domain in the case of a low SNR.

FIG. 10 is a view showing the phase errors due to the residual carrier frequency offset and the residual symbol synchronization shift in the frequency domain in the case of a low SNR. In FIG. 10, the horizontal axis shows the frequency, and the vertical axis shows the phase error in the range of $-\pi$ to $\pi$ [rad]. Examples of the phase errors of the symbols of the received signal calculated in the error vector calculator 91 are shown by the black circles.

In FIG. 10, in the phases (5), (7) and (8), phase discontinuity occurs because the phase error due to the residual carrier frequency offset and the residual symbol synchronization shift becomes large and the phase disturbance due to the low SNR becomes large. When linear approximation is performed on these discontinuous phases by using the LSM, the obtained straight line is significantly different from the actual phase errors.

Figure 11:
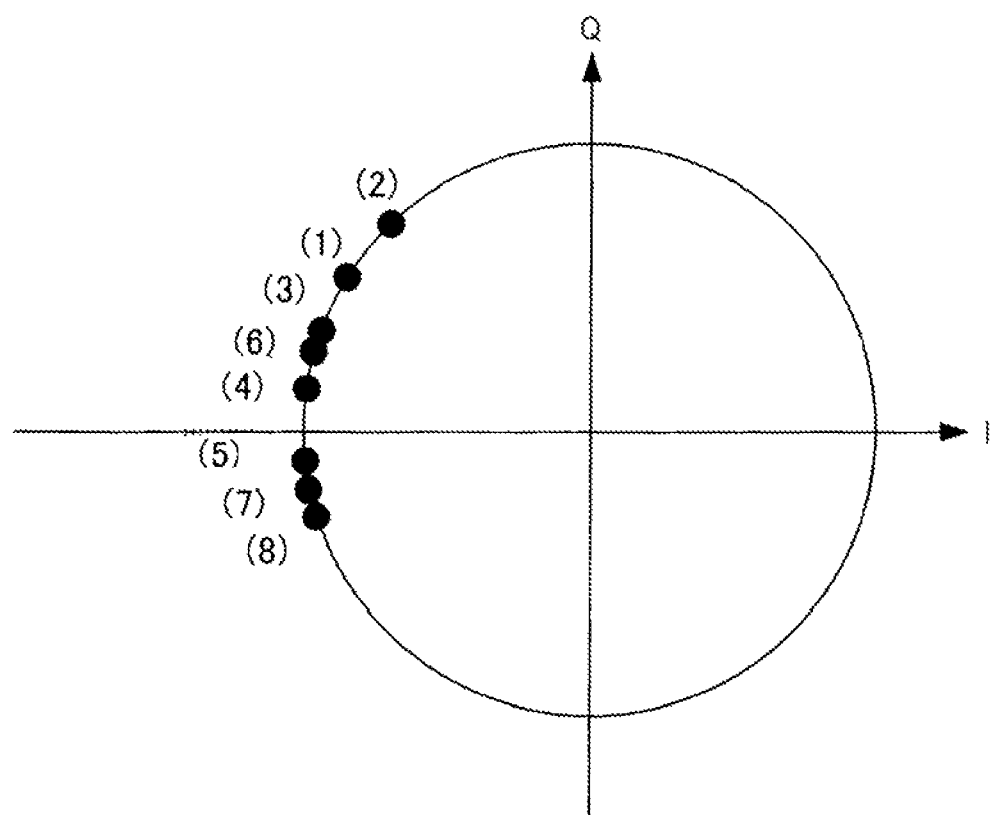
FIG. 11 A view showing the error vectors of the phase errors in the case of the low SNR.

FIG. 11 is a view showing the error vectors of the phase errors in the case of the low SNR shown in FIG. 10. FIG. 11 shows the error vectors represented on the complex IQ plane. According to predetermined frequency ranges, the phases (1) to (4) are grouped into the low frequency vector and the phases (5) to (8), into the high frequency vector.

Figure 12:
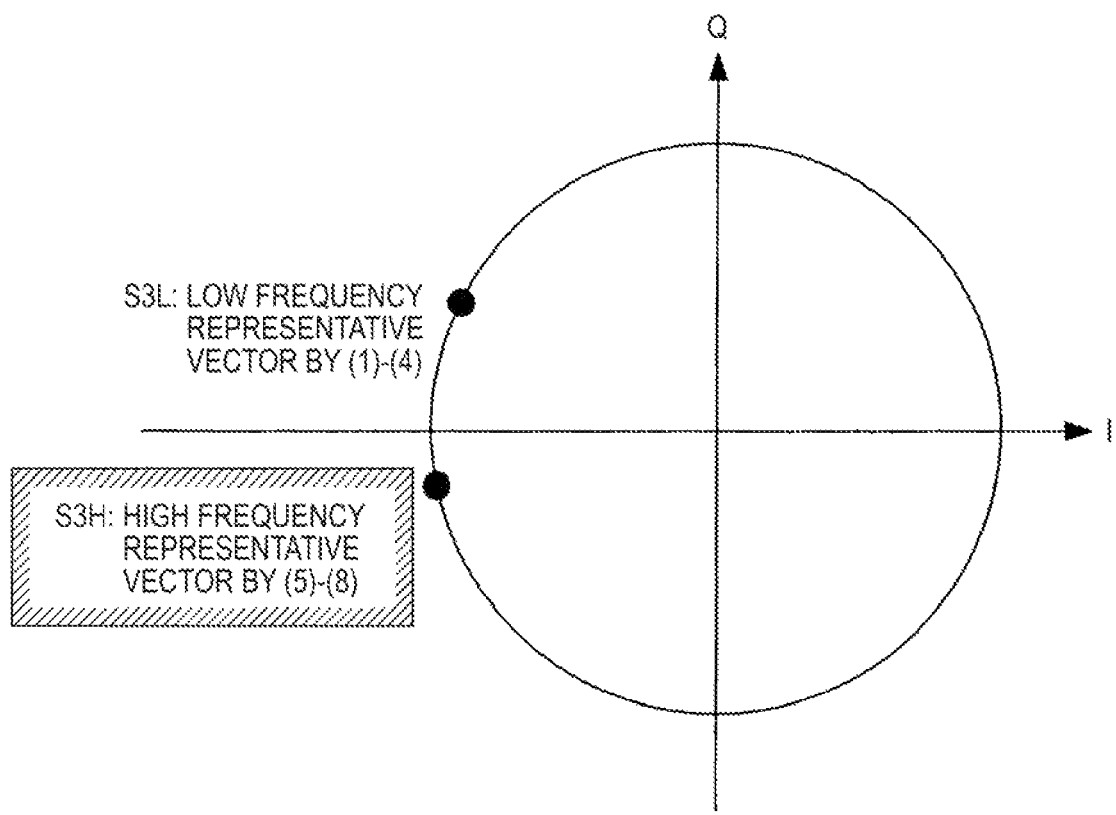
FIG. 12 A view showing the representative vectors of the error vectors of the phase errors.

FIG. 12 is a view showing the representative vectors of the error vectors of the phase errors shown in FIG. 11. FIG. 12 shows the representative vectors of the error vectors represented on the complex IQ plane like FIG. 11. By the complex adder 920-L of the representative vector calculator 92, a low frequency representative vector S3L obtained by the vector mean of the error vectors (1) to (4) is calculated. Moreover, by the complex adder 920-H, a high frequency representative vector S3H obtained by the vector mean of the error vectors (5) to (8) is calculated. To make the view more visible, the quotients when the outputs of the complex adders 920-L and 920H are divided by the numbers of inputs of the complex adders are shown as the representative vectors. It is apparent that excellent mean values are obtained for the high frequency representative vector S3H of the error vectors (5) to (8) by using not phase calculation but vector mean calculation as described above.

Figure 13:
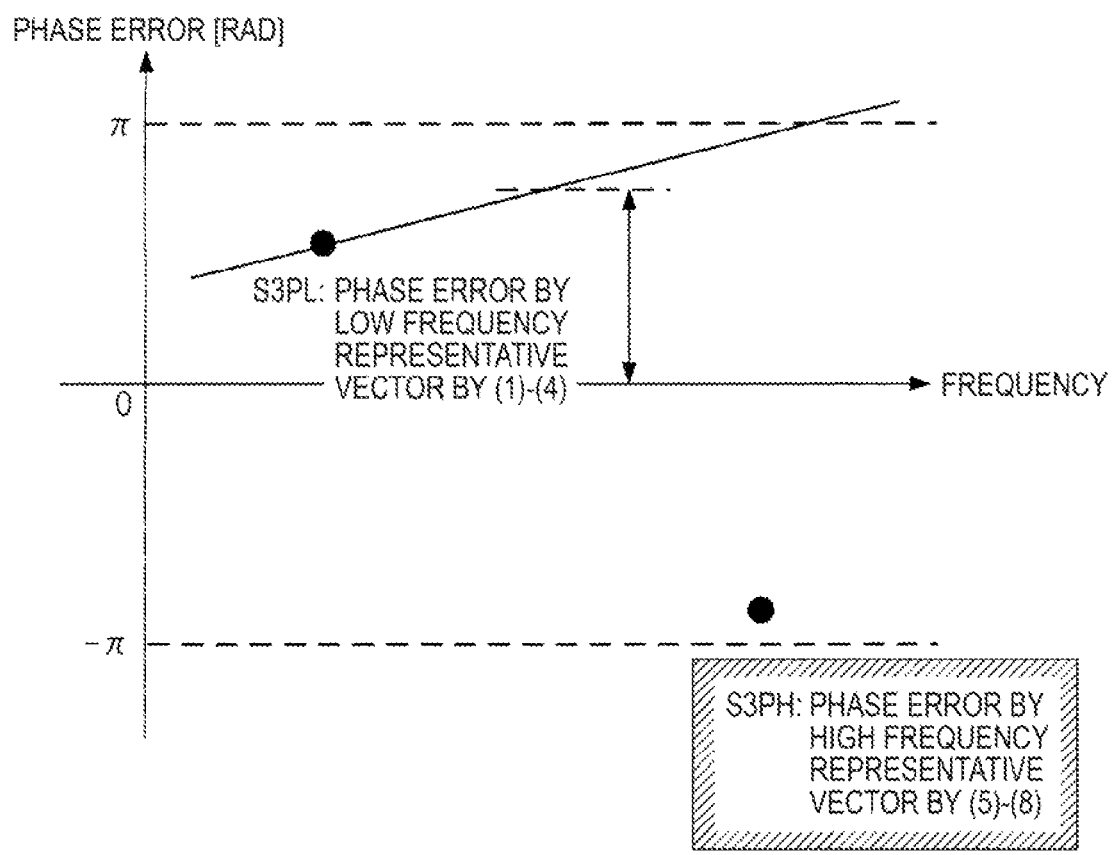
FIG. 13 A view showing the phase errors of the low frequency representative vector and the high frequency representative vector.

FIG. 13 is a view showing the phase errors of the low frequency representative vector and the high frequency representative vector shown in FIG. 12. In FIG. 13, the horizontal axis shows the frequency, and the vertical axis shows the phase error in the range of $-\pi$ to $\pi$ [rad].

As shown in FIG. 13, compared with when phase discontinuity is determined based on the phase errors of the phases (1) to (8) of FIG. 10, determination errors can be made few when the determination is made based on two phases of the phase S3PL of the low frequency representative vector and the phase S3PH of the high frequency representative vector. This is because by obtaining the representative vector of each group by the mean, the number of times of determination is reduced and the influence of the phase noise at a low SNR is mitigated by the mean calculation.

Figure 14:
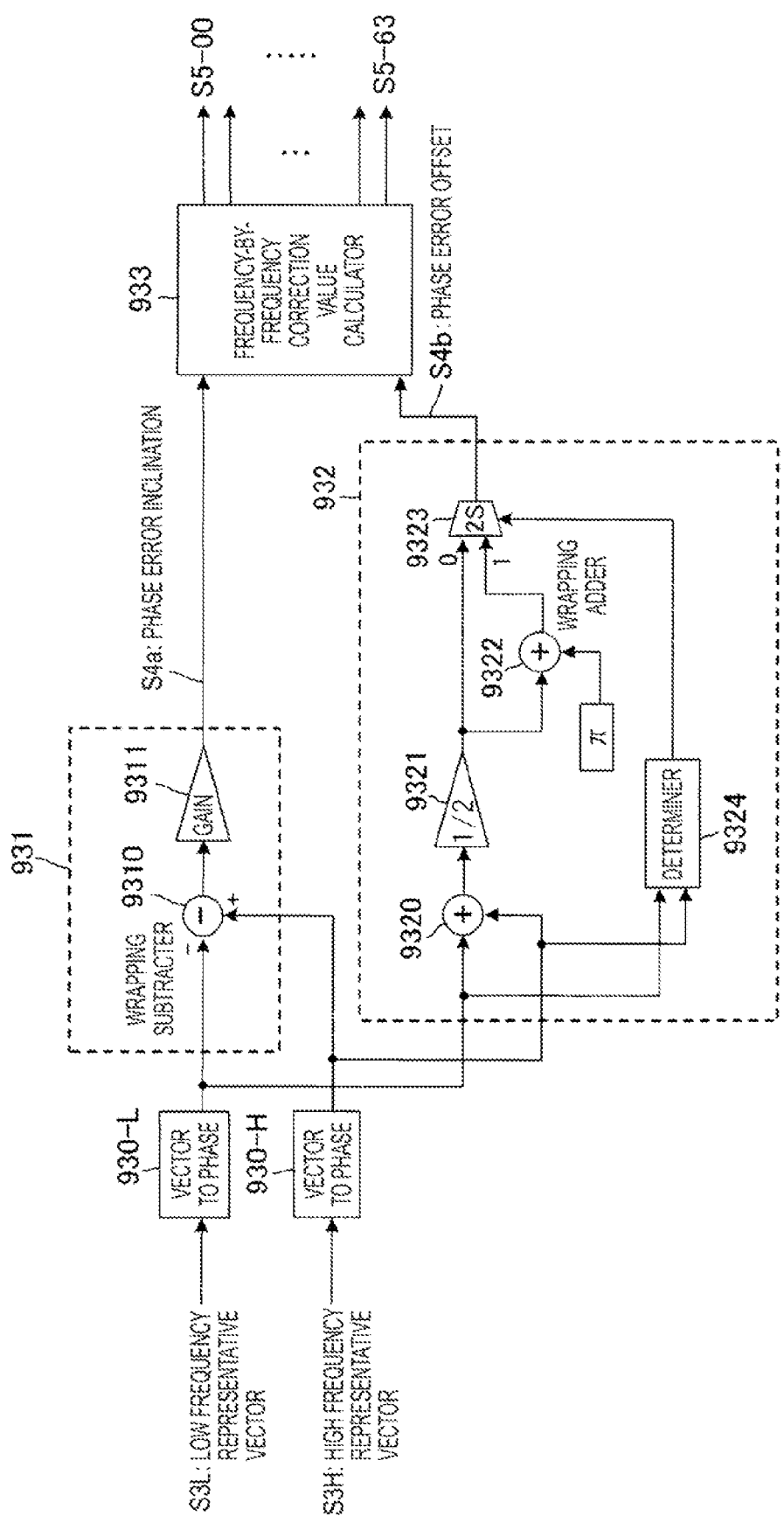
FIG. 14 A view showing the structure of a correction value calculator.

Next, the structure and operation of the correction value calculator 93 will be described. FIG. 14 is a view showing the structure of the correction value calculator 93. The correction value calculator 93 has vector-phase converter (vector to phase) 930-L and 930-H, a phase inclination calculator 931, a phase offset calculator 932 and a frequency-by-frequency correction value calculator 933. The correction value calculator 93 obtains the phase error correction value of each frequency from the representative vector obtained by the representative vector calculator 92.

In the correction value calculator 93, the low frequency representative vector S3L and the high frequency representative vector S3H are converted into phases by the vector-phase converters 930-L and 930-H, respectively. The vector-phase conversion can be realized, for example, by an arctan calculation or the CORDIC.

Then, by the phase inclination calculator 931, a phase error inclination S4a is obtained from the phase errors of the two representative vectors. The phase inclination calculator 931 has a wrapping subtractor 9310 and a gain multiplicator 9311. In the wrapping subtractor 9310, wrapping subtraction is performed for the phases of the two representative vectors, and the phase difference between the representative vectors is obtained in the range of $-\pi$ to $\pi$ [rad].

In the gain multiplicator 9311, multiplication by the gain which is the reciprocal of the quantity (not necessarily an integer) that is the frequency difference between the representative vectors represented by a frequency number is performed. The gain which is the multiplier in the gain multiplicator 9311 is, for example, 1/32 which is the reciprocal of the difference between −16 which is the mean of frequency numbers −25, −22, −10 and −7 in the low frequency domain selected in FIGS. 7 and 16 which is the mean of frequency numbers 8, 13, 19 and 24 in the high frequency domain. In this case, the phase difference of the output of the wrapping subtractor 9310 is multiplied by the gain 1/32. By the gain multiplication, the representative vector phase difference between groups is divided by the frequency difference, and the phase error inclination S4a is obtained.

Moreover, by the phase offset calculator 932, a phase error offset S4b is obtained from the phase errors of the two representative vectors. The phase offset calculator 932 has an adder 9320, a gain multiplier 9321, a wrapping adder 9322, a selector 9323 and a determiner 9324.

In the adder 9320, the phases of the two representative vectors are added together, and in the gain multiplicator 9321, the result of the addition by the adder 9320 is multiplied by 1/2. The output of the gain multiplicator 9321 is inputted to one input of the selector 9323 as it is, and a value which is the result of the wrapping addition of $\pi$ by the wrapping adder 9322 is inputted to the other input of the selector 9323. In the determiner 9324, whether phase discontinuity is present or absent is determined. In the selector 9323, according to the result of the determination by the determiner 9324, one of the inputs is outputted as the phase error offset S4b. That is, when it is determined by the determiner 9324 that the phases are not discontinuous, the output of the gain multiplicator 9321 is outputted as it is from the selector 9323, and when it is determined by the determiner 9324 that the phases are discontinuous, a value which is the output of the gain multiplicator 9321 shifted by $\pi$ is outputted from the selector 9323.

The phase discontinuity indicates that an excess phase of $\pm 2\pi$ is contained in any of the representative vectors. For this reason, with respect to the result of addition of the phases of the representative vectors, the phase discontinuity can be corrected by shifting by $\pi$ (shifting by $-\pi$ is the same) after the multiplication by 1/2. Therefore, the phase error offset S4b can be precisely calculated in the phase offset calculator 932.

Here, the wrapping subtraction by the wrapping subtractor 9310 and the wrapping addition by the wrapping adder 9322 will be described. Since wrapping subtraction and wrapping addition are the same with respect to the wrapping calculation although they are different in that one is sum and the other is difference, they will be collectively referred to as wrapping addition/subtraction in the following description.

Figure 15:
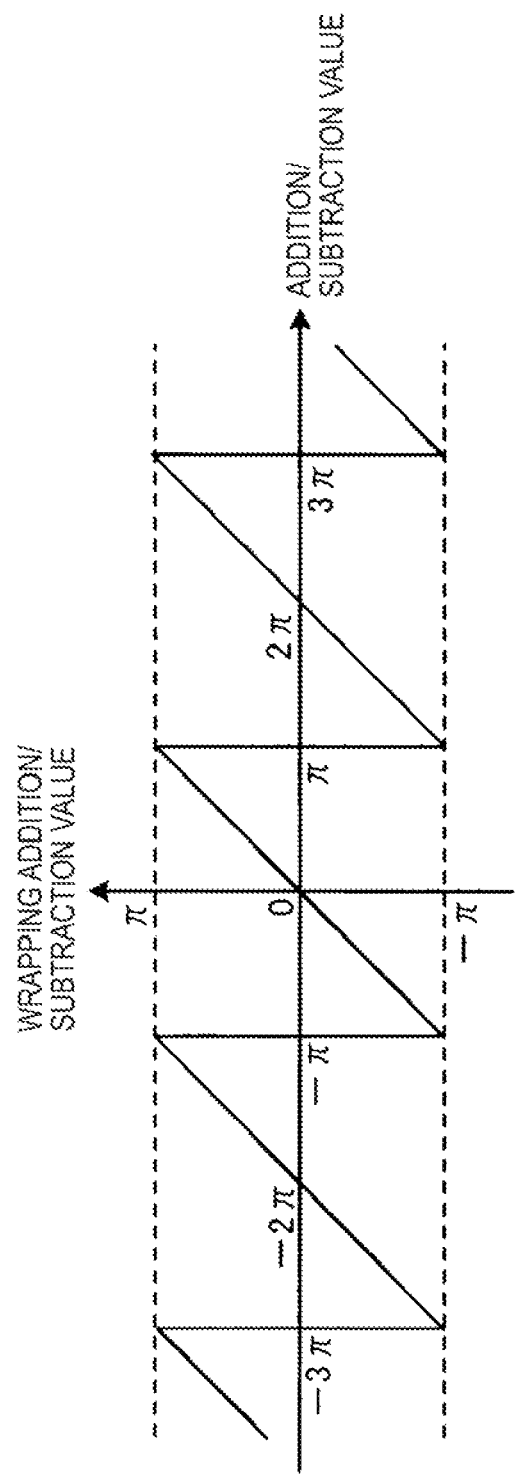
FIG. 15 A view showing the relationship between normal addition/subtraction and wrapping addition/subtraction.

FIG. 15 is a view showing the relationship between normal addition/subtraction and wrapping addition/subtraction. The wrapping addition/subtraction is to add an integral multiple of $2\pi$ when the addition/subtraction value exceeds the range of $\pm \pi$ so that the calculation result falls within the range of $\pm \pi$. In the actual calculation circuit, this can be easily realized, for example, by associating the range of $\pm \pi$ with the range of a signed binary integer $\pm((N-1)$-th power of 2) and performing a calculation to extract the lower N bits of the result of the addition/subtraction.

Figure 16:
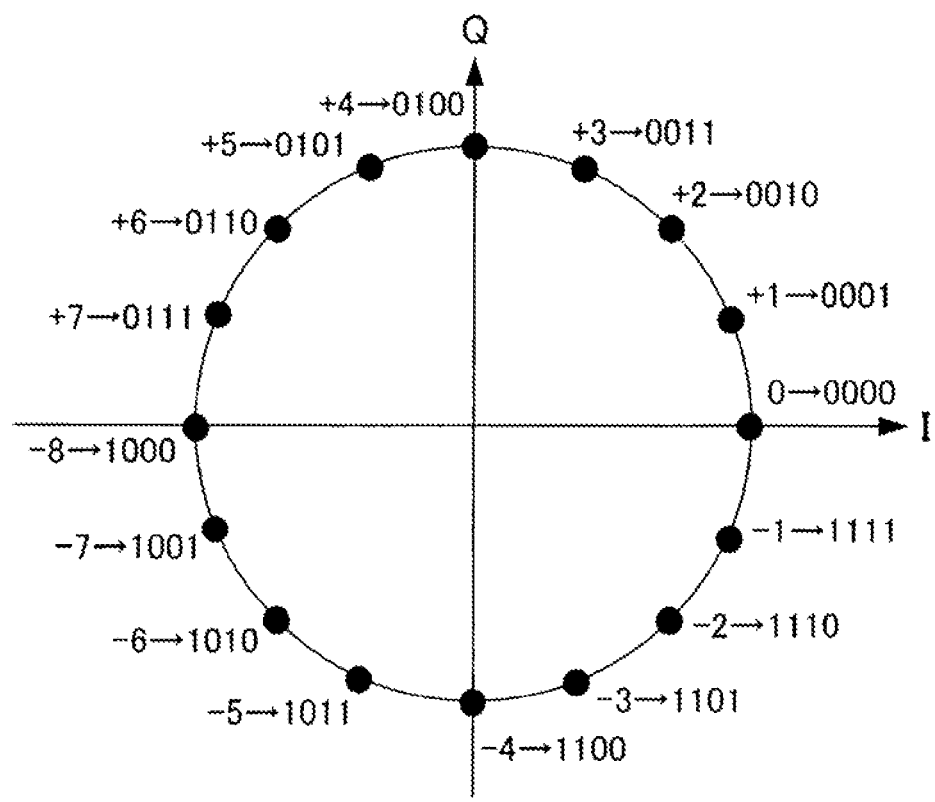
FIG. 16 A view showing the correspondence between the phases and the numerical values when the phases of ±π are assigned to four-bit values.

As a concrete example of the wrapping addition/subtraction, a case where $\pm \pi$ is expressed by four bits will be shown. The MSB (Most Significant Bit) of the four bits represents whether the value is positive or negative, and $\pm \pi$ is expressed by −8 to +7. FIG. 16 is a view showing the correspondence between the phases and the numerical values when the phases of ±π are assigned to four-bit values. As shown in FIG. 16, the phases of −π to π are assigned to integral values of −8 to +7 in π/8 steps, and the integral values are expressed as binary values. The binary expressions of the integral values are 0→0000, +1→0001, +2→0010, +3→0011, +4→0100, +5→0101, +6→0110, +7→0111, −8→1000, −7→1001, −6→1010, −5→1011, −4→1100, −3→1101, −2→1110, and −1→1111.

When wrapping addition of −1 and −3 is performed, since −1 is 1111 and −3 is 1101 in binary expression and as shown by Expression [2] shown below, a carry occurs if normal binary addition is performed, the result is 11100 which is five bits. In this example, the lower four bits are extracted from the five bits to obtain 1100, that is, −4, and −4 is obtained as the result of the wrapping addition of −1 and −3.

When wrapping addition of −6 and −3 is performed, although the result is −9 in the normal addition, since the range of ±π is exceeded, the result of the wrapping addition is +7 from FIG. 15 and FIG. 16. In binary expression, −6 is 1010 and −3 is 1101 and as shown by Expression [3] shown below, the result is 10111 which is five bits when normal binary addition is performed. Here, the lower four bits are extracted to obtain 0111, that is, +7 as the result of the wrapping addition of −6 and −3. By this calculation, even when the addition/subtraction result exceeds the range of ±π, the wrapping addition/subtraction to obtain a result falling within the range of ±π by a shift by 2π can be realized.

[Expression 1]

$$\begin{array}{rcl} 1111 & \Leftrightarrow & -1 \\ +1101 & \Leftrightarrow & -3 \\ \hline 1\boxed{1100} & \Leftrightarrow & -4 \end{array} \quad [2]$$

[Expression 2]

$$\begin{array}{rcl} 1010 & \Leftrightarrow & -6 \\ +1101 & \Leftrightarrow & -3 \\ \hline 1\boxed{0111} & \Leftrightarrow & +7 \end{array} \quad [3]$$

Figure 17:
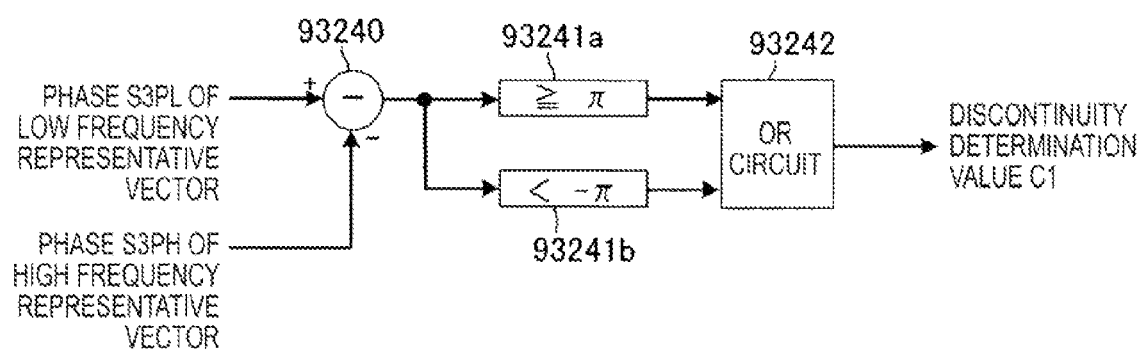
FIG. 17 A view showing the structure of a determiner of a phase offset calculator in the correction value calculator.

FIG. 17 is a view showing the structure of the determiner 9324 of the phase offset calculator 932 in the correction value calculator 93. The determiner 9324 has a subtractor 93240, inequality sign determiners 93241a and 93241b and an OR circuit 93242. In the subtractor 93240, the phases S3PL and S3PH of the two representative vectors are subtracted. In the inequality sign determiner 93241a, it is determined whether or not the result of the subtraction by the subtractor 93240 is not less than π, that is, (S3PL−S3PH)≥π or not, and when the result of the determination is true, "1" is outputted. In the inequality sign determiner 93241b, whether or not the result of the subtraction by the subtractor 93240 is less than −2π, that is, (S3PL−S3PH)<−π or not, and when the result of the determination is true, "1" is outputted. In the OR circuit 93242, when any of the two outputs, that is, the outputs of the inequality sign determiners 93241a and 93241b is "1", "1" is outputted. The output of the OR circuit 93242 is a discontinuity determination value C1.

Thereby, when the absolute value of the calculated difference between the phases of the two representative vectors is not less than π, the determiner 9324 determines that phase discontinuity is occurring, and outputs "1" as the discontinuity determination value C1. Under a condition where symbol synchronization of the received signal is achieved, when no phase discontinuity is occurring, the phase error is never π or larger. For this reason, whether phase discontinuity occurs due to the influence of the phase noise or not can be determined whether or not the absolute value of the phase difference is not less than π.

Figure 18:
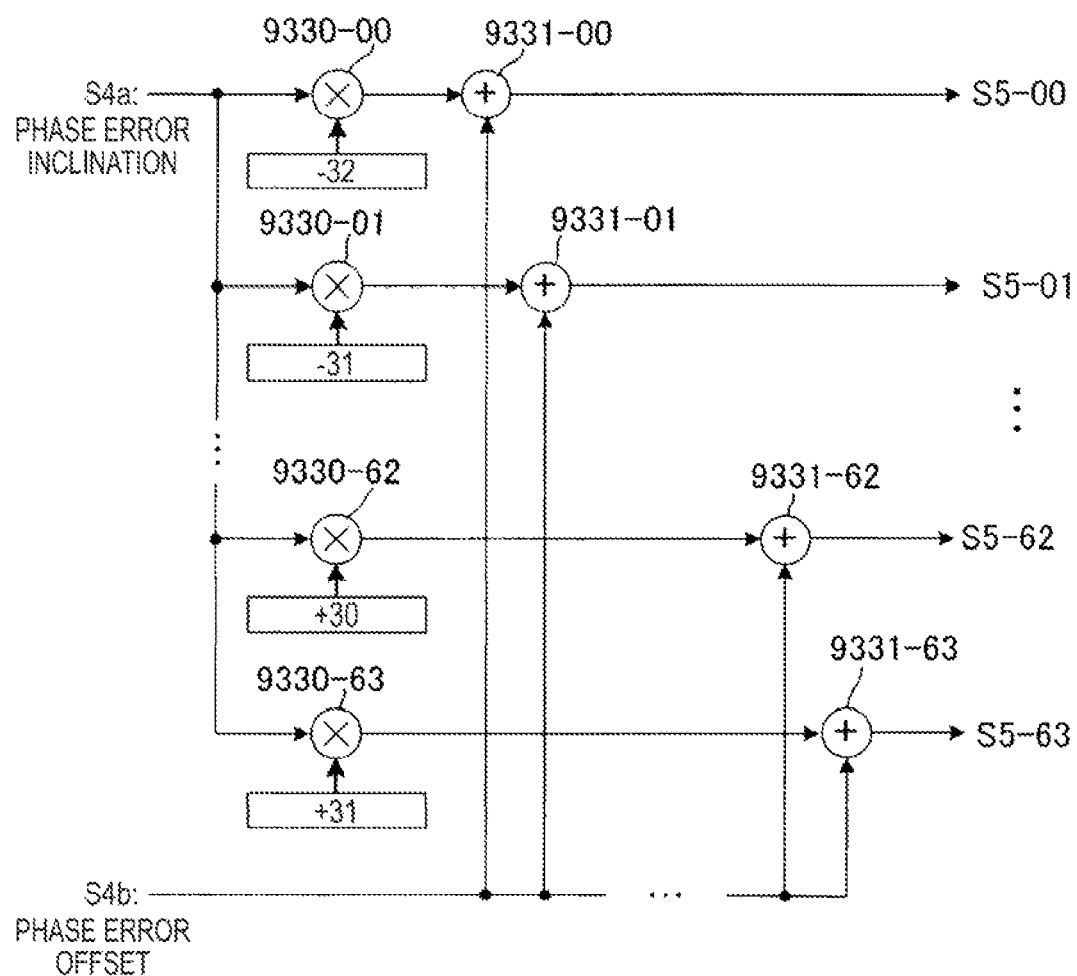
FIG. 18 A view showing the structure of a frequency-by-frequency correction value calculator in the correction value calculator.

FIG. 18 is a view showing the structure of the frequency-by-frequency correction value calculator 933 in the correction value calculator 93. In the frequency-by-frequency correction value calculator 933, from the phase error linearity shown in FIG. 3 and Expression [1], the phase correction values of the frequency numbers are obtained from the phase error inclination S4a and the phase error offset S4b.

The frequency-by-frequency correction value calculator 933 has multipliers 9330-00 to 9330-63 and adders 9331-00 to 9331-63. Here, since the frequency-by-frequency correction value is calculated for 64 (64 symbols of the original GI) frequencies, 64 systems of circuits are provided in parallel.

In the multipliers 9330-00 to 9330-63, in order to calculate the phase error correction value of each frequency number, the phase error inclination S4a obtained in the phase inclination calculator 931 is multiplied by a coefficient corresponding to each frequency. The coefficients of the multiplication are frequency numbers −32 to +31. In the adders 9331-00 to 9331-63, the phase error offset S4b obtained in the phase offset calculator 932 is added to the results of the multiplication by the multipliers 9330-00 to 9330-63. By these calculations, frequency-by-frequency correction values S5-00 to S5-63 are calculated.

Figure 19:
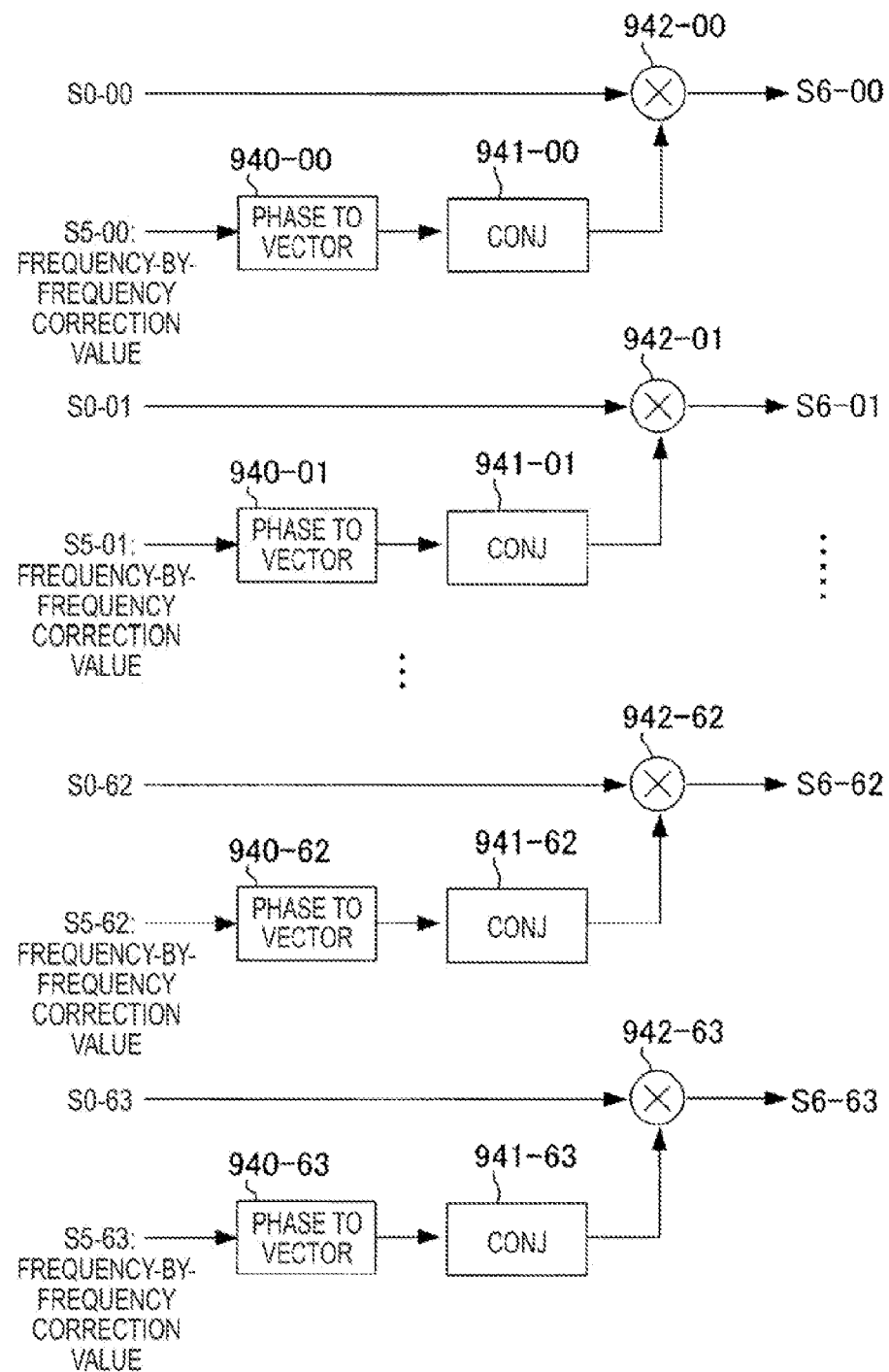
FIG. 19 A view showing the structure of a phase corrector.

FIG. 19 is a view showing the structure of the phase corrector 94. The phase corrector 94 has phase-vector (phase to vector) convertors 940-00 to 940-63, conjugate (conj) convertors 941-00 to 941-63 and complex multipliers 942-00 to 942-63. Here, since the residual symbol synchronization shift is corrected for 64 (64 symbols of the original GI) frequencies, 64 systems of circuits are provided in parallel.

In the phase-vector converters 940-00 to 940-63, the phase error correction values (frequency-by-frequency correction values) S5-00 to S5-63 of the frequencies obtained in the correction value calculator 93 are converted into complex vectors. In the conjugate converters 941-00 to 941-63, the complex vectors of the frequency-by-frequency correction values are converted into conjugate complex numbers. In the complex multipliers 942-00 to 942-63, received signals S0-00 to S0-63 in the frequency domain having undergone transmission path error correction by the transmission path corrector 8 are multiplied by the conjugate complex vectors of the frequency-by-frequency correction values. Thereby, the phases of the received signals are reversed, the phase errors are corrected, and signals S6-00 to S6-63 having undergone the correction are obtained. The phase-vector conversion can be realized by, for example, a tangent calculation or the CORDIC.

To the phase corrector 94, not only the structure where multiplication by the conjugate complex vectors of the frequency-by-frequency correction values is performed but also various structures such as a structure where the phase is rotated by a gain multiplicator and a CORDIC section and a structure where phase correction is made by using a correction table may be applied.

Figure 20:
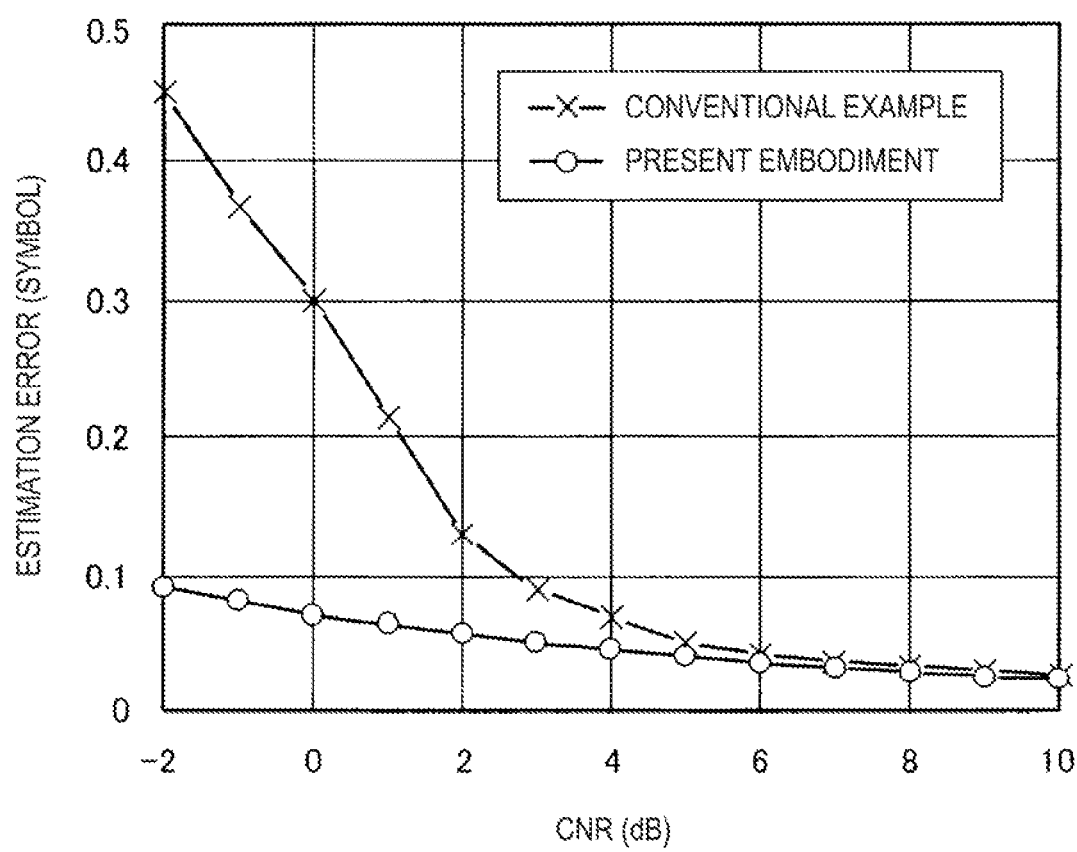
FIG. 20 A view showing an example of the result of the phase error estimation by a phase error corrector of the present embodiment.

FIG. 20 is a view showing an example of the result of the phase error estimation by a phase error corrector of the present embodiment. FIG. 20 shows the result of a simulation of the symbol estimation error obtained at the time of phase error correction when the symbol synchronization shift is, for example, 0.2 symbols because of a shift of the sampling frequency of the ADC, and is a view where the performances by the phase error estimation methods of the present embodiment and the conventional example are compared with each other.

In the graph of FIG. 20, the present embodiment is shown by O and the conventional example is shown by X; as the points representative of the values of the symbol estimation errors become lower in the figure, the errors indicated thereby become smaller and highly precise correction can be made. In particular, it is apparent that the symbol estimation error is extremely small compared with the conventional example particularly when the CNR is as low as not more than 2 dB.

In the above-described embodiment, an example is described where in order to obtain the low frequency representative vector and the high frequency representative vector, four for each, a total of eight frequencies are used. On the other hand, in the example of FIG. 20, the result of a simulation is shown in a case where in order to use more effective measurement values, eight for each of the low frequency domain and the high frequency domain, a total of sixteen frequencies are used.

As described above, in the present embodiment, by using the periodically and repetitively transmitted specific reference signal (reference signal GI), by the phase error corrector 9, the specific reference signal (reference signal GI) is extracted from the received signal converted into the frequency domain and compared with the specific reference signal to be transmitted, whereby the error vectors of the phase errors are calculated in the frequency domain. A plurality of error vectors are divided into not less than two error vector groups, the representative value of the error vectors is obtained for each group to calculate the representative vector, and the phase error inclination and offset are calculated based on a plurality of representative vectors. Then, the phase error correction value of each frequency is calculated, and phase error correction for each frequency is performed. When the representative vector is obtained, the number of error vectors to calculate the representative value in each group is necessarily at least two, the number of groups into which the error vectors are divided is necessarily at least two, and the phase error can be calculated based on at least four values.

For example, the phase error inclination is obtained from the difference between the phases of a plurality of representative vectors, and the phase error offset is obtained from the sum of the phases of the representative vectors. However, when the phase error offset is obtained, phase discontinuity is determined based on the difference between the phases of the representative vectors, and when the phases are discontinuous, $\pi$ is added to the sum of the phases of the representative vectors so that the result of the calculation falls within the range of $\pm\pi$, and this is made the phase error offset.

Thereby, even when phase discontinuity occurs in the phase error, the phase discontinuity can be easily and precisely determined, and highly precise phase correction values can be obtained every time. Therefore, highly precise phase error correction can be realized by obtaining highly precise phase correction values even in low SNR situations, and a wireless communication system with high requirements for PER even at a low SNR and performing high-speed transmission such as the WiGig can be handled.

Application of the First Embodiment

Figure 21:
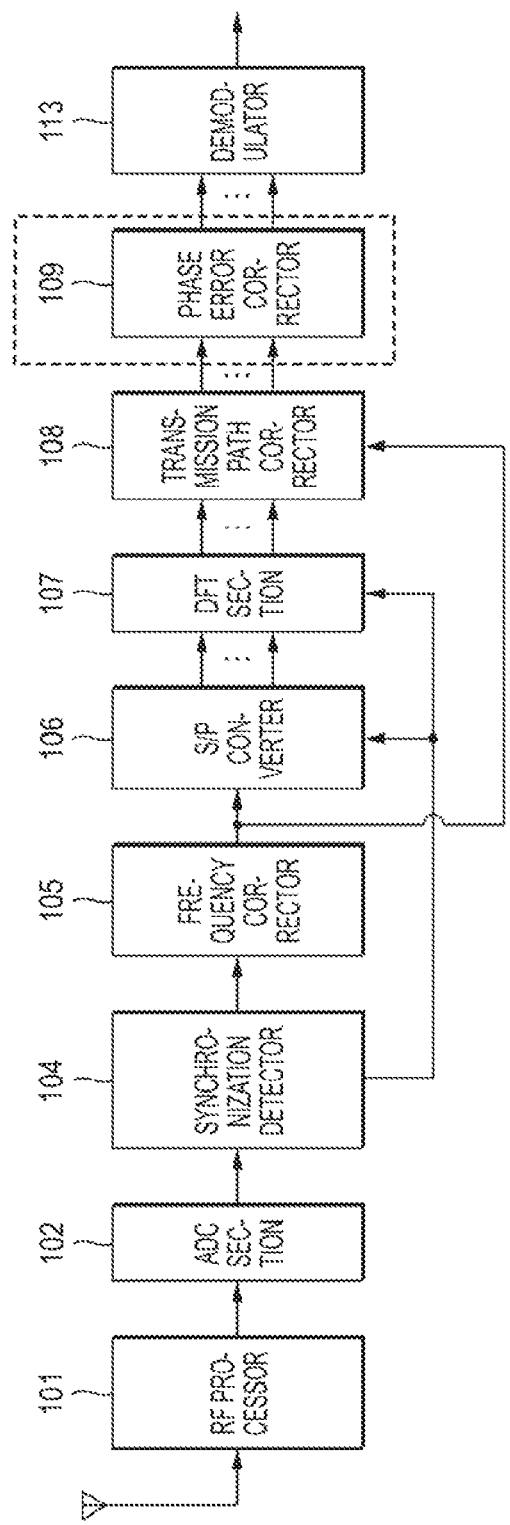
FIG. 21 A block diagram showing the structure where the phase error corrector of the present embodiment is applied to a receiver of a wireless communication apparatus compliant with the OFDM.

FIG. 21 is a block diagram showing the structure where the phase error corrector of the present embodiment is applied to a receiver of a wireless communication apparatus compliant with the OFDM. The wireless communication apparatus shown in FIG. 21 has an RF processor 101, an ADC section 102, a synchronization detector 104, a frequency corrector 105, an S/P converter 106, a DFT section 107, a transmission path corrector 108, a phase error corrector 109 and a demodulator 113.

Compared with the structure of the wireless communication apparatus compliant with the WiGig in FIG. 1, the wireless communication apparatus compliant with the OFDM in FIG. 21 is different in that the IDFT section is absent and a signal in the frequency domain is demodulated and that the reference signal is not the GI assigned to a specific time but a pilot carrier assigned to a specific frequency. The rest of the structure and operation is similar to that of the wireless communication apparatus in FIG. 1.

As described above, also in the wireless communication apparatus compliant with the OFDM, by applying the phase error corrector of the present embodiment, even when the phase error or the noise level is high, a highly precise correction value can be obtained, so that highly precise phase error correction can be realized.

Second Embodiment

Figure 22:
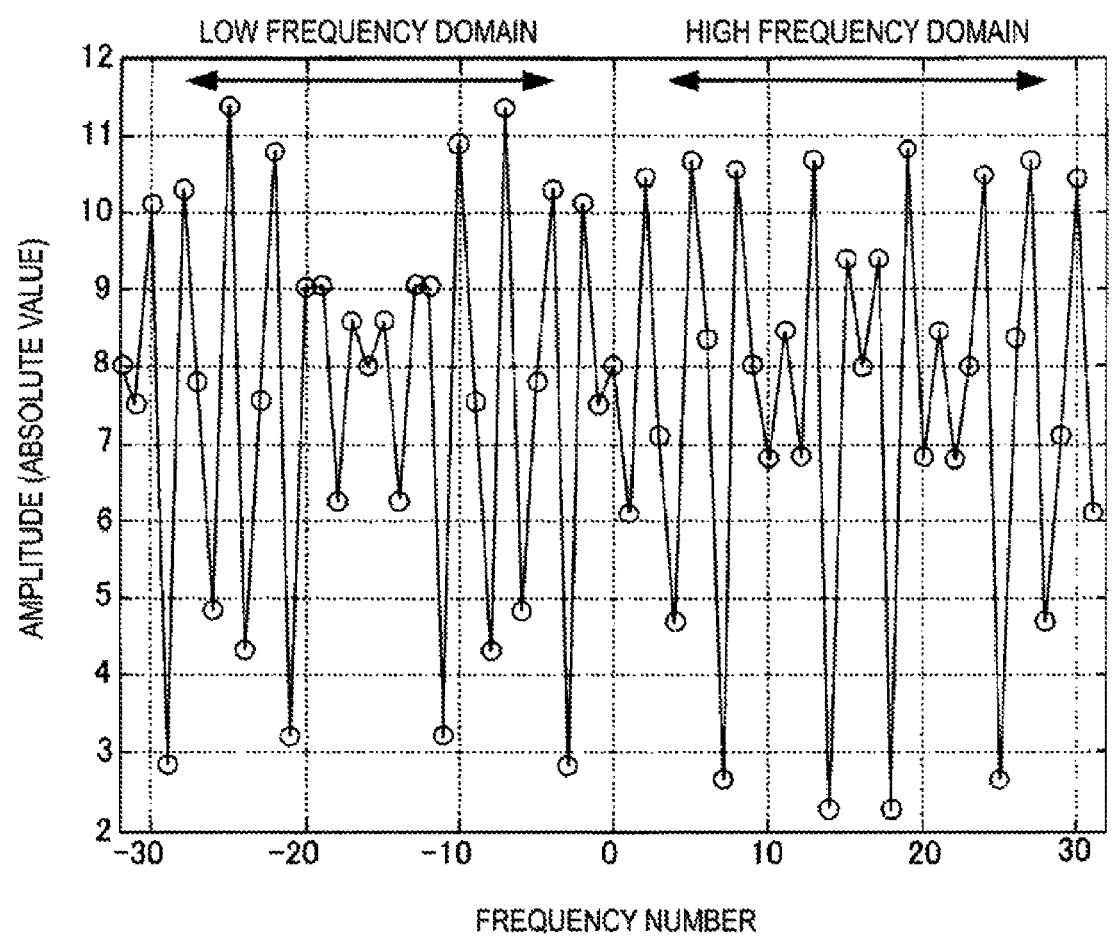
FIG. 22 A view showing the spectrum of the reference signal GI in the frequency domain and the frequency number specifying the low frequency domain and the high frequency domain according to a second embodiment.

FIG. 22 is a view showing the spectrum of the reference signal GI in the frequency domain and the frequency number specifying the low frequency domain and the high frequency domain according to a second embodiment of the present disclosure.

The second embodiment is an example where the number of extracted phase errors used for error vector calculation is changed. In the signal extractor 90, all the signals in the frequency domain are extracted as shown in FIG. 22, the error vectors are calculated in the error vector calculator 91, and then, in the representative vector calculator 92, the representative vectors S3L and S3H are calculated for the high frequency domain and the low frequency domain, respectively.

However, in the error vector calculator 91, to the magnitude of the coefficient ref used for the calculation, a large weight is assigned when the spectrum of the GI is large, a small weight is assigned when the spectrum of the GI is small, and a weight is assigned for each frequency according to the magnitude of the absolute value of the spectrum. Thereby, noise is suppressed in the representative vector obtained by the error vector synthesis in the representative vector calculator 92.

In this case, in the correction value calculator 93, also when the frequency number corresponding to the representative vector is calculated by the gain multiplicator 9311 of the phase inclination calculator 931, a weight is assigned to the frequency averaged in each frequency domain according to the magnitude of the spectrum of the GI.

By thus obtaining the phase error by extracting signals in a multiplicity of frequency domains, a more precise phase correction value can be obtained.

Third Embodiment

Figure 23:
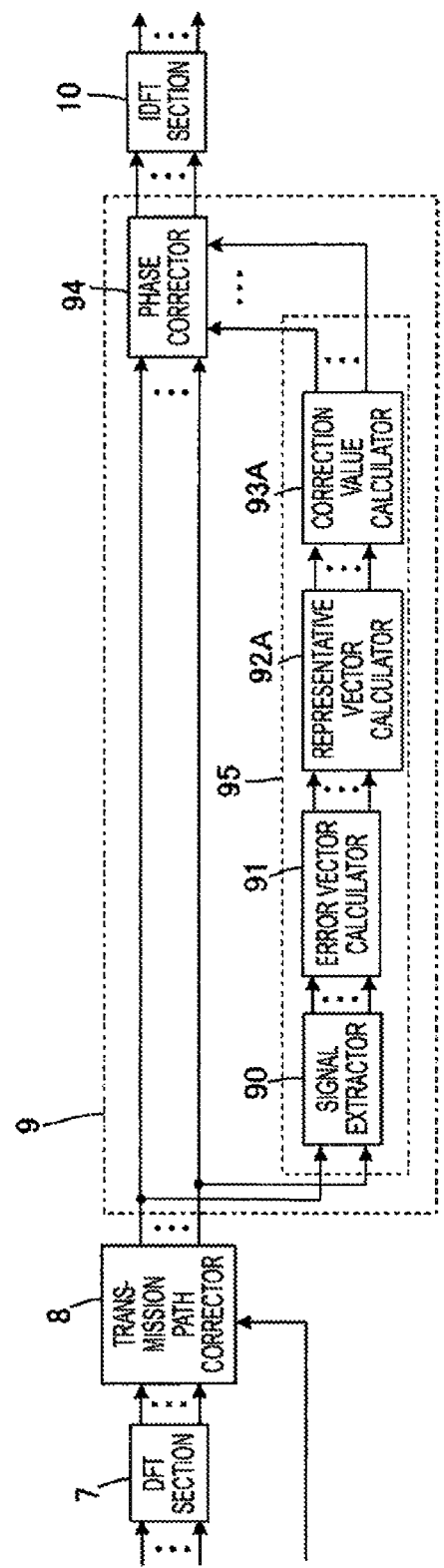
FIG. 23 A block diagram showing the structure of a phase error corrector in a third embodiment.

FIG. 23 is a block diagram showing the structure of a phase error corrector in a third embodiment of the present disclosure. The third embodiment is an example where the grouping of the frequency domains for which the representative vector is calculated is changed and representative vectors of three groups of a low frequency domain, a medium frequency domain and a high frequency domain are obtained.

The phase error corrector 9 has a representative vector calculator 92A that calculates three representative vectors corresponding to the three groups of the low frequency domain, the medium frequency domain and the high frequency domain and a correction value calculator 93A that calculates the correction value from the three representative vectors. The rest of the structure and operation is similar to that of the phase error corrector of the first embodiment shown in FIG. 6.

Using FIG. 24 to FIG. 26, an example of the operation of the representative vector calculator 92A in the third embodiment when the SNR of the received signal is low will be described.

Figure 24:
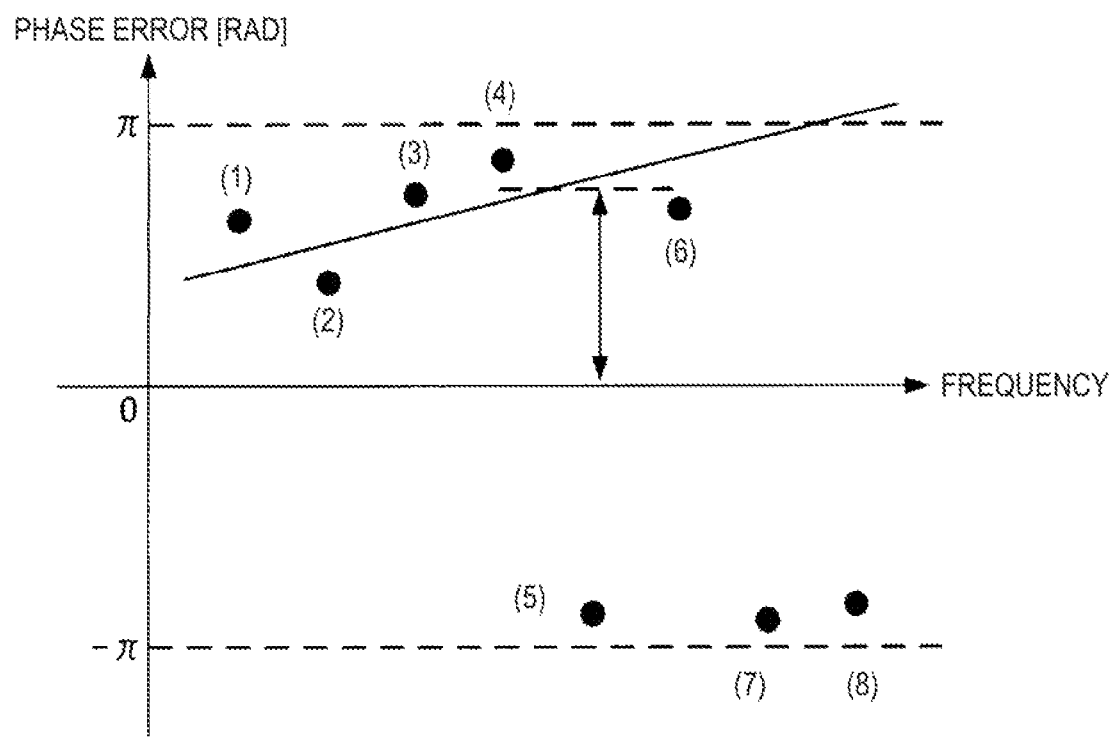
FIG. 24 A view showing the phase errors due to the residual carrier frequency offset and the residual symbol synchronization shift in the frequency domain in the case of a low SNR.

FIG. 24 is a view showing the phase errors due to the residual carrier frequency offset and the residual symbol synchronization shift in the frequency domain in the case of a low SNR. In FIG. 24, the horizontal axis shows the frequency, and the vertical axis shows the phase error in the range of $-\pi$ to $\pi$ [rad]. Examples of the phase errors of the symbols of the received signal calculated in the error vector calculator 91 are shown by the black circles. In the present example, the low frequency domain is phases (1) to (3), the medium frequency domain is phases (4) to (5), and the high frequency domain is phases (6) to (8). The values of the phase errors of the frequencies are similar to those of the first embodiment shown in FIG. 10.

Figure 25:
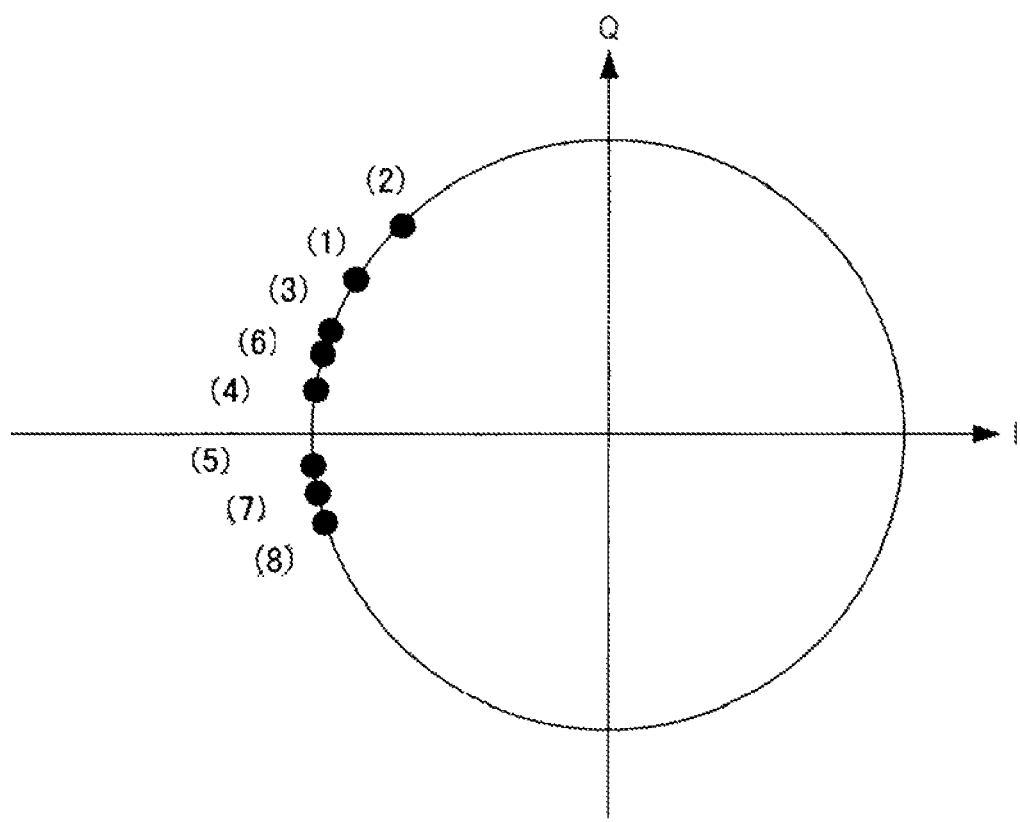
FIG. 25 A view showing the error vectors of the phase errors in the case of the low SNR.

FIG. 25 is a view showing the error vectors of the phase errors in the case of the low SNR shown in FIG. 24. FIG. 25 shows the error vectors represented on the complex IQ plane. According to predetermined frequency ranges, the phases (1) to (3) are grouped into the low frequency vector, the phases (4) and (5), into the medium frequency vector, and the phases (6) to (8), into the high frequency vector.

Figure 26:
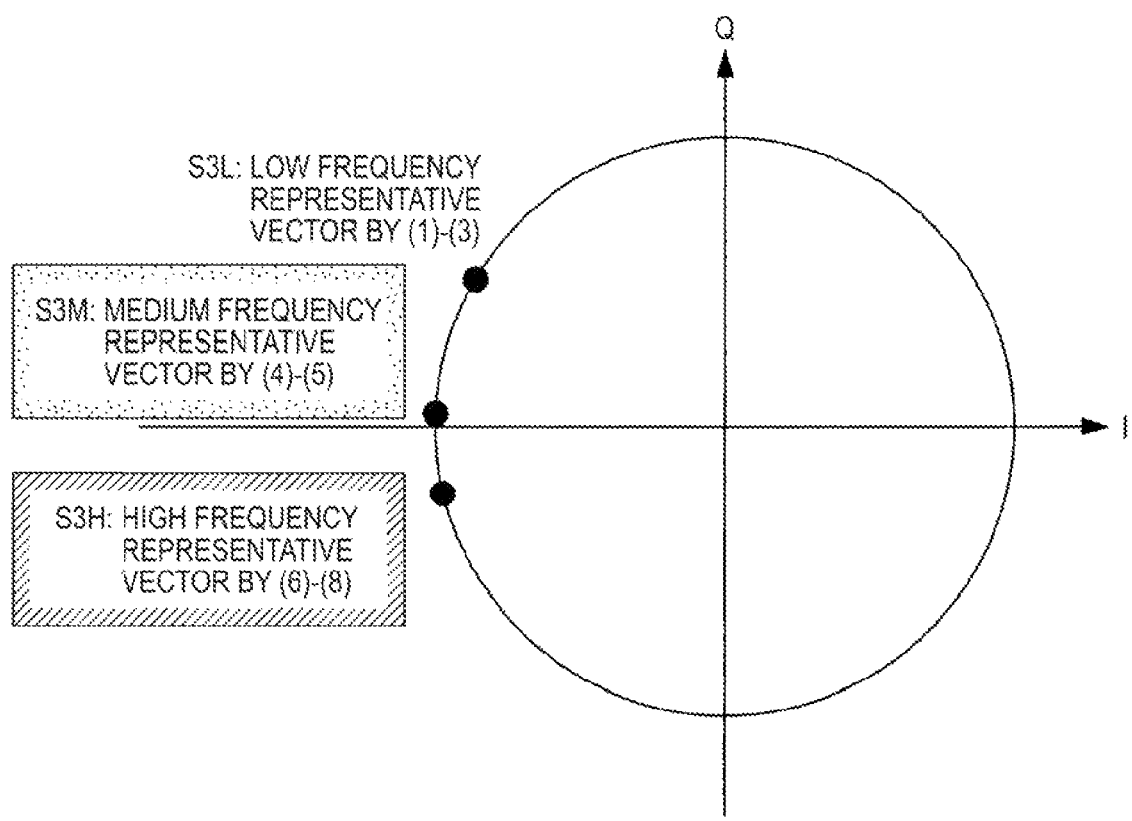
FIG. 26 A view showing the representative vectors of the error vectors of the phase errors.

FIG. 26 is a view showing the representative vectors of the error vectors of the phase errors shown in FIG. 25. By the representative vector calculator 92A, the low frequency representative vector S3L is calculated by the vector mean of the error vectors (1) to (3), a medium frequency vector S3M is calculated by the vector mean of the error vectors (4) and (5), and the high frequency representative vector S3H is calculated by the vector mean of the error vectors (6) to (8).

Figure 27:
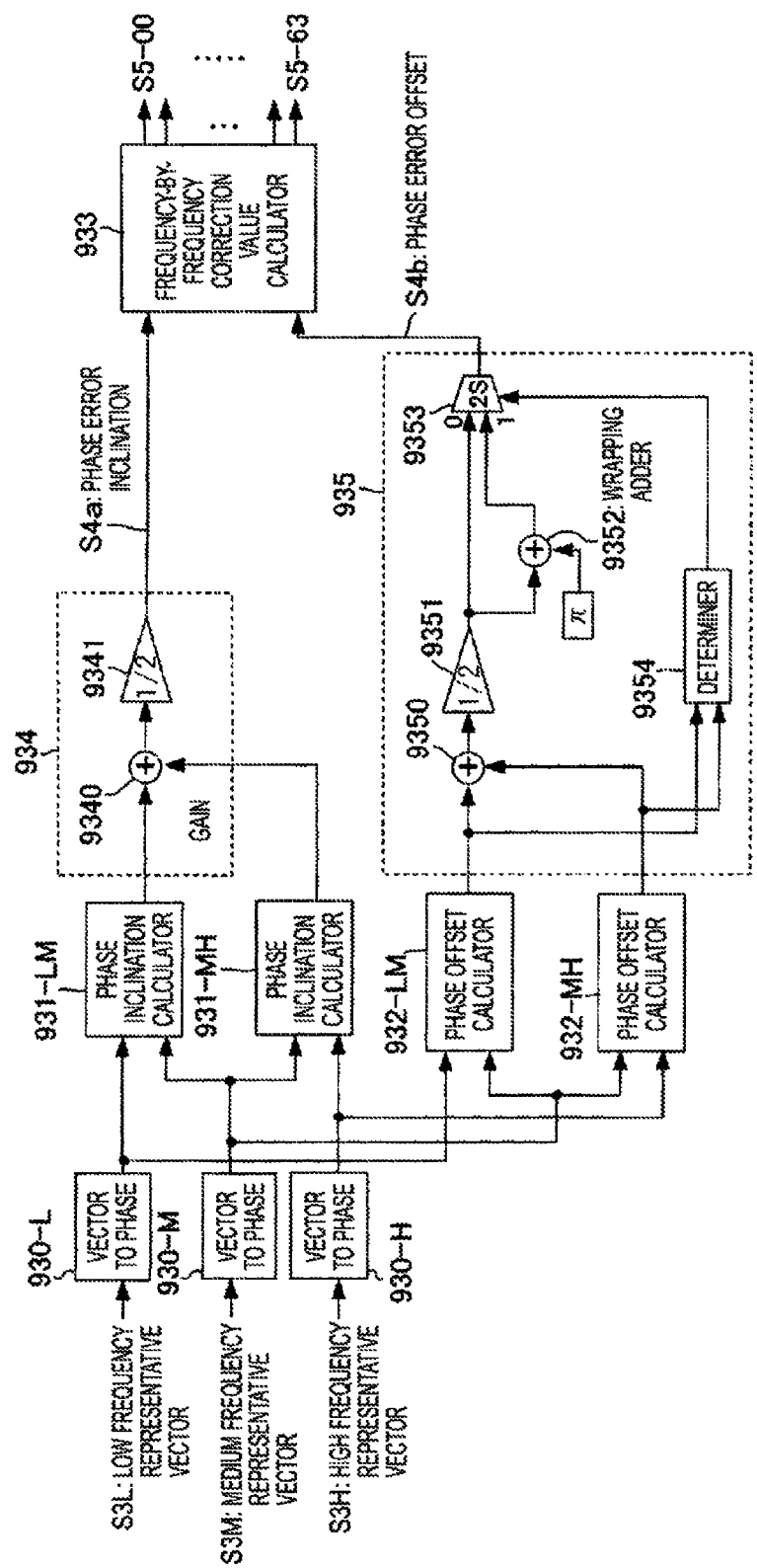
FIG. 27 A view showing the structure of a correction value calculator in the third embodiment.

FIG. 27 is a view showing the structure of the correction value calculator 93A in the third embodiment. The correction value calculator 93A has vector-phase converters 930-L, 930-M and 930-H, phase inclination calculators 931-LM and 931-MH, phase offset calculators 932-LM and 932-MH, a phase inclination averaging section 934, a phase offset averaging section 935 and the frequency-by-frequency correction value calculator 933.

In the correction value calculator 93A, the low frequency representative vector S3L is converted into a phase by the vector-phase converter 930-L, the medium frequency representative vector S3M is converted into a phase by the vector-phase converter 930-M, and the high frequency representative vector S3H is converted into a phase by the vector-phase converter 930-H.

Then, the inclination of the phase error between the low frequency and the medium frequency is calculated from the phase errors of the representative vectors S3L and S3M by the phase inclination calculator 931-LM, and the inclination of the phase error between the medium frequency and the high frequency is calculated from the phase errors of the representative vectors S3M and S3H by the phase inclination calculator 931-MH. The phase inclination calculators 931-LM and 931-MH are the same as the phase inclination calculator 931 of the first embodiment.

Then, by the phase inclination averaging section 934, the mean of the two inclinations of the phase errors between the low frequency and the medium frequency and between the medium frequency and the high frequency is calculated to obtain the phase error inclination S4a. The phase inclination averaging section 934 has an adder 9340 and a gain multiplicator 9341. In the adder 9340, the inclinations of the phase errors between two different frequency domains are added together, and in the gain multiplicator 9341, the result of the addition by the adder 9340 is multiplied by ½ to thereby perform mean calculation of the phase error inclinations. The output of the phase inclination averaging section 934 is the phase error inclination S4a obtained from the three representative vectors of the low frequency domain, the medium frequency domain and the high frequency domain.

Moreover, the phase error offset at the low frequency and the medium frequency is calculated from the phase errors of the representative vectors S3L and S3M by the phase offset calculator 932-LM, and the phase error offset at the low frequency and the medium frequency is calculated from the phase errors of the representative vectors S3M and S3H by the phase offset calculator 932-MH. The phase offset calculators 932-LM and 932-MH are the same as the phase offset calculator 932 of the first embodiment.

Then, by the phase offset averaging section 935, the mean of the offsets of the two phase errors between the low frequency and the medium frequency and between the medium frequency and the high frequency is calculated to obtain the phase error offset S4b. The phase offset averaging section 935 is the same as the phase offset calculator 932 of the first embodiment, and has an adder 9350, a gain multiplicator 9351, a wrapping adder 9352, a selector 9353 and a determiner 9354.

That is, in the phase offset averaging section 935, mean calculation of the phase error offset is performed by the adder 9350 and the gain multiplicator 9351, and in the determiner 9354, whether phase discontinuity is present or absent is determined. When it is determined that the phases are not discontinuous, the output of the gain multiplicator 9351 is outputted as it is from the selector 9353, and when it is determined that the phases are discontinuous, a value which is the output of the gain multiplicator 9351 shifted by it is outputted from the selector 9353. The output of the phase offset averaging section 935 is the phase error inclination offset S4b obtained from the three representative vectors of the low frequency domain, the medium frequency domain and the high frequency domain.

The frequency-by-frequency correction value calculator 933 is similar to that of the first embodiment, and from the linearity of the phase error, obtains the phase correction value of each frequency number from the phase error inclination S4a and the phase error offset S4b.

As described above, in the third embodiment, the error vectors are divided into the three groups of the low frequency domain, the medium frequency domain and the high frequency domain, the representative vector of the error vectors is calculated for each group, and the phase error inclination and offset are calculated by the three representative vectors. Thereby, as in the first embodiment, a highly precise phase correction value can be obtained even in low SNR situations, so that highly precise phase error correction can be realized.

The phase error correction value can also be calculated similarly to the above when the error vectors are divided into not less than four groups and the calculation of the representative vector for each group and the calculation of the phase error inclination and offset are performed.

Fourth Embodiment

Figure 28:
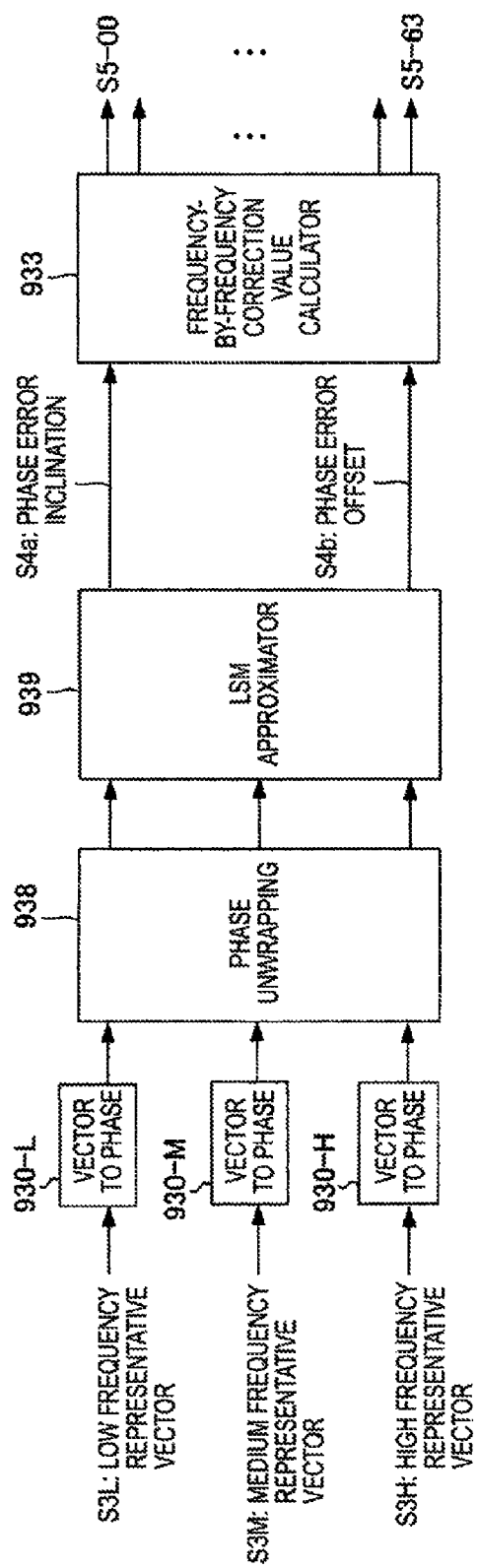
FIG. 28 A block diagram showing the structure of a correction value calculator in a fourth embodiment.

FIG. 28 is a block diagram showing the structure of a correction value calculator in a fourth embodiment of the present disclosure. The fourth embodiment is a modification of the correction value calculator 93A in the above-described third embodiment. In the fourth embodiment, an example is shown where the LSM is used for the calculation of the phase error inclination and offset.

The correction value calculator 93A of the fourth embodiment has the vector-phase converters 930-L, 930-M and 930-H, a phase unwrapping section 938, an LSM approximator 939 and the frequency-by-frequency correction value calculator 933.

In the vector-phase converters 930-L, 930-M and 930-H, vector-phase conversion of the low frequency representative vector S3L, the medium frequency representative vector S3M and the high frequency representative vector S3H is performed, respectively, and the phase errors of the representative vectors are obtained.

In the phase unwrapping section 938, for the phase error of each representative vector, phase unwrapping processing is performed, and when needed, an appropriate integral multiple of $2\pi$ is added to return the phase so that the absolute value of the difference between adjoining phases does not exceed $\pi$. The phase unwrapping processing can be realized by using a generally known method by phase calculation.

In the LSM approximator 939, linear approximation by the LSM processing is performed, and from the phase errors of the representative vectors having continuity, the phase error inclination S4a and the phase error offset S4b are calculated. The LSM processing can be realized by using a generally known method by approximation. In the frequency-by-frequency correction value calculator 933, from the linearity of the phase error, the phase correction value of each frequency number is obtained from the phase error inclination S4a and the phase error offset S4b.

As described above, a highly precise phase correction value can be obtained from the three representative vectors also by the method using the LSM.

Fifth Embodiment

Figure 29:
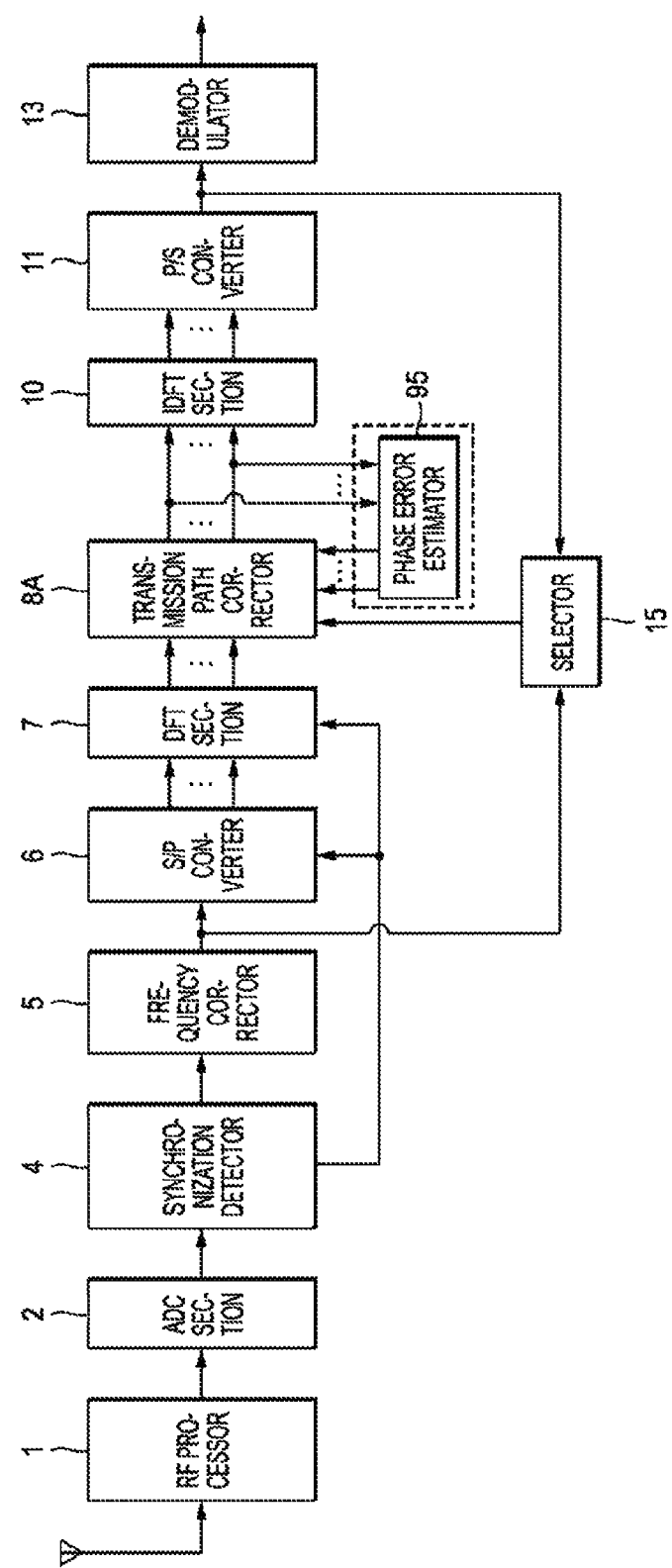
FIG. 29 A block diagram showing the structure of a receiver of a wireless communication apparatus in a fifth embodiment.

FIG. 29 is a block diagram showing the structure of a receiver of a wireless communication apparatus in a fifth embodiment of the present disclosure. The wireless communication apparatus of the fifth embodiment is a structure example where the structure of the wireless communication apparatus compliant with the WiGig shown in FIG. 1 is partly changed and the function of the phase corrector 94 of the phase error corrector 9 is unified into the transmission path corrector 8.

In the wireless communication apparatus of the fifth embodiment, the function of the phase error corrector 9 is divided into the phase error estimator 95 and the phase corrector 94 and instead of the phase error corrector 9, the phase error estimator 95 and a transmission path corrector 8A having the function of the phase corrector 94 are provided.

Figure 30:
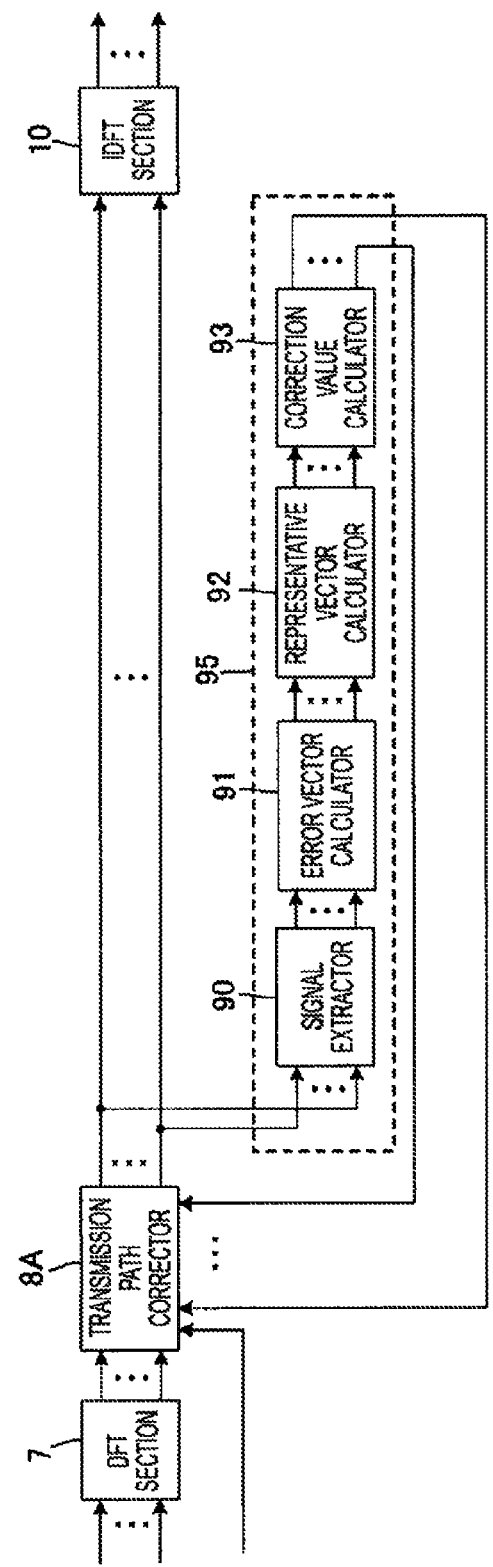
FIG. 30 A block diagram showing the structure of a phase error corrector in the fifth embodiment.

FIG. 30 is a block diagram showing the structure of the phase error corrector in the fifth embodiment. The phase error estimator 95 connected between the transmission path corrector 8A and the IDFT section 10 has the signal extractor 90, the error vector calculator 91, the representative vector calculator 92 and the correction value calculator 93. That is, the phase error estimator 95 has a structure where the phase corrector 94 is removed from the phase error corrector 9 shown in FIG. 6. Since the structures and operations of the elements are similar to those of the first embodiment, descriptions thereof are omitted. The phase correction value of each frequency calculated in the phase error estimator 95 is inputted to the transmission path corrector 8A.

Figure 31:
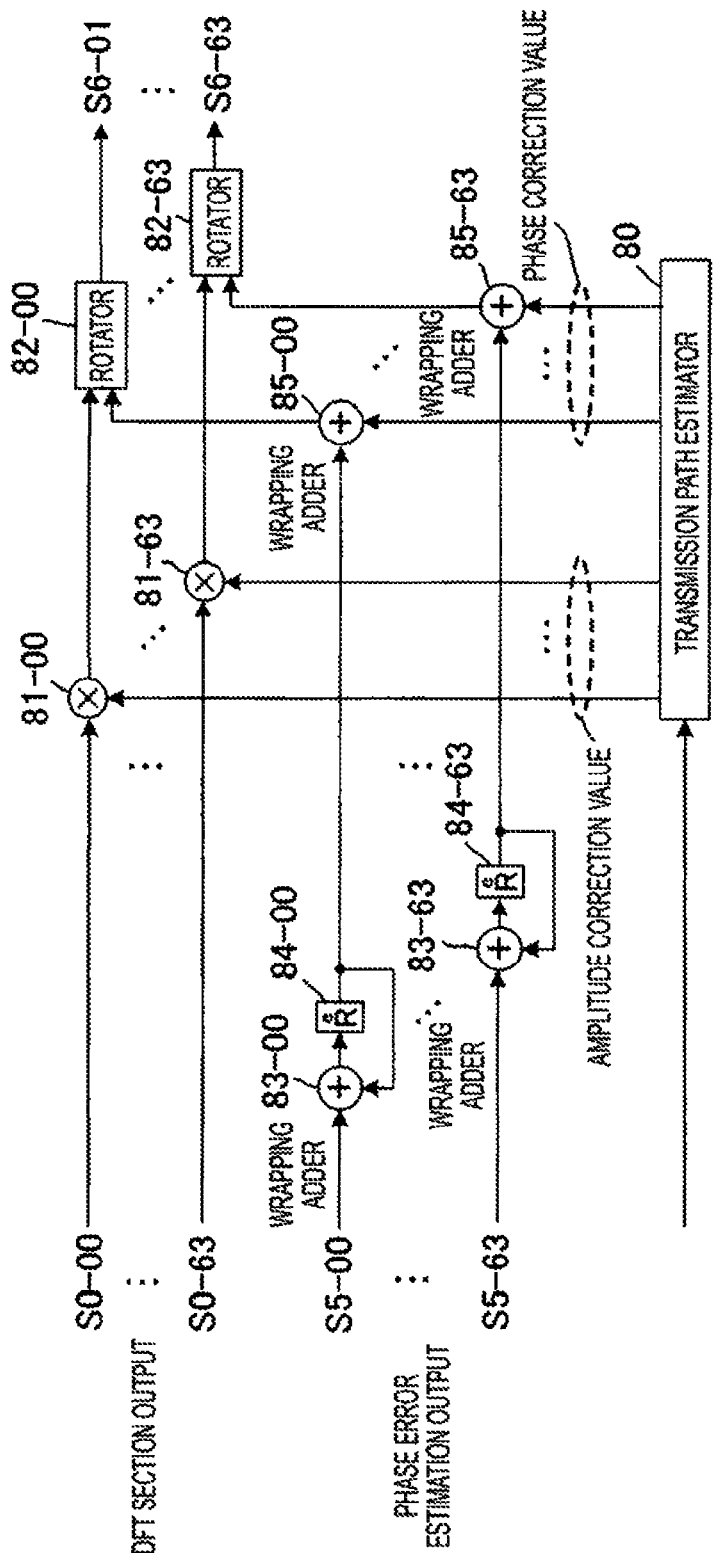
FIG. 31 A view showing the structure of a transmission path corrector in the fifth embodiment.

FIG. 31 is a view showing the structure of the transmission path corrector 8A in the fifth embodiment. In the transmission path corrector 8A, the amplitude and the phase which are transmission characteristics possessed by the transmission path between the transmitter and the receiver are calculated, and the transmission path error is corrected. Since phase correction can be made on the phase component obtained by the phase error estimator 95 together with the phases of the transmission characteristics of the transmission path in the transmission path corrector 8A, correction circuits can be reduced. The present embodiment is a method where phase error correction by feedback is performed unlike the phase error correction by feedforward shown in FIG. 6.

The transmission path corrector 8A has a transmission path estimator 80, multipliers 81-00 to 81-63, rotators 82-00 to 82-63, wrapping adders 83-00 to 83-63, flip-flop circuits 84-00 to 84-63 with enable, and wrapping adders 85-00 to 85-63. Here, since amplitude and phase correction is performed for 64 (64 symbols of the original GI) frequencies, 64 systems of circuits are provided in parallel.

In the transmission path corrector 8A, by using the amplitude correction value and the phase correction value obtained by the transmission path estimator 80, the phase correction values of the frequencies calculated by the phase error estimator 95 are synthesized, and amplitude correction and phase correction regarding the transmission path characteristics are executed while phase error correction is performed.

In the transmission path estimator 80, transmission path estimation is performed by using the output signal of the frequency corrector 5 or the P/S converter 11, and the amplitude correction value and the phase correction value according to the transmission characteristics possessed by the transmission path between the transmitter and the receiver are calculated.

In the multipliers 81-00 to 81-63, the received signals S0-00 to S0-63 in the frequency domain outputted from the DFT section 7 are multiplied by the amplitude correction value obtained in the transmission path estimator 80 to perform amplitude correction. Moreover, in the rotators 82-00 to 82-63, the phases of the outputs of the multipliers 81-00 to 81-63 are rotated by the unified phase correction values outputted from the wrapping adders 85-00 to 85-63 to perform phase correction.

When this is done, in the wrapping adders 83-00 to 83-63, wrapping addition of the correction values (phase error estimation outputs) S5-00 to S5-63 of the phase errors of the frequencies outputted from the phase error estimator 95, to the outputs of the flip-flop circuits 84-00 to 84-63 is performed. In the flip-flop circuits 84-00 to 84-63 with enable, the enable terminal holds the outputs of the wrapping adders 83-00 to 83-63 at the time of high level. The flip-flop circuits 84-00 to 84-63 are enabled at the time of the input of the received signal of the GI.

By these wrapping adders 83-00 to 83-63 and flip-flop circuits 84-00 to 84-63, phases are accumulated every time the correction values S5-00 to S5-63 of the phase errors obtained from the phase error estimator 95 are changed. The phase error change occurs when the received signal contains the GI.

In the wrapping adders 85-00 to 85-63, wrapping addition of the outputs of the flip-flop circuits 84-00 to 84-63 and the phase correction value obtained in the transmission path estimator 80 is performed. Thereby, the result of the phase error accumulation and the phase correction value by the transmission path estimation are synthesized and inputted to the rotators 82-00 to 82-63 to perform phase correction.

As described above, in the fifth embodiment, by unifying the phase corrector for phase error correction and the phase corrector for transmission path correction, correction circuits can be reduced, so that the circuit scale can be reduced. Moreover, as in the first embodiment, a highly precise phase correction value can be obtained even in low SNR situations, so that highly precise phase error correction can be realized.

Circumstances Leading up to the Contents of Another Embodiment of the Present Disclosure For example, the conventional examples of the phase error correction methods shown in the above-described Patent Documents 2 and 3 are examples where in order to correct the residual carrier frequency offset and the residual symbol synchronization shift, the residual carrier frequency offset is obtained by a carrier frequency offset estimator and then, the correction value is fed back to the phase error corrector to perform correction. Moreover, an example where the correction value is fed back to the frequency corrector to perform correction and an example where the correction value is fed back to the RF processor to perform correction are also present.

According to the method where the correction value is fed back to perform correction as in the above-described conventional example, since the correction of the residual carrier frequency offset is reflected after the feedback, when this is applied to a wireless communication system that performs high-speed transmission, correction is sometimes too late for the header of the received data. In particular, in the case of the wireless communication standard WiGig (trademark; the same applies hereafter) (Wireless Gigabit) using a millimeter waveband, since the time of the preamble period is short, the correction of the residual carrier frequency offset is not reflected from the header head of the received data, which causes a problem in that the header cannot be correctly modulated. Therefore, a phase error correction method is desired that enables correct demodulation of the received data by appropriately correcting the carrier frequency offset.

The present disclosure shows an example of a wireless communication apparatus including DFT (Discrete Fourier Transformation) and IDFT (Inverse Discrete Fourier Transformation) in a receiver such as OFDM (Orthogonal Frequency Division Multiplexing) like a wireless LAN standard IEEE 802.11a,g,n or SC-FDE (Single Carrier Frequency Domain Equalizer) like the WiGig.

Correction of a phase error caused between a transmitter and a receiver due to a residual carrier frequency offset and a residual symbol synchronization shift in a wireless communication apparatus of this kind will be described below.

Figure 32:
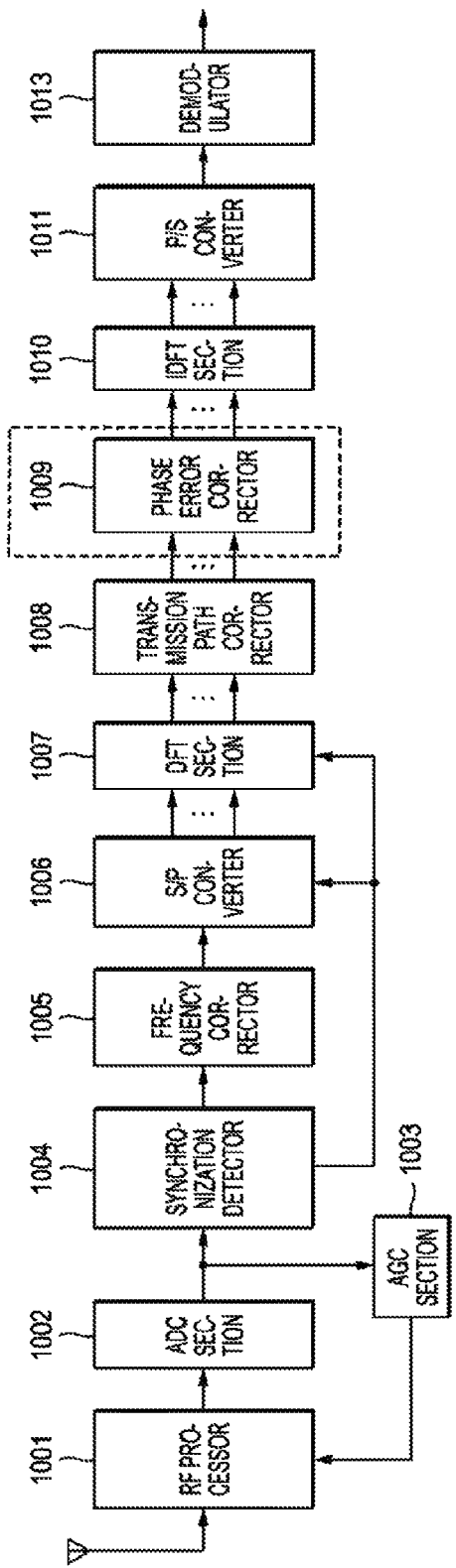
FIG. 32 A block diagram showing the structure of a receiver of a wireless communication apparatus compliant with the WiGig.

FIG. 32 is a block diagram showing the structure of a receiver of a wireless communication apparatus compliant with the WiGig. The wireless communication apparatus shown in FIG. 32 has an RF (radio frequency) processor 1001, an ADC (Analog-Digital Converter) section 1002, an AGC (Auto Gain Controller) section 1003, a synchronization detector 1004, a frequency corrector 1005, an S/P (serial-parallel) converter 1006, a DFT section 1007, a transmission path corrector 1008, a phase error corrector 1009, an IDFT section 1010, a P/S (parallel-serial) converter 1011 and a demodulator 1013.

The RF processor 1001 converts a received signal of a radio frequency received by the antenna into a baseband signal which is a complex signal. The ADC section 1002 periodically samples the baseband signal which is the complex signal and converts it into a digital complex baseband signal. The AGC section 1003 controls the gain of the signal amplification in the RF processor 1001 so that the output signal level of the RF processor 1001 is maintained constant.

The synchronization detector 1004 detects the known preamble signal for synchronization (STF described later) from the complex baseband signal. The frequency corrector 1005 calculates the error of the carrier frequency by using the known preamble signal (STF described later), and performs rough carrier frequency offset correction. The S/P converter 1006 converts the complex baseband signal which is a serial signal into a parallel signal. The DFT section 1007 converts the complex baseband signal in the time domain having undergone the rough carrier frequency offset correction, into a complex signal in the frequency domain after rough symbol synchronization according to the timing of the preamble signal detected by the synchronization detector 1004.

The transmission path corrector 1008 corrects the transmission path error between the transmitter and the receiver by using the known preamble signal (CEF described later). The phase error corrector 1009 corrects, by using the known reference signal (GI described later), the residual phase error caused by the residual carrier frequency offset and the residual symbol synchronization shift.

The IDFT section 1010 converts the phase-error-corrected signal in the frequency domain outputted from the phase error corrector 1009, into a complex baseband signal in the time domain. The P/S converter 1011 converts the parallel signal which is the output of the IDFT section 1010, into a serial signal. The demodulator 1013 demodulates a digitally modulated signal by using the complex baseband signal converted into the time domain by the IDFT section 1010.

Figure 33:
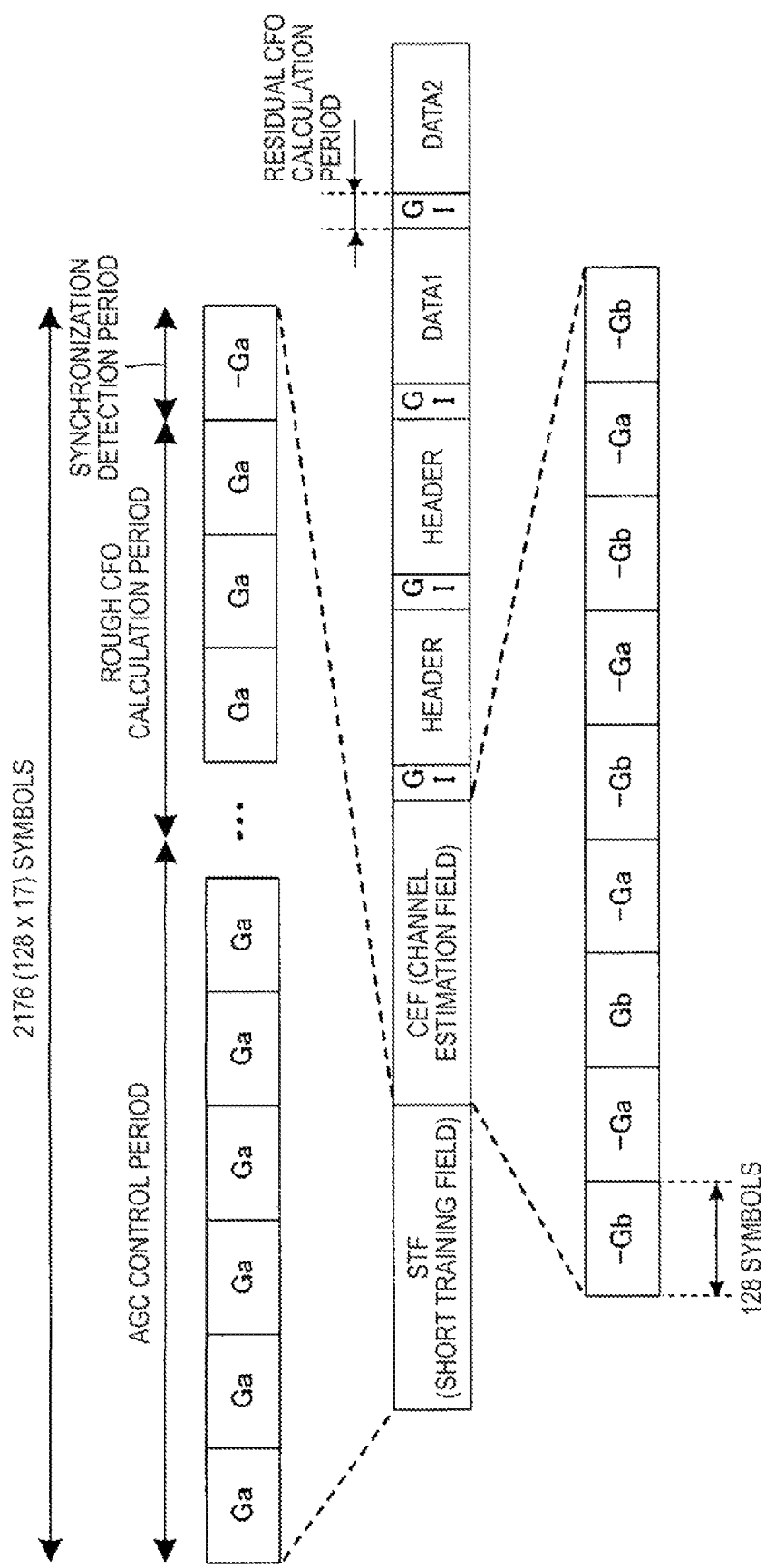
FIG. 33 A view showing a signal format of the WiGig.

FIG. 33 is a view showing a signal format of the WiGig. The signal transmitted in a WiGig wireless communication system has, from the head, an STF (Short Training Field), a CEF (Channel Estimation Field), a GI (Guard Interval), a header (Header), . . . , and data portions (Data1, Data2, . . . ). Here, an STF and a CEF are provided as preamble signals.

The STF is the repetition of 17 times of a known preamble signal Ga (128 symbols) used in the AGC section 1003, the synchronization detector 1004 and the frequency corrector 1005 of FIG. 32. During the AGC period from the head of the STF, an AGC operation by the AGC section 1003 is performed, and during the remaining rough CFO period, the calculation of the rough carrier frequency offset by the frequency corrector 1005 is performed. The last one symbol of the STF is a synchronization detection period when rough symbol synchronization is performed by the detection of the preamble signal by the synchronization detector 1004.

The CEF is the repetition of nine times of known preamble signals Ga, Gb (128 symbols), −Ga and −Gb different from the above-described STF used in the transmission path corrector 1008 of FIG. 32. Here, Ga and Gb are prescribed code strings.

The header contains information representative of the attributes of the transmission data such as the modulation method and the number of transmitted symbols. The data portions contain the data to be transmitted itself. The GI is a known reference signal different from the above-mentioned STF and CEF and repetitively inserted at regular time intervals in the header and the data portions. The GI is used as the residual CFO calculation period when the calculation of the residual carrier frequency offset by the phase error corrector 1009 is performed.

Next, the residual carrier frequency offset and the residual symbol synchronization shift corrected in the phase error corrector 1009 will be described. The carrier frequency offset is a phase error caused because the carrier frequency used when the complex baseband signal is orthogonally modulated in the RF processor of the transmitter (not shown) and the carrier frequency used for the orthogonal modulation in the RF processor 1001 of the receiver are subtly different.

The frequency corrector 1005 estimates the error of the carrier frequency (rough carrier frequency offset) to perform correction, and since an error is caused in the estimation of the carrier frequency offset because of the influence of the signal noise and the phase noise of the carrier, the phase error remains. This is the residual carrier frequency offset.

The residual symbol synchronization shift is a phase error caused because the sampling frequency of the DAC (Digital Analog Converter) section generating the complex baseband signal in the transmitter (not shown) and the sampling frequency of the ADC section 1002 of the receiver are subtly different. Because of the sampling frequency error between the transmitter and the receiver, even if phase error correction is performed in the earliest period, the symbol synchronization shift remains and accumulates with the lapse of time, and the symbol timing error increases. For this reason, it is necessary to correct the residual symbol synchronization shift while continuously updating the phase error correction value.

Figure 34:
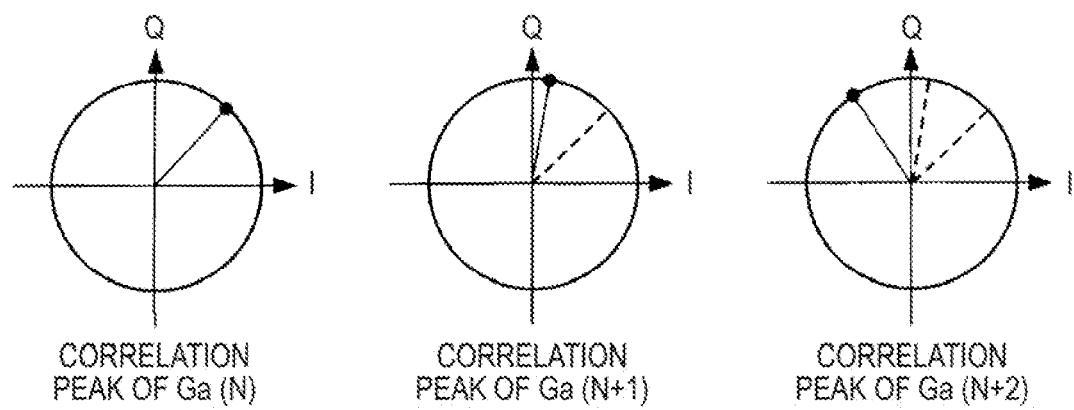
FIG. 34 A view showing the Ga mutual correlation peak in the STF.

A method of calculating the rough carrier frequency offset in the frequency corrector 1005 will be described. FIG. 34 is a view showing the Ga mutual correlation peak in the STF. FIG. 34 shows the mutual correlation peak of each of the N-th Ga (Ga(N)), the (N+1)-th Ga (Ga(N+1)) and (N+2)-th Ga (Ga(N+2)) represented on the complex IQ plane.

Between the mutual correlation peaks of the N-th Ga and the (N+1)-th Ga, a phase difference is present because of the carrier frequency offset, and similarly, between the correlation peaks of the (N+1)-th Ga and the (N+2)-th Ga, a phase difference is present. By averaging these two phase differences, the mean phase difference which is the noise component per 128 symbols that is rounded is calculated, and the phase difference per symbol is obtained. The phase difference per symbol is the rough carrier frequency offset. The larger the number of means when the phase difference is calculated is, the higher the precision of the obtained rough carrier frequency offset is.

Figure 35:
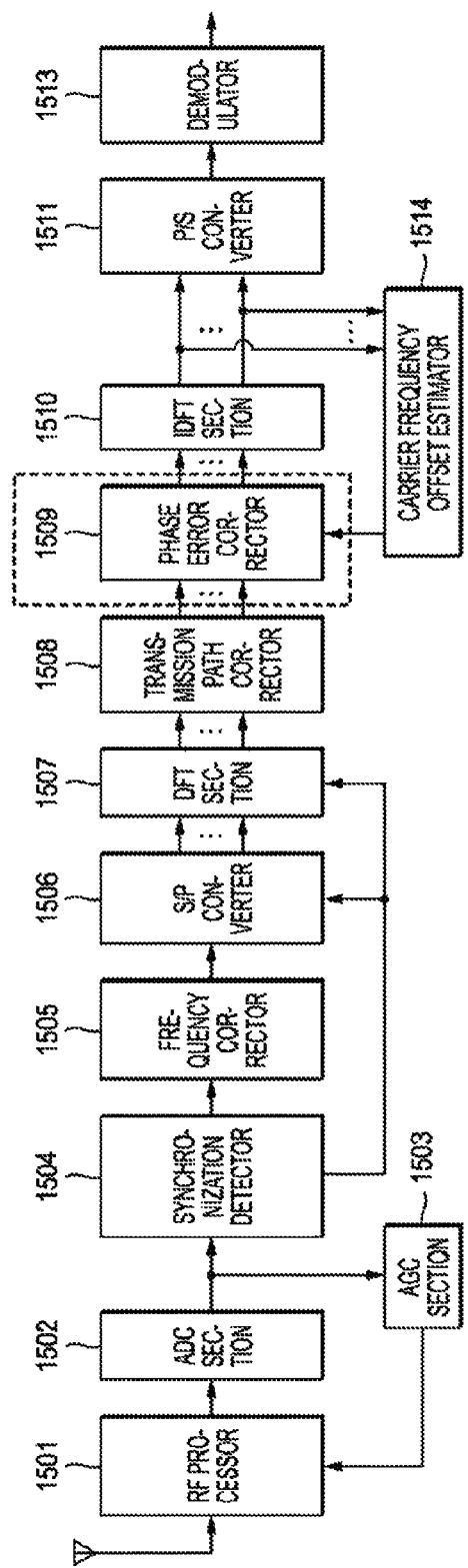
FIG. 35 A block diagram showing the structure of a receiver of a wireless communication apparatus using the conventional residual carrier frequency offset correction method.

Conventionally, a method is adopted where in order to correct the residual phase error, the calculated residual carrier frequency offset is fed back to the phase error corrector to perform correction as shown in the above-described Patent Documents 2 and 3. FIG. 35 is a block diagram showing the structure of a receiver of a wireless communication apparatus using the conventional residual carrier frequency offset correction method. In this conventional example, by a carrier frequency offset estimator 1514, the residual carrier frequency offset is calculated from the output of an IDFT section 1510, and the correction value is fed back to a phase error corrector 1509 to perform phase error correction. A structure is also available where the correction value is fed back to a frequency corrector 1505 or an RF processor 1501 to perform correction.

Figure 36:
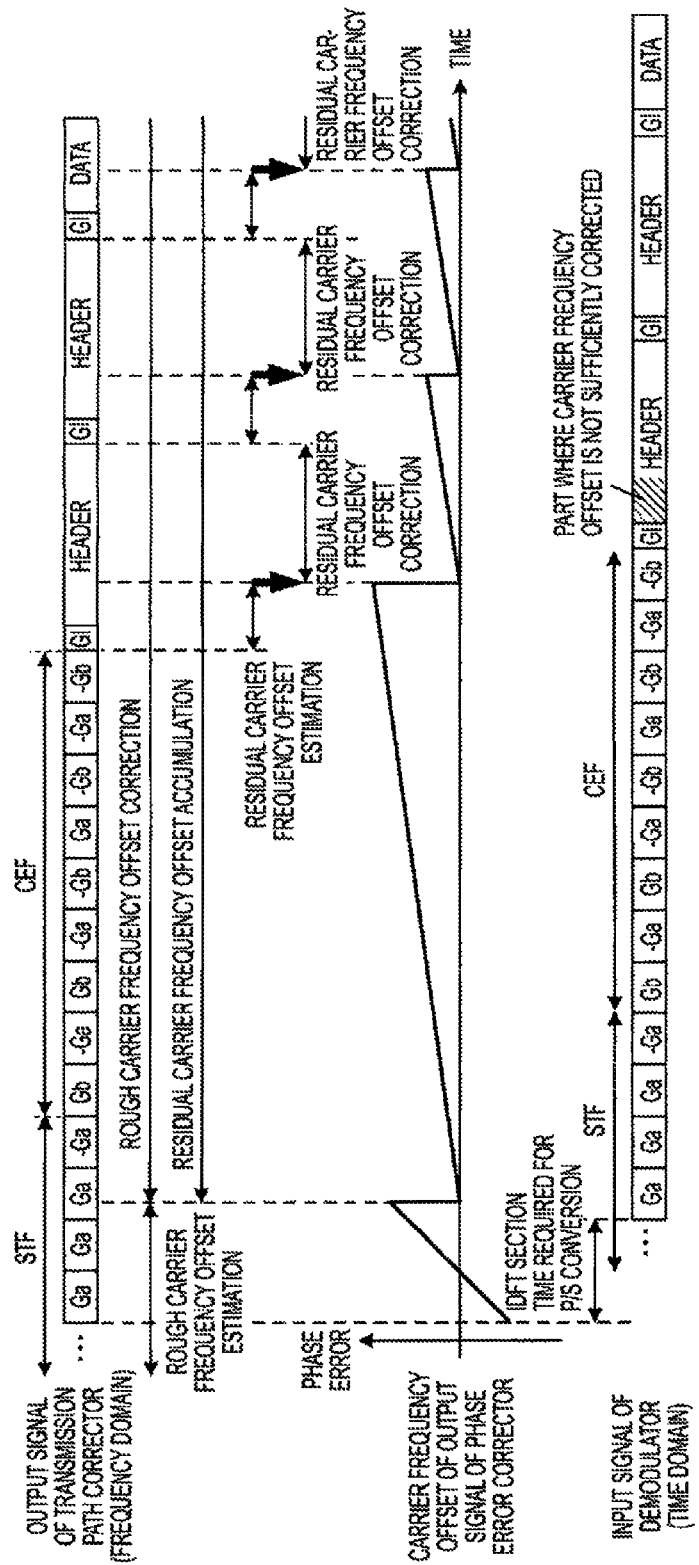
FIG. 36 A view showing the carrier frequency offset correction timing in the conventional example.

FIG. 36 is a view showing the carrier frequency offset correction timing in the conventional example. In the STF, the estimation (calculation) of the rough carrier frequency offset is performed, and after the calculation of the correction value, rough carrier frequency offset correction is performed. After the rough carrier frequency offset correction, the residual carrier frequency offset is accumulated. Thereafter, the estimation (calculation) of the residual carrier frequency offset is performed in the GI, and after the calculation of the correction value, the residual carrier frequency offset correction is performed.

In the conventional example, since the correction of the residual carrier frequency offset obtained by the first GI is reflected after the feedback, the correction processing is sometimes too late for the header. In particular, when the residual carrier frequency offset is large, since there is no timing of the residual carrier frequency offset correction during the period of the CEF, a problem arises in that the header cannot be correctly demodulated. Factors that increase the residual carrier frequency offset include a low SNR (Signal-to-Noise Ratio), the phase noise of the carrier, and reduction in calculation precision due to the number of means of Ga in the STF used for the calculation of the rough carrier frequency offset being small.

In the wireless LAN standard IEEE 802.11a, the STF period is 8 µs, whereas in the WiGig, the STF period is as short as 1.236 µs. In the wireless communication apparatus compliant with the WiGig shown in FIG. 32, for example, the RF processor 1001, and the ADC section 1002 and the subsequent elements are formed of different circuit chips. For this reason, the loop of the RF processor 1001, the ADC section 1002 and the AGC section 1003 performing the AGC operation takes time to transmit and receive signals and uses much of the 1.236 µs of the STF period. Since the number of means of Ga in the STF used for the calculation of the rough carrier frequency offset is small because of this, the precision of the rough carrier frequency offset calculation is low and phase noise of the carrier is caused, so that the residual carrier frequency offset is large.

As described above, particularly in the wireless communication system such as the WiGig performing high-speed transmission, if the residual carrier frequency offset correction by the feedback as in the conventional example is performed, a period when correction is not performed in a predetermined time occurs because of the time required for the phase error calculation. For this reason, the residual carrier frequency offset correction is too late for the header head of the received data, so that the header cannot be correctly demodulated.

In view of the above-mentioned problem, the present disclosure provides a reception apparatus and a phase error correction method and apparatus where the carrier frequency offset can be appropriately corrected even at the header and the received data including the header can be correctly demodulated.

Other Embodiments of the Present Disclosure

Hereinafter, embodiments according to the present disclosure will be described in detail with reference to the drawings. The reception apparatus, the phase error correction method and the phase error correction apparatus according to the present disclosure are implemented in wireless communication apparatuses of the embodiments. In the drawings used in the following description, the same elements are denoted by the same reference numerals and signs and overlapping descriptions are omitted.

Sixth Embodiment

Figure 37:
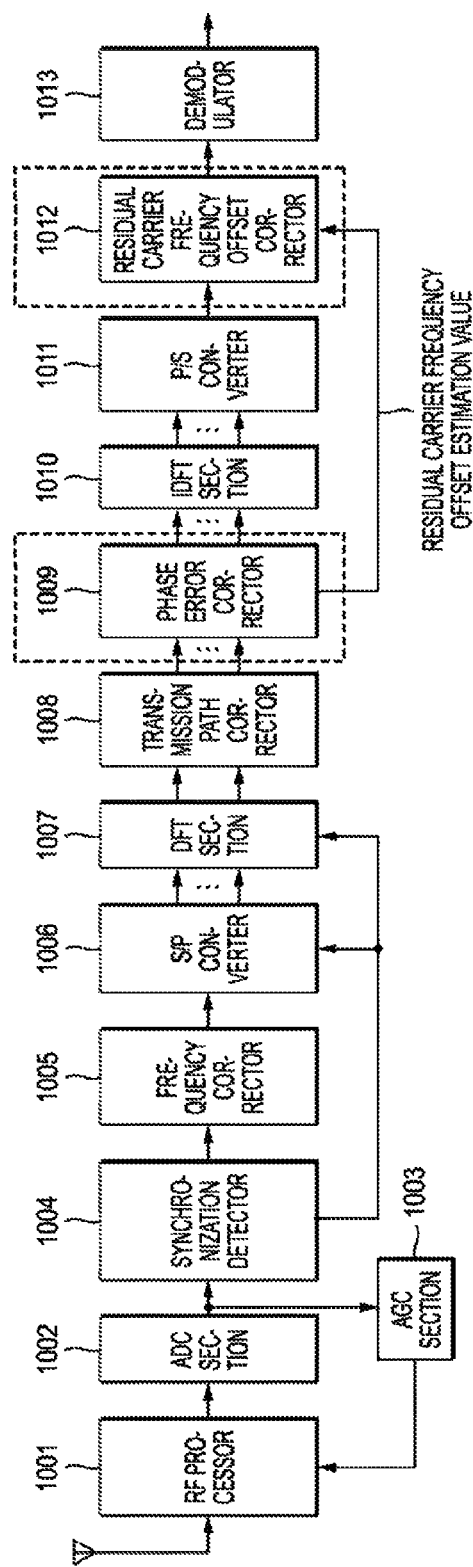
FIG. 37 A block diagram showing the structure of a receiver of a wireless communication apparatus in a sixth embodiment.

FIG. 37 is a block diagram showing the structure of a receiver of a wireless communication apparatus in a sixth embodiment of the present disclosure. The wireless communication apparatus of the sixth embodiment has the RF processor 1001, the ADC section 1002, the AGC section 1003, the synchronization detector 1004, the frequency corrector 1005, the S/P converter 1006, the DFT section 1007, the transmission path corrector 1008, the phase error corrector 1009, the IDFT section 1010, the P/S converter 1011, a residual carrier frequency offset corrector 1012 and the demodulator 1013.

The RF processor 1001 amplifies a received signal of a radio frequency received by the antenna, and performs orthogonal modulation thereon to convert it into a baseband signal. The baseband signal having undergone the orthogonal modulation is a complex signal.

The ADC section 1002 periodically samples the signal having undergone the orthogonal modulation in the RF processor 1001, and converts it into a digital complex baseband signal.

The AGC section 1003 calculates the amplitude of the digital complex baseband signal, and controls the gain of the signal amplification in the RF processor 1001 so that the output signal level of the RF processor 1001 is maintained constant. The AGC operation is performed during the period of the known preamble signal (STF).

The synchronization detector 1004 detects the known preamble signal for synchronization (STF) from the complex baseband signal, and outputs a timing signal for synchronization. The preamble signal is used for window synchronization, that is, rough symbol synchronization of the DFT section 1007.

The frequency corrector 1005 calculates the rough carrier frequency offset as the carrier frequency error by using the known preamble signal (STF), and outputs a complex baseband signal obtained by correcting the rough carrier frequency offset.

The S/P converter 1006 which is a buffer for operating the DFT section 1007 converts the complex baseband signal which is a serial signal into a parallel signal. The DFT section 1007 which corresponds to an example of a time-frequency converter performs time-frequency conversion according to the timing of the STF detected by the synchronization detector 1004 with respect to the complex baseband signal in the time domain having undergone the rough carrier frequency offset correction, and outputs a complex signal in the frequency domain.

The transmission path corrector 1008 calculates the amplitude and the phase which are transmission characteristics possessed by the transmission path between the transmitter and the receiver, by using the known preamble signal (CEF), and corrects the transmission path error.

The phase error corrector 1009 calculates the residual carrier frequency offset and the residual symbol synchronization shift by using the periodically inserted known reference signal (GI) as the specific reference signal, and corrects the phase error due to the residual symbol synchronization shift in the frequency domain.

The IDFT section 1010 which corresponds to an example of the frequency-time converter performs frequency-time conversion of the output signal of the phase error corrector 1009, and converts it into a complex baseband signal in the time domain.

The P/S converter 1011 converts the parallel signal which is the output of the IDFT section 1010, into a serial signal.

The residual carrier frequency offset corrector 1012 corrects the residual carrier frequency offset in the time domain by using the residual carrier frequency offset estimation value calculated by the phase error corrector 1009.

The demodulator 1013 demodulates a digitally modulated signal by using the complex baseband signal converted into the time domain and having undergone the residual phase error correction, and obtains the received data.

In the above-described structure, the synchronization detector 1004, the frequency corrector 1005, the S/P converter 1006, the DFT section 1007, the transmission path corrector 1008, the phase error corrector 1009, the IDFT section 1010, the P/S converter 1011, the residual carrier frequency offset corrector 1012 and the demodulator 1013 can be implemented as an information processing circuit including a processor and a memory, and the functions can be realized by operating a software program in the processor to execute predetermined processing.

In the present embodiment, in the phase error corrector 1009, the residual carrier frequency offset is calculated from the received signal converted into the frequency domain by the DFT section 1007 and corrected by the transmission path corrector 1008. Then, the calculated residual carrier frequency offset estimation value is supplied to the residual carrier frequency offset corrector 1012 by feedforward, and residual carrier frequency offset correction is performed on the received signal converted into the time domain by the IDFT section 1010.

Figure 38:
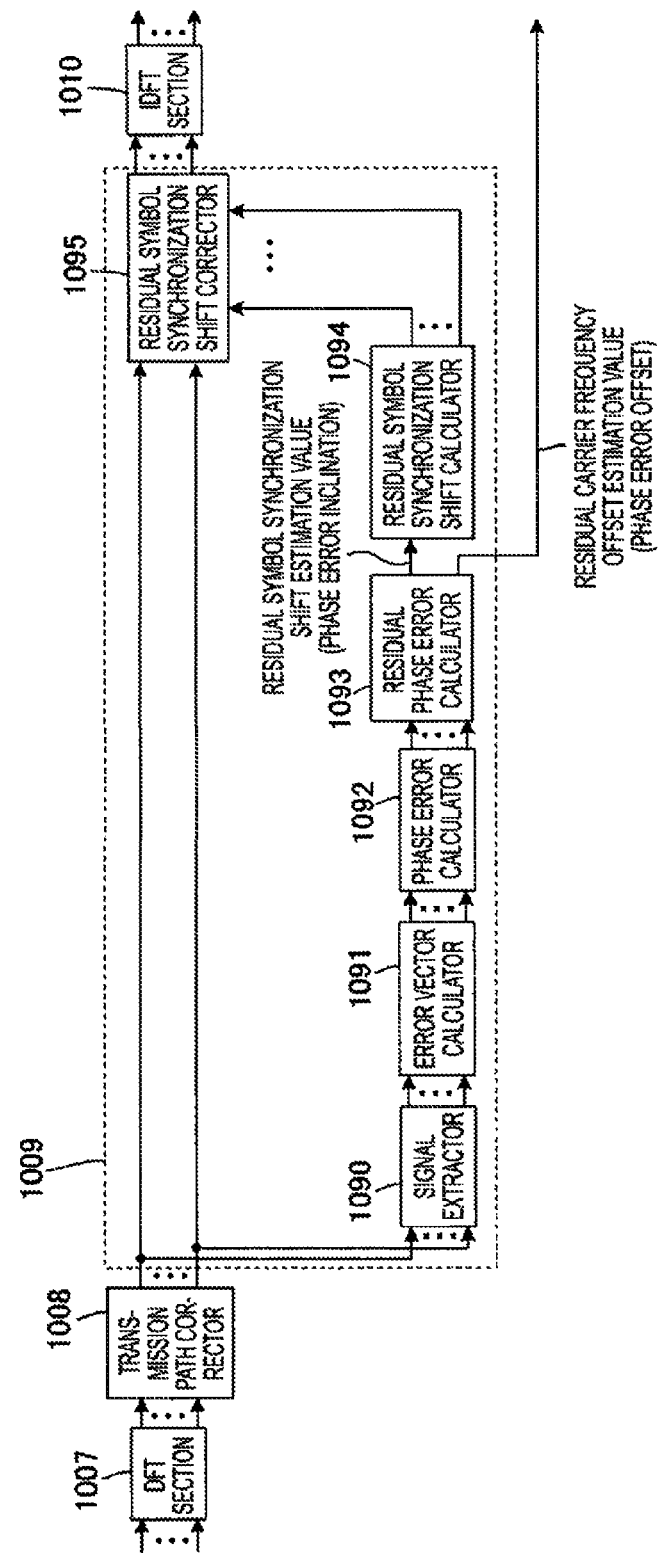
FIG. 38 A block diagram showing the structure of a phase error corrector in the sixth embodiment.

FIG. 38 is a block diagram showing the structure of the phase error corrector 1009 in the sixth embodiment. The phase error corrector 1009 has a signal extractor 1090, an error vector calculator 1091, a phase error calculator 1092, a residual phase error calculator 1093, a residual symbol synchronization shift calculator 1094 and a residual symbol synchronization shift corrector 1095.

In the signal extractor 1090, in the frequency domain, the periodically and repetitively received reference signal (GI) (corresponding to an example of the received reference signal) is extracted from the received signal. In the error vector calculator 1091, the reference signal extracted from the received signal and the known reference signal (GI) to be transmitted (corresponding to an example of the transmitted reference signal) are compared, and a plurality of error vectors due to the difference therebetween are calculated. In the phase error calculator 1092, the error vectors obtained in the error vector calculator 1091 are converted into phases, and phase errors are calculated.

In the residual phase error calculator 1093, phase error estimation by linear approximation is performed from the phase errors obtained in the phase error calculator 1092, and the phase error offset and the phase error inclination are calculated. Here, the phase error inclination is calculated as the residual symbol synchronization shift, and the phase error offset, as the residual carrier frequency offset. In the residual symbol synchronization shift calculator 1094, the phase error estimation value at each frequency is calculated from the phase error inclination obtained in the residual phase error calculator 1093.

In the residual symbol synchronization shift corrector 1095, the residual symbol synchronization shift of the frequency is corrected by using the phase error estimation value calculated in the residual phase error calculator 1093.

The phase error offset obtained in the residual phase error calculator 1093 corresponds to the residual carrier frequency offset, and this residual carrier frequency offset estimation value is supplied to the residual carrier frequency offset corrector 1012.

Next, the operation of the phase error corrector 1009 in the present embodiment will be described in more detail.

In the signal extractor 1090, the reference signal GI is extracted from the received signal, and the spectrum shown in FIG. 7 where the reference signal GI of 64 symbols is Fourier-transformed is obtained. Here, the frequency number is the number representative of each frequency where 27.5 MHz which is the quotient when 1.76 GHz (−880 MHz to +880 MHz) which is the symbol rate of the WiGig standard is divided by 64 symbols is one unit.

Of the spectrum in the frequency domain, particularly, one with a high absolute value is high in noise tolerance, and is hardly affected by phase noise. Therefore, here, as an example, a spectrum of a predetermined number (eight symbols in the illustrated example) in decreasing order of the absolute value of the amplitude is used as the representative value, and the frequency numbers −25, −22, −10 and −7, and 8, 13, 19 and 24 shown by black circles in FIG. 7 are further extracted.

Figure 39:
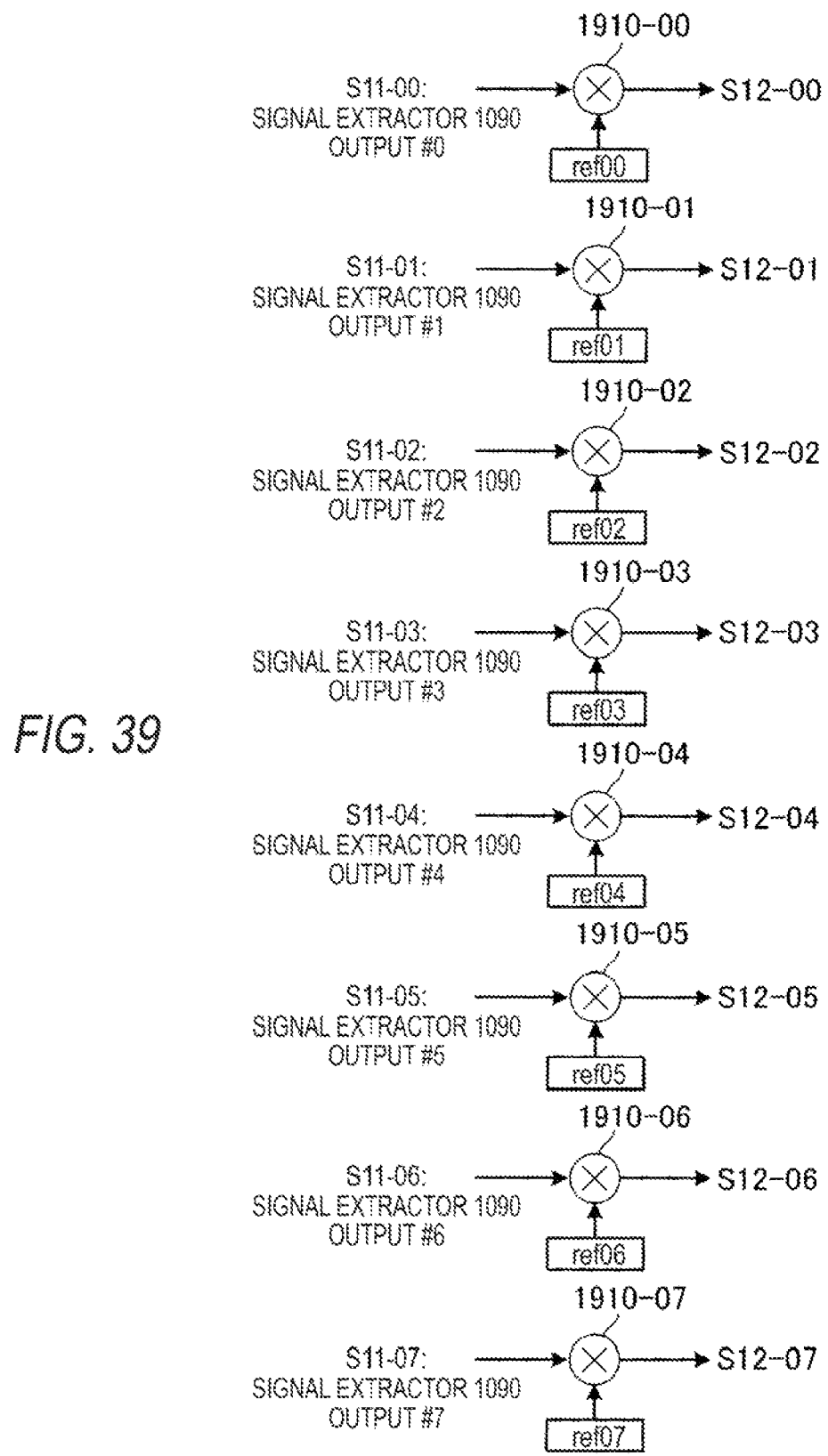
FIG. 39 A view showing the structure of an error vector calculator.

FIG. 39 is a view showing the structure of the error vector calculator 1091. The error vector calculator 1091 has complex multipliers 1910-00 to 1910-07. Here, since the error vectors of the reference signals GI are calculated for eight frequencies, eight systems of circuits are provided in parallel. To calculate the error vectors, the reference signal extracted from the received signal and the known reference signal to be transmitted are compared by using the complex multipliers 1910-00 to 1910-07.

The complex multipliers 1910-00 to 1910-07 are supplied with coefficients ref00 to ref07 of the known reference signal serving as the reference, respectively, and the values S11-00 to S11-07 of the reference signals GI of the frequencies extracted in the signal extractor 90 and the coefficients ref00 to ref07 are complex-multiplied for the frequencies, respectively. The coefficients ref00 to ref07 are conjugate complex numbers of the known reference signal, and by performing the complex multiplication, error vectors S12-00 to S12-07 with the periodically received reference signal are obtained. By previously adding a weighting coefficient to the coefficients, the magnitudes of the error vectors can be made the same.

Figure 40:
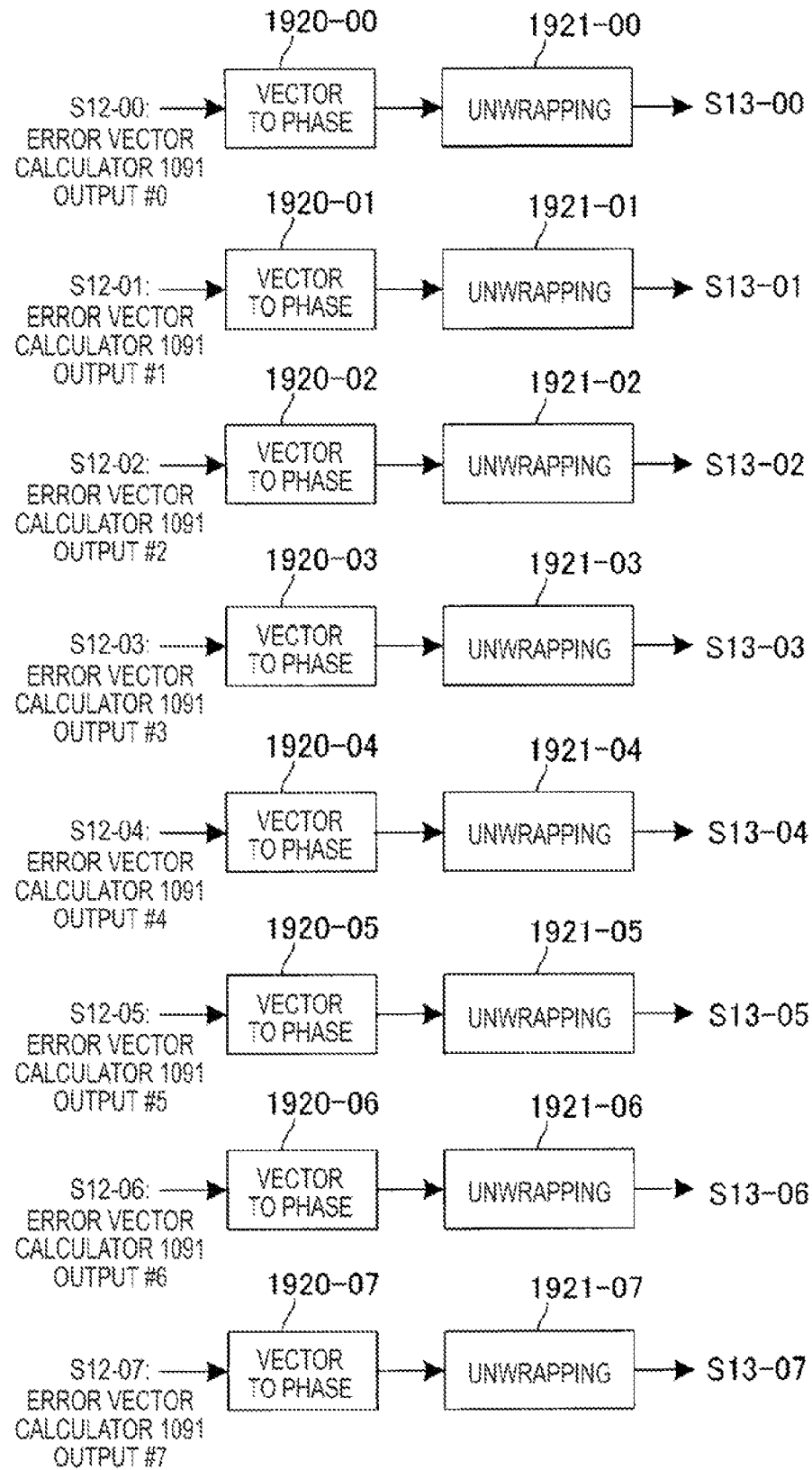
FIG. 40 A view showing the structure of a phase error calculator.

FIG. 40 is a view showing the structure of the phase error calculator 1092. The phase error calculator 1092 has vector-phase converters 1920-00 to 1920-07 and unwrapping sections 1921-00 to 1921-07. Here, since phase errors are calculated for eight frequencies, eight systems of circuits are provided in parallel.

In the vector-phase converters 1920-00 to 1920-07, the error vectors S12-00 to S12-07 obtained in the error vector calculator 1091 are converted into phases. The vector-phase conversion can be realized, for example, by the arctan calculation or the CORDIC.

In the unwrapping sections 1921-00 to 1921-07, phase unwrapping processing is performed to calculate phase errors S13-00 to S13-07. Here, when the phase is 2π+α, it is prevented from appearing as −2π+α, and the phase expression range is increased such as 2π+α by returning the phase. The same applies when the phase is −2π−α. The phase unwrapping processing can be implemented by using a generally known method by phase calculation.

In the residual phase error calculator 1093 in FIG. 38, linear approximation is performed based on the phase errors obtained in the phase error calculator 1092, and a phase error offset S14b and a phase error inclination S14a are calculated. For the linear approximation, for example, the LSM (Least Squares Method) is used. The LSM processing can be realized by using a generally known method by approximation.

Figure 41:
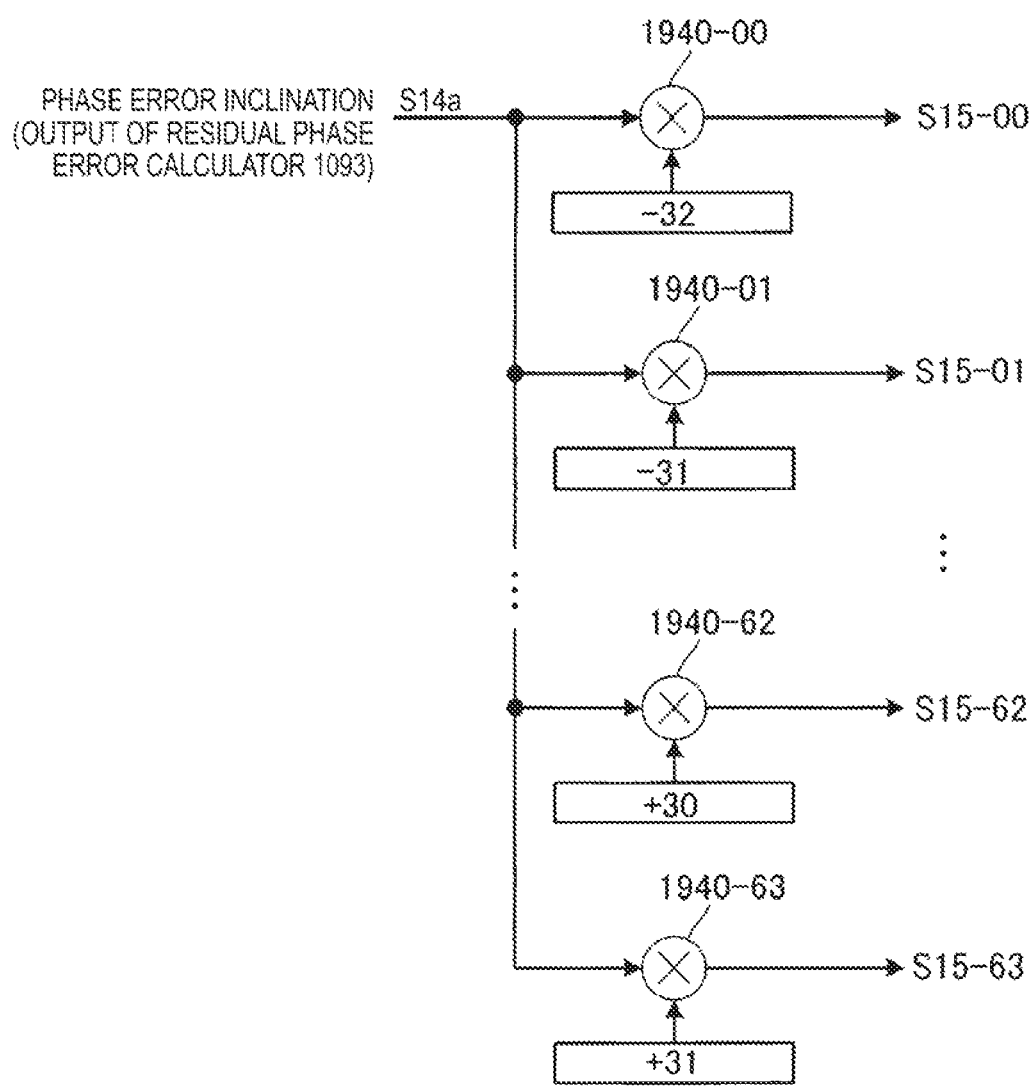
FIG. 41 A view showing the structure of a residual symbol synchronization shift calculator.

FIG. 41 is a view showing the structure of the residual symbol synchronization shift calculator 1094. The residual symbol synchronization shift calculator 1094 has multipliers 1940-00 to 1940-63. Here, since the residual symbol synchronization shift estimation value is calculated for 64 (64 symbols of the original GI) frequencies, 64 systems of circuits are provided in parallel. From the linearity of the phase error shown in FIG. 3, the phase error (residual symbol synchronization shift estimation value) of each frequency is obtained from the phase error inclination.

In the multipliers 1940-00 to 1940-63, in order to calculate the residual symbol synchronization shift estimation value of each frequency number, the phase error inclination S14a obtained in the residual phase error calculator 1093 is multiplied by a coefficient corresponding to each frequency. The coefficients of the multiplication are frequency numbers −32 to +31. By this coefficient multiplication, the phase errors S15-00 to S15-063 of the frequencies are calculated.

Figure 42:
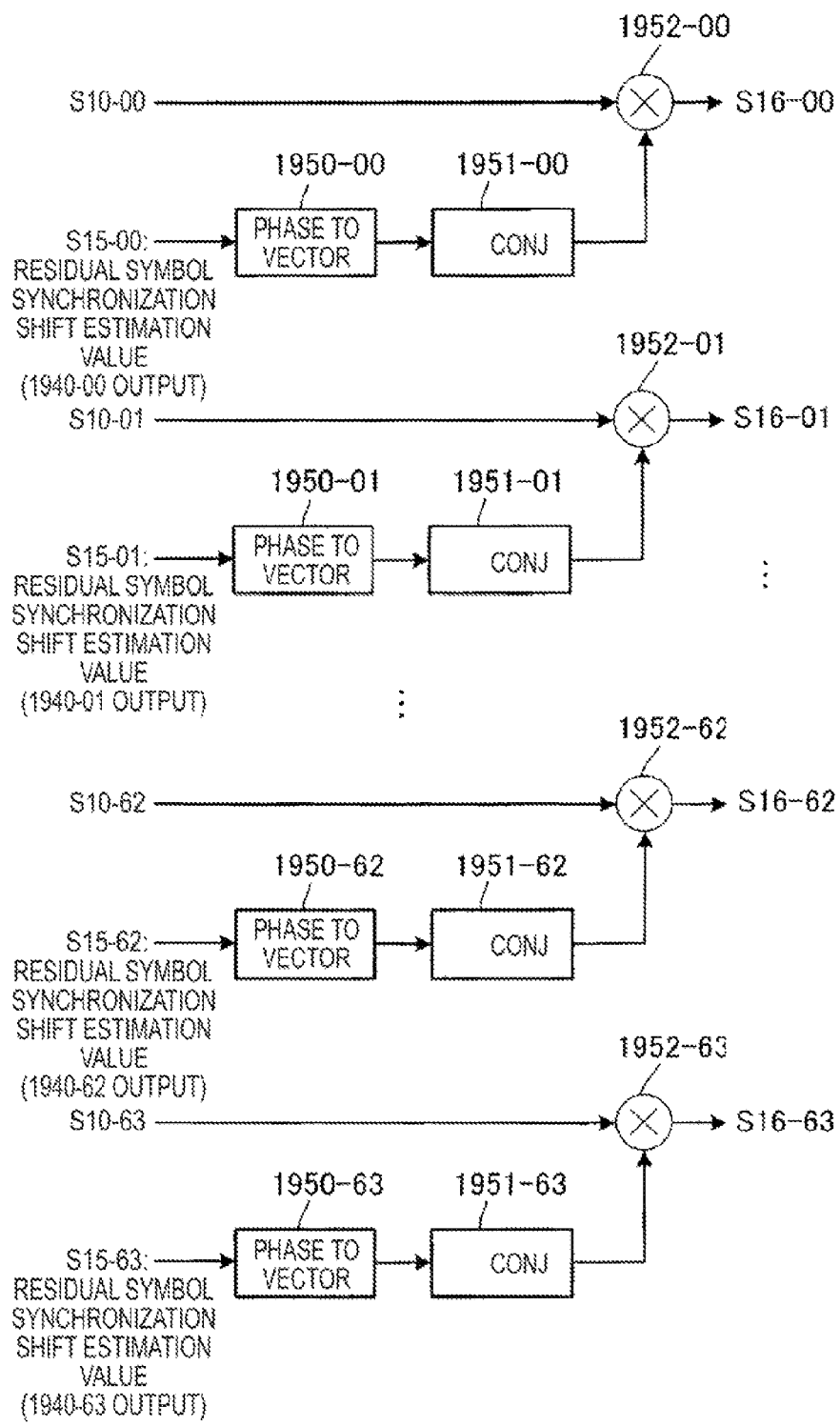
FIG. 42 A view showing the structure of a residual symbol synchronization shift corrector.

FIG. 42 is a view showing the structure of the residual symbol synchronization shift corrector 1095. The residual symbol synchronization shift corrector 1095 has phase-vector (phase to vector) convertors 1950-00 to 1950-63, conjugate (conj) convertors 1951-00 to 1951-63 and complex multipliers 1952-00 to 1952-63. Here, since the residual symbol synchronization shift is corrected for 64 (64 symbols of the original GI) frequencies, 64 systems of circuits are provided in parallel.

In the phase-vector converters 1950-00 to 1950-63, the phase errors (residual symbol synchronization shift estimation values) S15-00 to S15-63 of the frequencies obtained in the residual symbol synchronization shift calculator 1094 are converted into complex vectors. In the conjugate converters 1951-00 to 1951-63, the complex vectors of the residual symbol synchronization shift estimation values are converted into conjugate complex numbers. In the complex multipliers 1952-00 to 1952-63, received signals S10-00 to S10-63 in the frequency domain having undergone transmission path error correction by the transmission path corrector 1008 are multiplied by the conjugate complex vectors of the residual symbol synchronization shift estimation values. Thereby, the phases of the received signals are reversed, the residual symbol synchronization shifts are corrected, and signals S16-00 to S16-63 having undergone the correction are obtained. The phase-vector conversion can be realized by, for example, the tangent calculation or the CORDIC.

Figure 43:
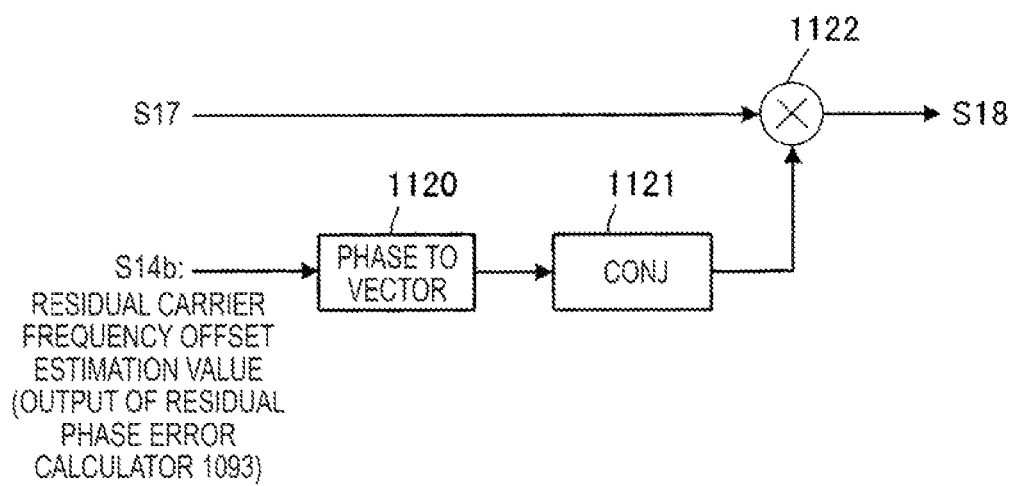
FIG. 43 A view showing the structure of a residual carrier frequency offset corrector.

FIG. 43 is a view showing the structure of the residual carrier frequency offset corrector 1012. The residual carrier frequency offset corrector 1012 has a phase-vector (phase to vector) convertor 1120, a conjugate (conj) convertor 1121 and a complex multiplier 1122. The residual carrier frequency offset corrector 1012 performs phase error correction in the time domain.

In the phase-vector converter 1120, the phase error offset S14b, that is, the residual carrier frequency offset estimation value obtained in the residual phase error calculator 1093 is converted into a complex vector. In the conjugate converter 1121, the complex vector of the residual carrier frequency offset estimation value is converted into a conjugate complex number. In the complex multiplier 1122, a received signal S17 in the time domain is multiplied by the conjugate complex vector of the residual carrier frequency offset estimation value. Thereby, the phase of the received signal S17 in the time domain is rotated, the residual carrier frequency offset is corrected, and a signal S18 having undergone the correction is obtained. The phase-vector conversion can be realized by, for example, the tangent calculation or the CORDIC.

Figure 44:
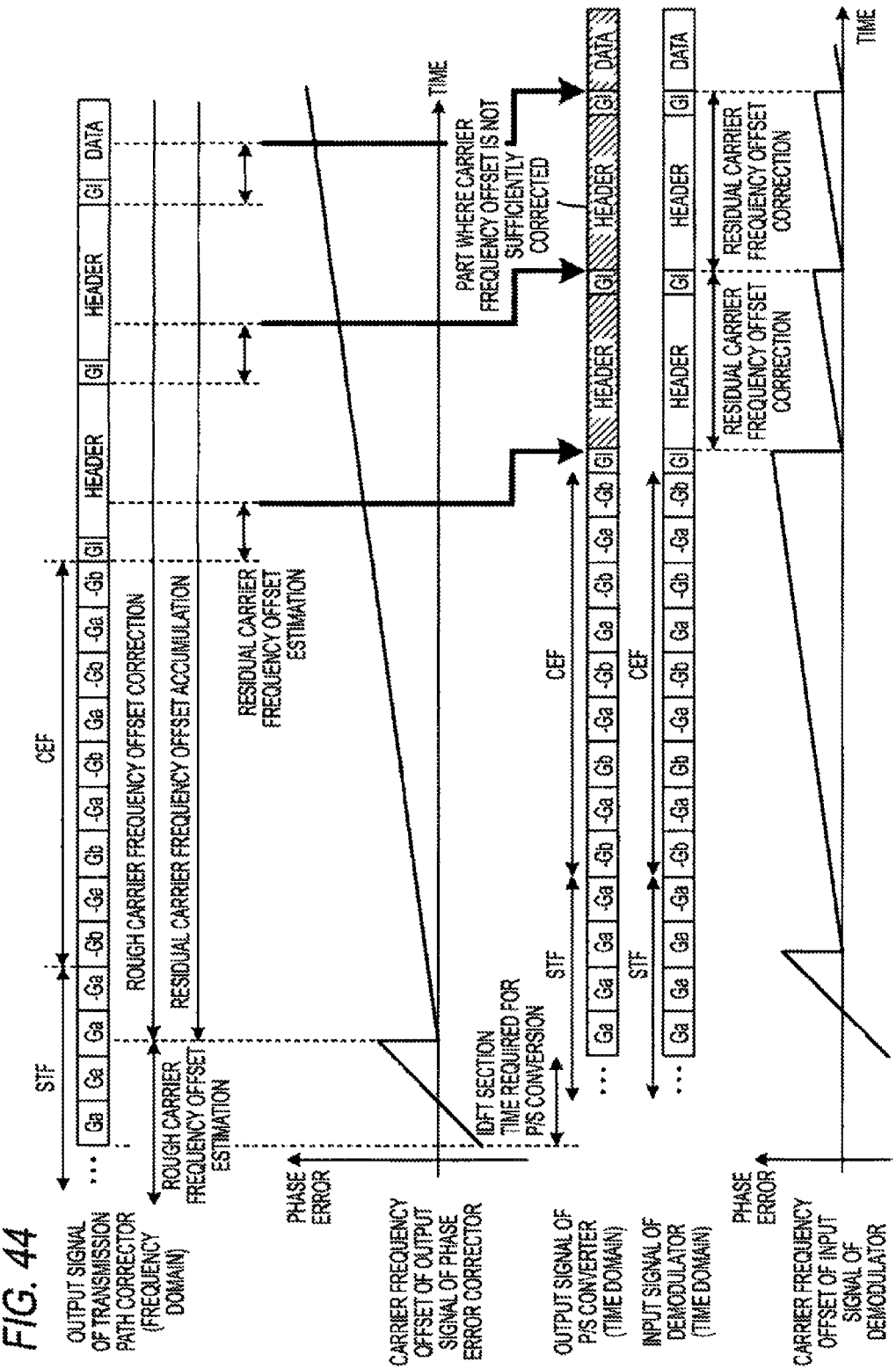
FIG. 44 A view showing the carrier frequency offset correction timing in the present embodiment.

FIG. 44 is a view showing the carrier frequency offset correction timing in the present embodiment. In the STF, the estimation (calculation) of the rough carrier frequency offset is performed by the frequency corrector 1005, and after the calculation of the correction value, rough carrier frequency offset correction is performed. After the rough carrier frequency offset correction, the residual carrier frequency offset is accumulated. In the CEF, transmission path error correction is performed by the transmission path corrector 1008.

Thereafter, the estimation (calculation) of the residual carrier frequency offset is performed by the phase error corrector 1009 in the GI in front of the header, and the residual carrier frequency offset correction is performed by the residual carrier frequency offset corrector 1012.

In the present embodiment, by using the periodically and repetitively transmitted specific reference signal (reference signal GI), by the phase error corrector 1009, the specific reference signal (reference signal GI) is extracted from the received signal converted into the frequency domain and compared with the specific reference signal to be transmitted, whereby the phase error offset and the phase error inclination are calculated in the frequency domain. Based on the calculated phase error inclination, residual symbol synchronization shift correction is performed in the frequency domain by the phase error corrector 9.

Moreover, the calculated phase error offset (residual carrier frequency offset estimation value) is supplied to the residual carrier frequency offset corrector 1012 as a phase rotation angle in the time domain, and the phase of the received signal converted to the time domain is rotated. That is, residual carrier frequency offset correction is performed in the time domain by the residual carrier frequency offset corrector 1012. Since the frequency-time conversion processing in the IDFT section 1010 takes time, the processing delay of the phase error correction can be eliminated by feed-forwarding the residual carrier frequency offset estimation value to the residual carrier frequency offset corrector 1012 and executing the residual carrier frequency offset correction in the time domain.

According to the present embodiment, even in a wireless communication system performing high-speed transmission, residual carrier frequency offset can be executed from the head of the header immediately succeeding the GI, so that the header can be correctly demodulated in the demodulator 1013. Consequently, even when the residual carrier frequency offset is large, the received data including the header can be correctly demodulated without the use of a signal delay buffer.

Seventh Embodiment

Figure 45:
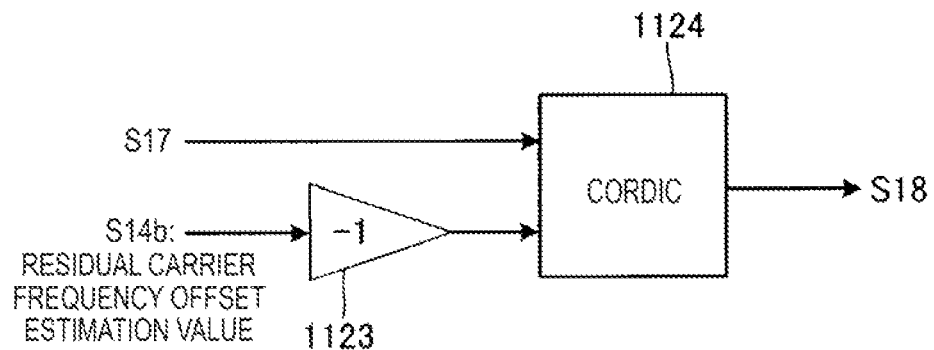
FIG. 45 A block diagram showing the structure of a residual carrier frequency offset corrector in a seventh embodiment.

FIG. 45 is a block diagram showing the structure of a residual carrier frequency offset corrector in a seventh embodiment of the present disclosure. The seventh embodiment is an example where the structure of the residual carrier frequency offset corrector 1012 is changed. The rest of the structure is similar to that of the sixth embodiment described above.

The residual carrier frequency offset corrector 1012 of the seventh embodiment has a gain multiplicator 1123 and a CORDIC section 1124. In the gain multiplicator 1123, the phase error offset S14b, that is, the residual carrier frequency offset estimation value obtained in the residual phase error calculator 1093 is multiplied by −1. In the CORDIC section 1124, the phase of the received signal S17 in the time domain is rotated by the residual carrier frequency offset estimation value multiplied by −1, and the residual carrier frequency offset is corrected.

In the seventh embodiment, functions similar to those of the sixth embodiment can be realized, and the header can be correctly demodulated also in a wireless communication system performing high-speed transmission.

Eighth Embodiment

Figure 46:
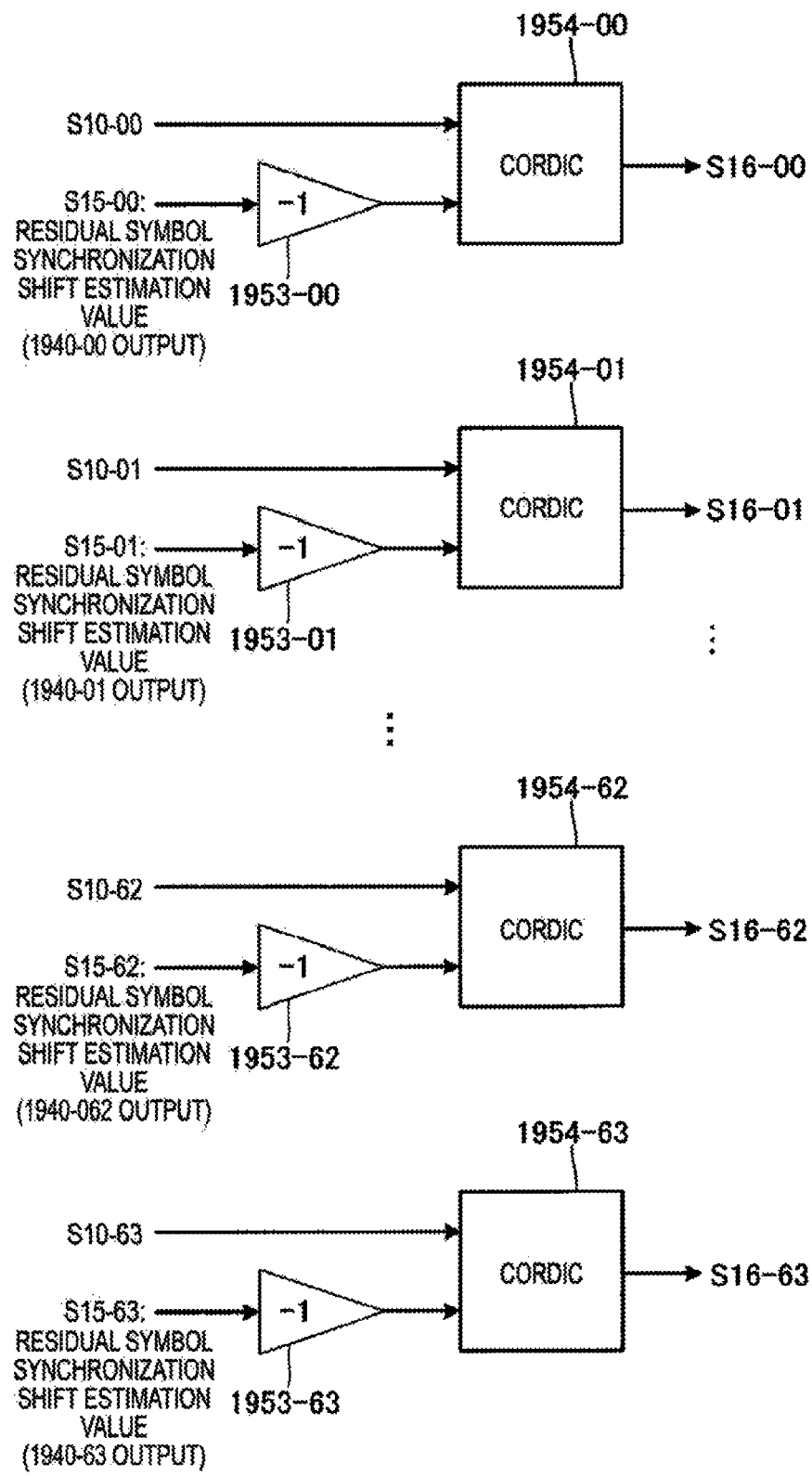
FIG. 46 A block diagram showing the structure of a residual symbol synchronization shift corrector in an eighth embodiment.

FIG. 46 is a block diagram showing the structure of a residual symbol synchronization shift corrector in an eighth embodiment of the present disclosure. The eighth embodiment is an example where the structure of the residual symbol synchronization shift corrector 1095 is changed. The rest of the structure is similar to that of the sixth embodiment described above.

The residual symbol synchronization shift corrector 1095 of the eighth embodiment has gain multiplicators 1953-00 to 1953-63 and CORDIC sections 1954-00 to 1954-63. In the gain multiplicators 1953-00 to 1953-63, the phase errors (residual symbol synchronization shift estimation values) S15-00 to S15-63 of the frequencies obtained in the residual symbol synchronization shift calculator 1094 are multiplied by −1. In the CORDIC sections 1954-00 to 1954-63, the phases of the received signals S10-00 to S10-63 in the frequency domain are rotated by the residual symbol synchronization shift estimation values of the frequencies multiplied by −1, and the residual symbol synchronization shifts are corrected.

In the eighth embodiment, functions similar to those of the sixth embodiment can be realized, and the header can be correctly demodulated also in a wireless communication system performing high-speed transmission.

Ninth Embodiment

Figure 47:
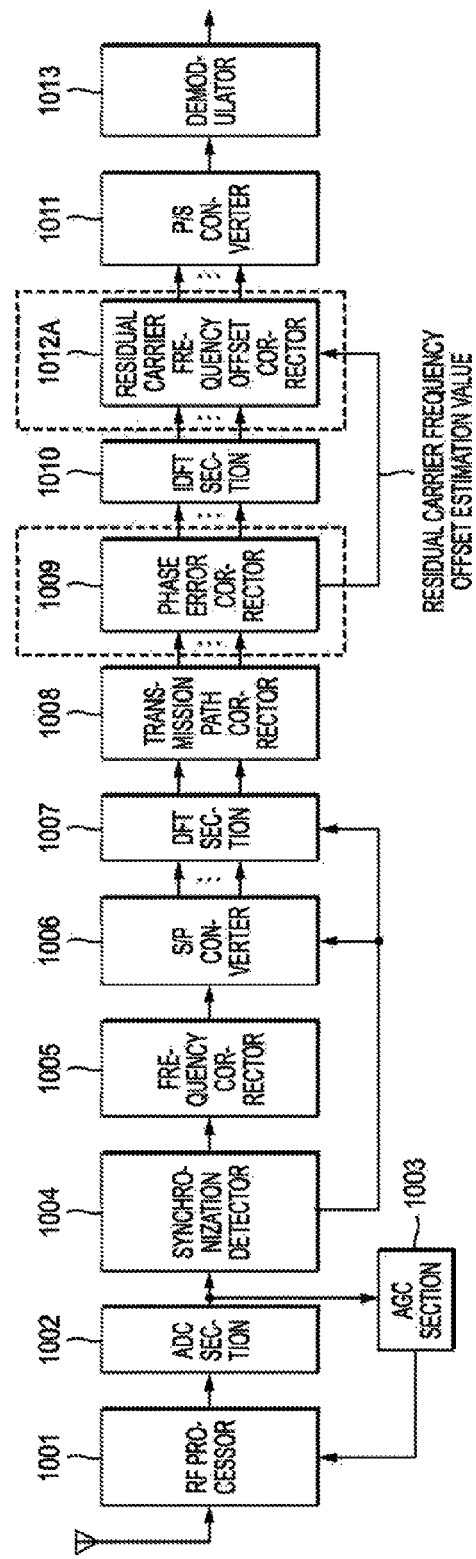
FIG. 47 A block diagram showing the structure of a receiver of a wireless communication apparatus in a ninth embodiment.

FIG. 47 is a block diagram showing the structure of a receiver of a wireless communication apparatus in a ninth embodiment of the present disclosure. The wireless communication apparatus of the ninth embodiment is a structure example where a residual carrier frequency offset corrector 1012A is provided between the IDFT section 1010 and the P/S converter 1011. The rest of the structure is similar to that of the sixth embodiment described above.

In this case, the residual carrier frequency offset corrector 1012A corrects the residual carrier frequency offsets of the received signals in the time domain by 64 parallel circuits. The structure of the residual carrier frequency offset corrector 1012A is such that 64 residual carrier frequency offset correctors 1012 of the structure of FIG. 43 or the structure of FIG. 45 are arranged in parallel.

In the ninth embodiment, functions similar to those of the sixth embodiment can be realized, and the header can be correctly demodulated also in a wireless communication system performing high-speed transmission.

Tenth Embodiment

Figure 48:
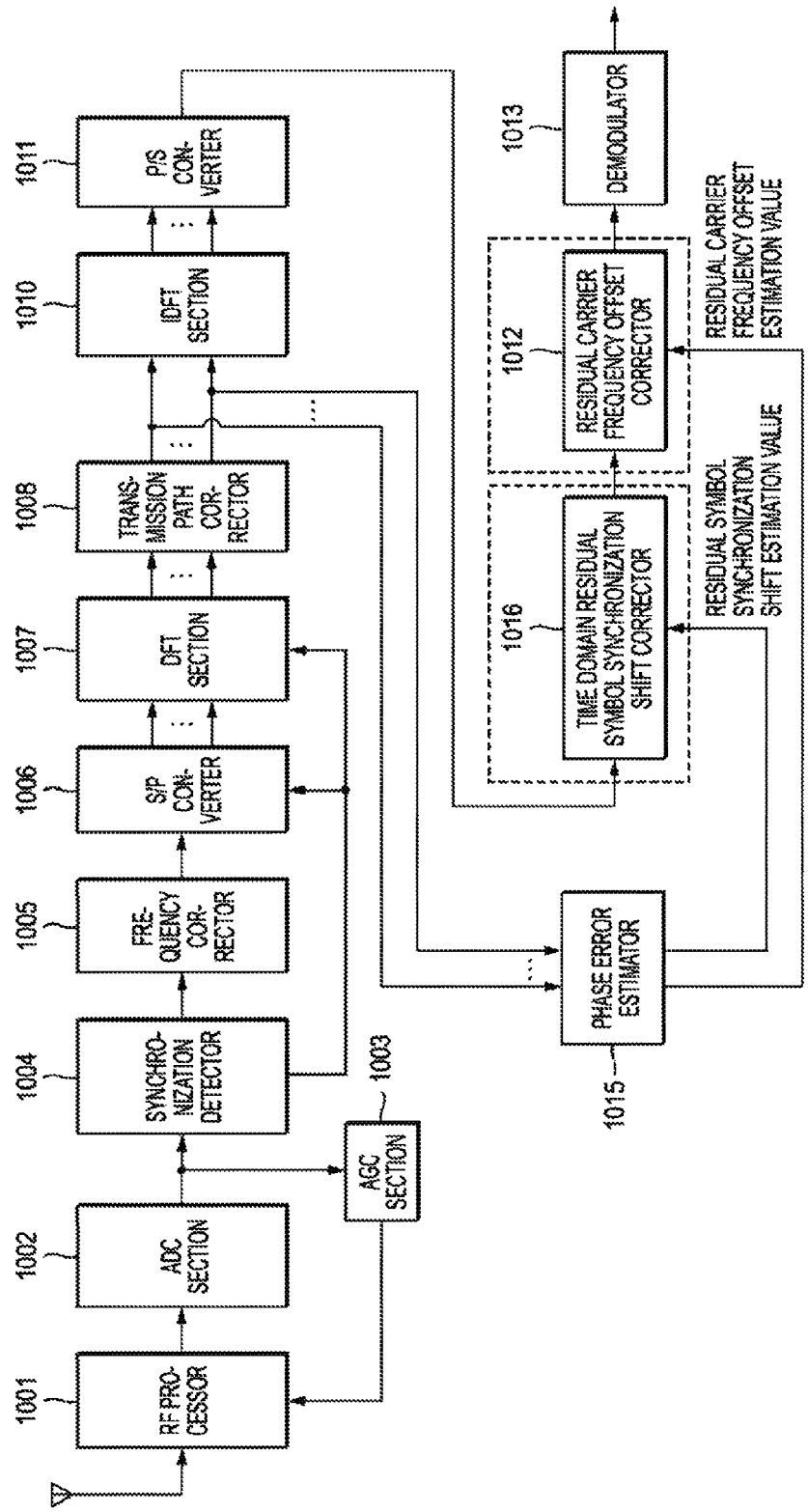
FIG. 48 A block diagram showing the structure of a receiver of a wireless communication apparatus in a tenth embodiment.

FIG. 48 is a block diagram showing the structure of a receiver of a wireless communication apparatus in a tenth embodiment of the present disclosure. The wireless communication apparatus of the tenth embodiment has a phase error estimator 1015 and a time domain residual symbol synchronization shift corrector 1016 instead of the phase error corrector 1009 in the sixth embodiment shown in FIG. 37.

The phase error estimator 1015 is connected between the transmission path corrector 1008 and the IDFT section 1010, and estimates (calculates) the residual symbol synchronization shift estimation value and the residual carrier frequency offset estimation value. The time domain residual symbol synchronization shift corrector 1016 is provided between the P/S converter 1011 and the residual carrier frequency offset corrector 1012, and performs residual symbol synchronization shift correction of the received signal in the time domain. The rest of the structure is similar to that of the sixth embodiment described above.

In the tenth embodiment, from the received signal converted to the frequency domain by the DFT section 1007, the residual symbol synchronization shift estimation value and the residual carrier frequency offset estimation value are calculated by the phase error estimator 1015. The residual symbol synchronization shift estimation value is supplied to the time domain residual symbol synchronization shift corrector 1016, the residual carrier frequency offset estimation value is supplied to the residual carrier frequency offset corrector 1012, and on the received signal converted to the time domain by the IDFT section 1010, residual symbol synchronization shift correction and residual carrier frequency offset correction are performed each in the time domain.

Figure 49:
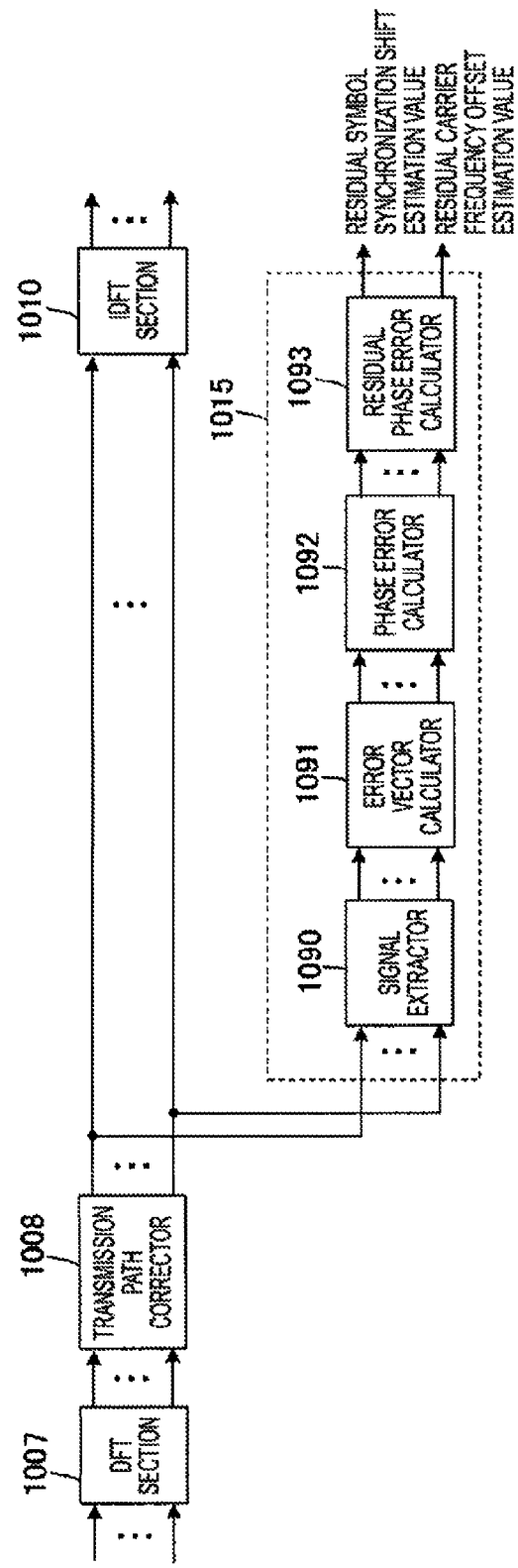
FIG. 49 A view showing the structure of a phase error estimator.

FIG. 49 is a view showing the structure of the phase error estimator 1015. The phase error estimator 1015 has the signal extractor 1090, the error vector calculator 1091, the phase error calculator 1092 and the residual phase error calculator 1093. That is, the phase error estimator 1015 has a structure where the residual symbol synchronization shift calculator 1094 and the residual symbol synchronization shift corrector 1095 are removed from the phase error corrector 1009 of the sixth embodiment. Therefore, detailed descriptions of the operations of the elements are omitted here.

In the phase error estimator 1015, for the reference signal GI extracted in the signal extractor 1090, the error vector is calculated in the error vector calculator 1091 and converted into a phase error in the phase error calculator 1092, and the phase error offset S14$b$ and the phase error inclination S14$a$ are calculated in the residual phase error calculator 1093. The phase error inclination S14$a$ is outputted as the residual symbol synchronization shift estimation value, and the phase error offset S14$b$, as the residual carrier frequency offset estimation value.

Figure 50:
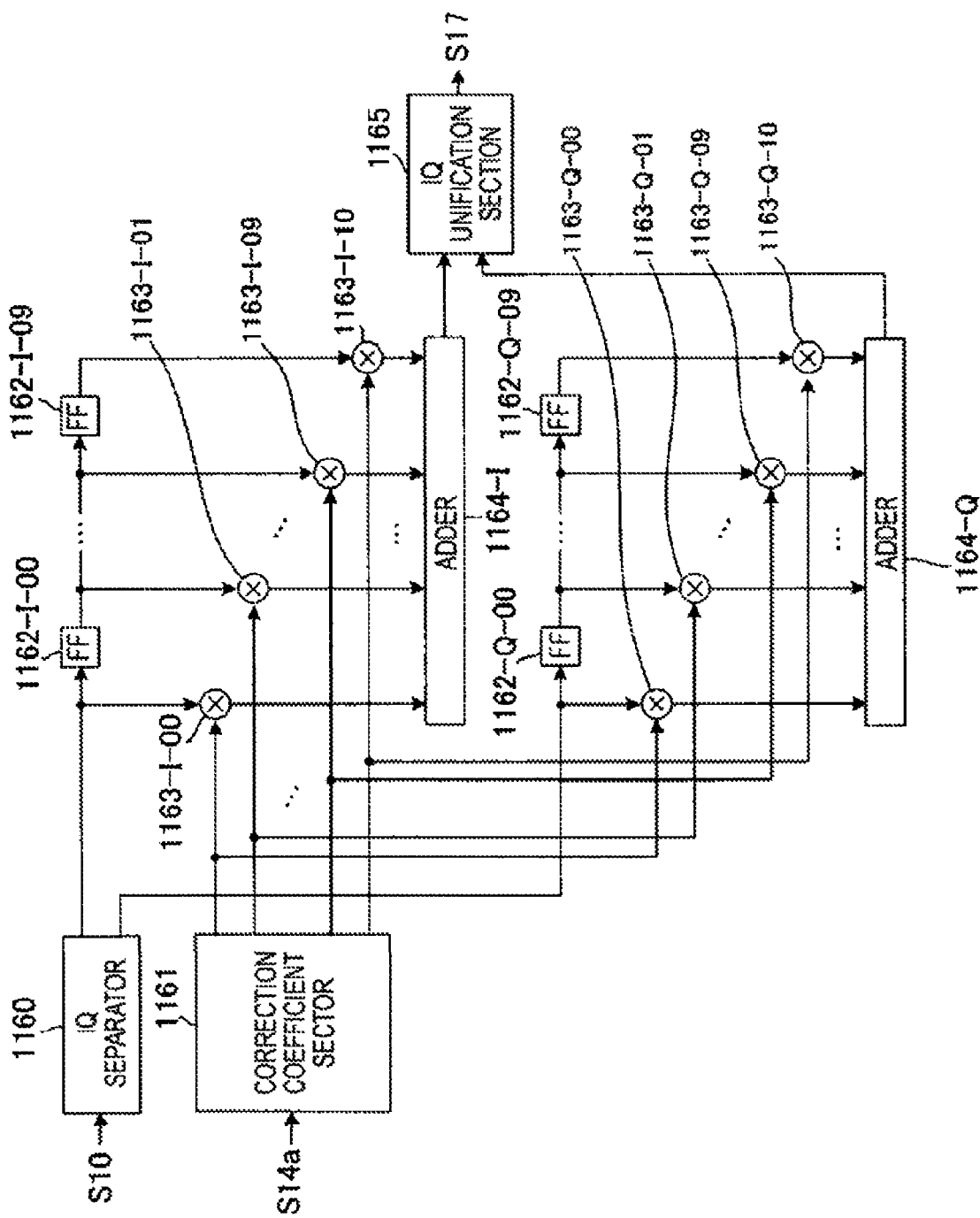
FIG. 50 A view showing the structure of a time domain residual symbol synchronization shift corrector.

FIG. 50 is a view showing the structure of the time domain residual symbol synchronization shift corrector 1016. The time domain residual symbol synchronization shift corrector 1016 performs, in order to correct the residual symbol synchronization shift in the time domain, not phase rotation but synchronization correction by using a filter. The time domain residual symbol synchronization shift corrector 1016 has an IQ separator 1160, a correction coefficient selector 1161, flip-flop (FF) sections 1162-I-00 to 1162-I-09 and 1162-Q-00 to 1162-Q-09, multipliers 1163-I-00 to 1163-I-10 and 1163-Q-00 to 1163-Q-10, adders 1164-I and 1164-Q and an IQ unification section 1165. Here, an example where the number of filter taps is 11 is shown as an example.

In the time domain residual symbol synchronization shift corrector 1016, in the IQ separator 1160, the complex signal of the received signal S10 in the time domain is separated into quadrature components of I and Q. In the FF sections 1162-I-00 to 1162-I-09 and 1162-Q-00 to 1162-Q-09, the complex signal separated into I and Q is held. In the correction coefficient selector 1161, the correction coefficient of each tap of the filter is selected from the phase error inclination S14$a$. In the multipliers 1163-I-00 to 1163-I-10 and 1163-Q-00 to 1163-Q-10, the selected correction coefficients and the signals held in the FF sections are multiplied. In the adders 1164-I and 1164-Q, the multiplication results of the multipliers are added, and the sum of each of I and Q is calculated. In the IQ unification section 1165, the addition results of I and Q are unified and converted into a complex signal to obtain the signal S17 having undergone the time domain symbol synchronization shift correction.

Figure 51:
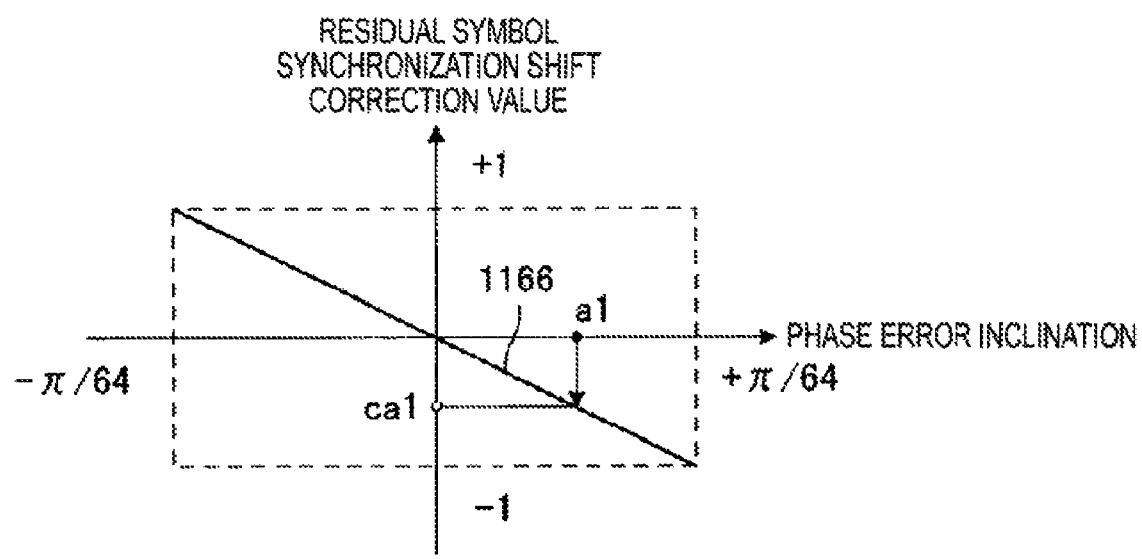
FIG. 51 A view showing the relationship between the phase error inclination and the residual symbol synchronization shift correction value.
Figure 52:
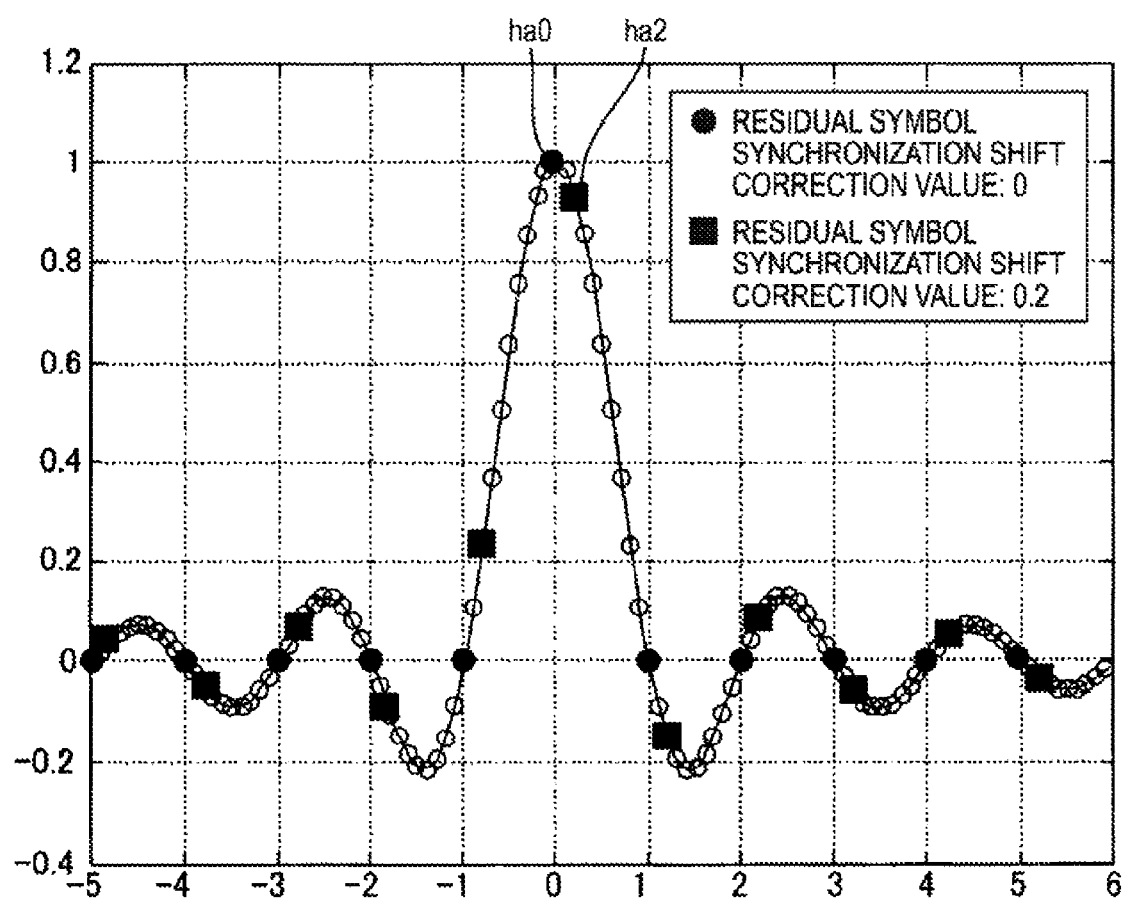
FIG. 52 A view showing an example of the correction coefficient selection.

FIG. 51 and FIG. 52 are views explaining the correction coefficient selection processing in the correction coefficient selector 1161. FIG. 51 is a view showing the relationship between the phase error inclination and the residual symbol synchronization shift correction value, and FIG. 52 is a view showing an example of the correction coefficient selection. In FIG. 51, the horizontal axis shows the phase error inclination, and the vertical axis shows the residual symbol synchronization shift correction value. The linear function 1166 shown in FIG. 51 represents residual symbol synchronization shift correction values −1 to +1 corresponding one to one to phase error inclinations +π/64 to −π/64. For example, when the phase error inclination S14$a$ is a value a1 shown at the black circle in the figure, the residual symbol synchronization shift correction value corresponding to the linear function 1166 is a value cal shown at the white circle in the figure. The correction coefficient selector 1161 obtains the corresponding residual symbol synchronization shift correction value from the phase error inclination.

Then, the correction coefficient selector 1161 selects the correction coefficient of each tap from the residual symbol synchronization shift correction values corresponding to the phase error inclinations, for example, by using the coefficient of the sinc function shown in FIG. 52 as the tap coefficient. In FIG. 52, the horizontal axis shows the tap number corresponding to each tap, and the vertical axis shows the value (correction coefficient) of the sinc function.

In the example of FIG. 52, when the residual symbol synchronization shift correction value is 0, since the symbol synchronization shift is 0, a value ha0 at the black circle in the figure, that is, the value where the center is "1" and the rest is "0" is selected as the correction coefficient. When the residual symbol synchronization shift correction value is 0.2 (the symbol synchronization shift is −0.2), a value (the value at the black square in the figure) ha2 shifted by +0.2 (corresponding to two marks on the right in the figure) from the correction value 0 is selected as the correction coefficient.

By performing synchronization correction by using the above-described filter and passing the received signal in the time domain therethrough, the residual symbol synchronization shift in the time domain can be corrected. The filter coefficient may be adjusted according to the residual symbol synchronization shift value or the like.

In the tenth embodiment, functions similar to those of the sixth embodiment can be realized, and the header can be correctly demodulated also in a wireless communication system performing high-speed transmission.

In the tenth embodiment, by performing residual symbol synchronization shift correction and residual carrier frequency offset correction in the time domain, the residual symbol synchronization shift can also be corrected from the header head together with the residual carrier frequency offset. Consequently, the correction of the phase error due to the residual symbol synchronization shift can be performed earlier.

Eleventh Embodiment

Figure 53:
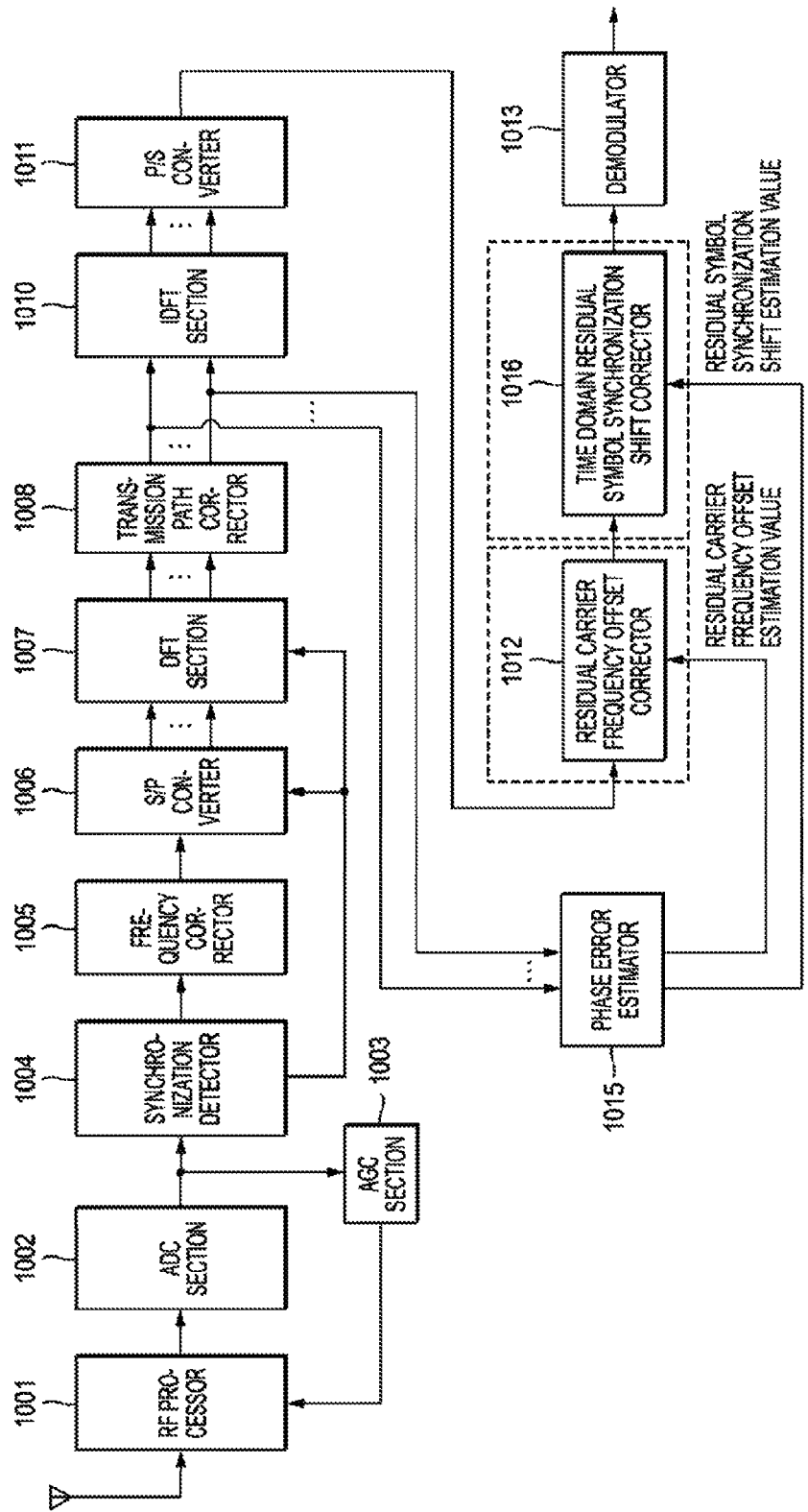
FIG. 53 A block diagram showing the structure of a receiver of a wireless communication apparatus in an eleventh embodiment.

FIG. 53 is a block diagram showing the structure of a receiver of a wireless communication apparatus in an eleventh embodiment of the present disclosure. The wireless communication apparatus of the eleventh embodiment is an example where in the structure of the tenth embodiment, the order of the time domain residual symbol synchronization shift corrector 1016 and the residual carrier frequency offset corrector 1012 is reversed and the residual carrier frequency offset corrector 1012 is disposed in the preceding stage. The rest of the structure is similar to that of the above-described tenth embodiment.

In the eleventh embodiment, functions similar to those of the tenth embodiment can be realized, and the header can be correctly demodulated also in a wireless communication system performing high-speed transmission.

In the eleventh embodiment, by performing residual carrier frequency offset correction in advance in consideration of the calculation error of the CORDIC section or the like in the residual carrier frequency offset corrector 1012, the precision of the residual symbol synchronization shift correction can be improved.

Circumstances Leading up to the Contents of Still Another Embodiment of the Present Disclosure One modulation method in the wireless communication is a modulation method where the phase is rotated (for example, $\pi/2$ shift BPSK [Binary Phase Shift Keying] modulation, $\pi/4$ shift BPSK modulation).

As a method where the correlation value is obtained for a signal stream modulated by the modulation method where the phase is rotated, a method is known where the phase of the received signal is reversely rotated according to the rotation amount compliant with the modulation method and the correlation value is obtained from the reversely rotated received signal (for example, see Reference Patent Document 1).

(Reference Patent Document 1) Japanese Patent No. 3811002

In the reception apparatus of Reference Patent Document 1, when the carrier frequency error between the transmission and reception apparatuses is estimated by using the obtained correlation value, the precision of the carrier frequency error estimation is insufficient if a sampling frequency error is present between the transmission and reception apparatuses. Accordingly, a reception apparatus and a reception method capable of improving the precision of the carrier frequency error estimation is desired.

In the wireless communication, for example, the carrier frequency error between the transmission and reception apparatuses is one factor that decreases the communication quality. The carrier frequency error is the difference in frequency between the carrier wave used by the transmission apparatus and the carrier wave used by the receiver.

In the wireless communication, there are cases where the carrier frequency error between the transmission and reception apparatuses is estimated, for example, by using the maximum value of the correlation values of the repetition section (for example, the preamble in a communication signal) of a known signal.

In the above-described reception apparatus of Reference Patent Document 1, for example, a signal rotated by $\pi/2$ radians is received, the correlation values are calculated by reversely rotating the phase of the received signal by $\pi/2$ radians, and the maximum value of the correlation values is detected.

When the above-described reception apparatus of Reference Patent Document 1 is applied to the estimation of the carrier frequency error, a correlation value obtained from a complex number is used. When the sum of the phase rotation amount by the $\pi/2$ shift of the transmission apparatus and the phase reverse rotation amount by the $-\pi/2$ shift of the phase reverse rotator of the reception apparatus is fixed, the phase of the maximum value of the correlation values obtained in the repetition section is rotated according to the carrier frequency error between the transmission and reception apparatuses.

Figure 54:
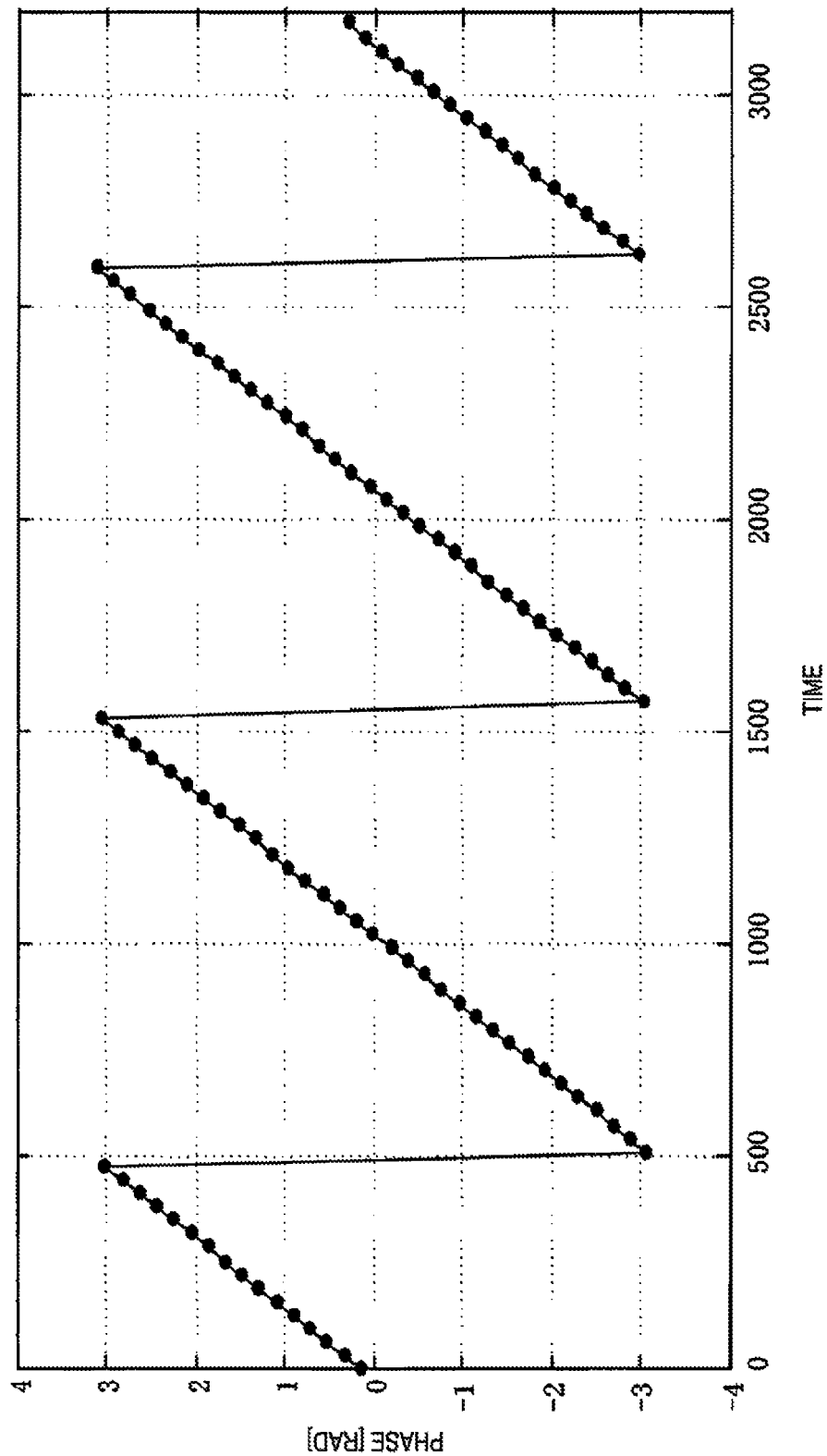
FIG. 54 A schematic view showing the rotation of the phase of the maximum correlation value by a carrier frequency error when the carrier frequency error is present and a sampling frequency error is absent between the transmission and reception apparatuses.

FIG. 54 is a schematic view showing the manner of phase rotation of the maximum correlation value in the reception processing by the reception apparatus of Reference Patent Document 1. In the reception apparatus of Reference Patent Document 1, when the phase of the maximum correlation value is rotated, the carrier frequency error can be estimated from the mean phase rotation amount (the inclination of the straight line connecting the points in FIG. 55) of the maximum correlation value.

However, when a sampling frequency error is present between the transmission and reception apparatuses, the timing of the $-\pi/2$ shift with respect to the $\pi/2$-shifted received signal is gradually shifted.

Figure 55:
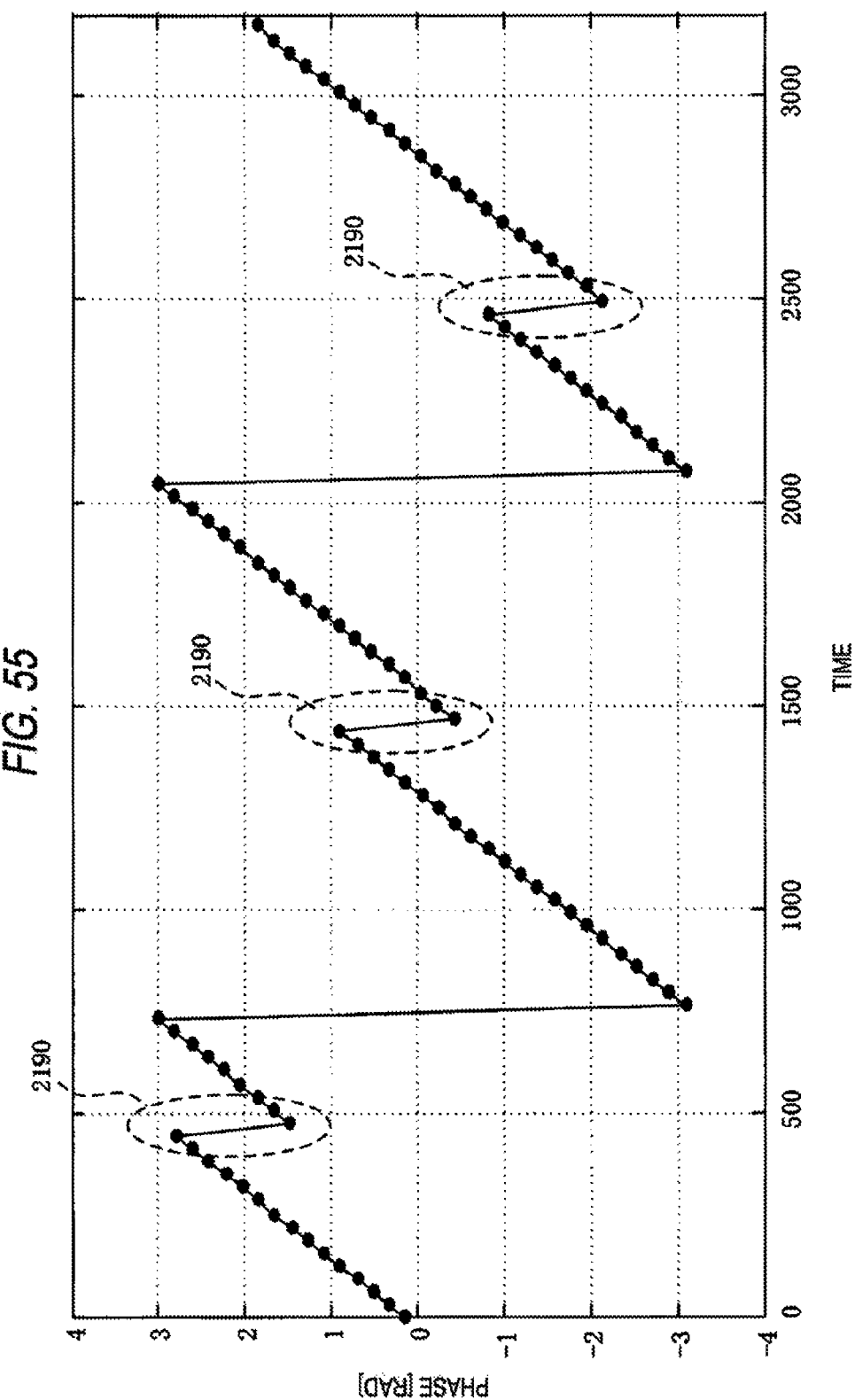
FIG. 55 A schematic view showing the rotation of the phase of the maximum correlation value by a carrier frequency error when the carrier frequency error and a sampling frequency error are present between the transmission and reception apparatuses.

FIG. 55 is a schematic view showing a phase change of the maximum correlation value when a carrier frequency error and a sampling frequency error are present between the transmission and reception apparatuses. FIG. 55 shows a case where the transmission sampling frequency is lower than the reception sampling frequency.

In FIG. 55, in parts 2190 surrounded by dotted lines, the phase of the maximum correlation value is rotated by approximately $-\pi/2$ radians. That is, discontinuous points are preset in the phase change of the maximum correlation value. Consequently, the mean phase rotation amount of the maximum correlation value is discontinuous, so that the precision of the carrier frequency error estimation is deteriorated.

Hereinafter, a reception apparatus and a reception method capable of improving the precision of the carrier frequency error estimation will be described. Here, some structure examples where the above-described rough carrier frequency offset correction is performed are shown.

Yet Other Embodiments of the Present Disclosure

Twelfth Embodiment

Figure 56:
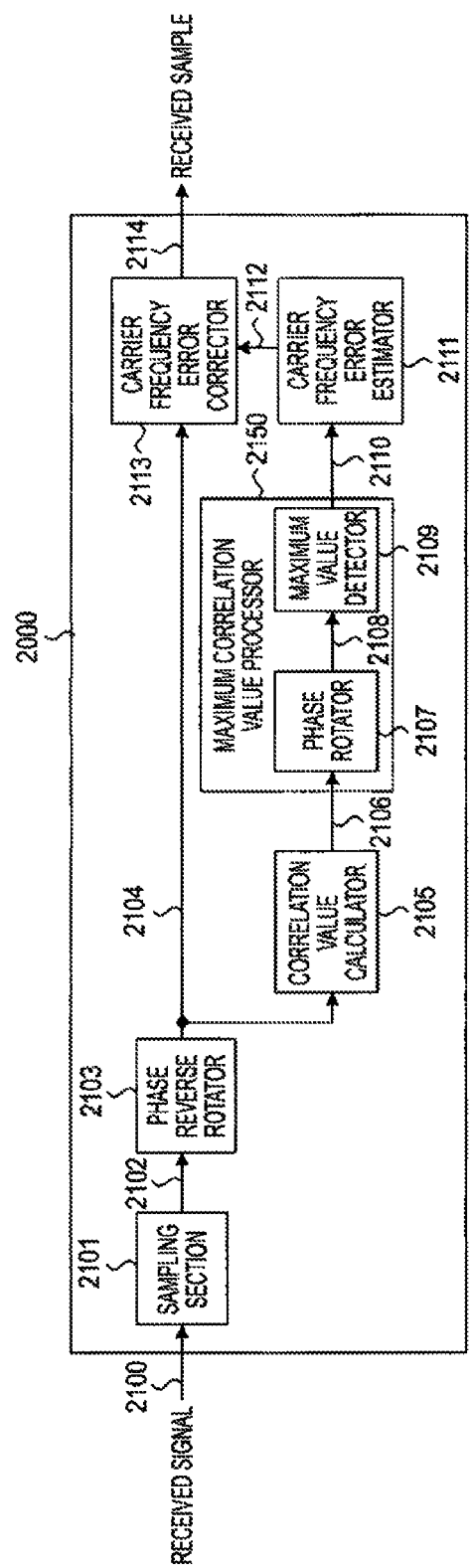
FIG. 56 A block diagram showing a structure example of a reception apparatus in a twelfth embodiment.

FIG. 56 is a block diagram showing a structure example of a reception apparatus 2000 in a twelfth embodiment. The reception apparatus 2000 is provided with a sampling section 2101, a phase reverse rotator 2103, a correlation value calculator 2105, a phase rotator 2107, a maximum value detector 2109, a carrier frequency error estimator 2111 and a frequency corrector 2113. FIG. 56 includes a part associated with the correction of the carrier frequency error.

The reception apparatus 2000 receives a signal modulated by a predetermined modulation method from a transmission apparatus (not shown). The predetermined modulation method includes, for example, the modulation method where the phase is rotated. Moreover, the reception apparatus 2000 successively receives received signals, and the processings in the succeeding blocks are successively performed.

The sampling section 2101 samples a received signal 2100 by a predetermined sampling frequency Fs_r, and outputs a received sample 2102. Here, when the symbol rate of the received signal 2100 is Rsym, Fs_r≅Rsym as an example. That is, the sampling section 2101 1×-oversamples the received signal 2100. Here, the sampling frequency of the transmission apparatus is Fs_t, and the transmission apparatus also performs 1×-oversampling. That is, Fs_t=Rsym.

The phase reverse rotator 2103 reversely rotates the phase of the received sample 2102 according to the rotation amount compliant with the modulation method, and outputs a received sample 2104 the phase of which has been rotated reversely. As the modulation method, for example, the $\pi/2$ shift BPSK is used. When the modulation method is the $\pi/2$ shift BPSK, the phase reverse rotator 2103 reversely rotates the phase of the received sample 2102 by $-\pi/2$ radians (shifts by $-\pi/2$) as shown by Expression [4]:

[Expression 3]

$$Rx'(n)=Rx(n)\times\exp(-1i\times\pi/2\times(n-1)), n=1,2,\ldots \quad [4]$$

Here, Rx is the received sample 2102, and Rx' is the $-\pi/2$-shifted received sample 2104.

The correlation value calculator 2105 calculates a correlation value 2106 of a predetermined known signal stream (for example, the signal stream used for the preamble) and a predetermined signal stream (for example, the signal stream of the preamble) in the received sample 2104, and outputs the correlation value 2106.

For example, in a wireless LAN standard IEEE 802.11ad using a millimeter wave in the 60 GHz band, it is prescribed that $\pi/2$-shift-BPSK (Binary Phase Shift Keying)-modulated Golay series is repetitively transmitted in the preamble section. The reception apparatus 2000 receives, for example, a signal used for millimeter waves.

The phase rotator 2107 rotates the phase of the correlation value 2106 successively derived from the rotation amount compliant with the modulation method, and outputs a phase-rotated correlation value 2108. For example, when the modulation method is the $\pi/2$ shift BPSK, the phase rotator 2107 rotates the phase of the correlation value 2106 by $\pi/2$ radians (shifts by $\pi/2$) as shown by Expression [5].

[Expression 4]

$$C'(n)=C(n)\times\exp(1i\times\pi/2\times(n-1)), n=1,2,\ldots \quad [5]$$

Here, C is the correlation value 2106 and C' is the $\pi/2$-shifted correlation value 2108.

Figure 57:
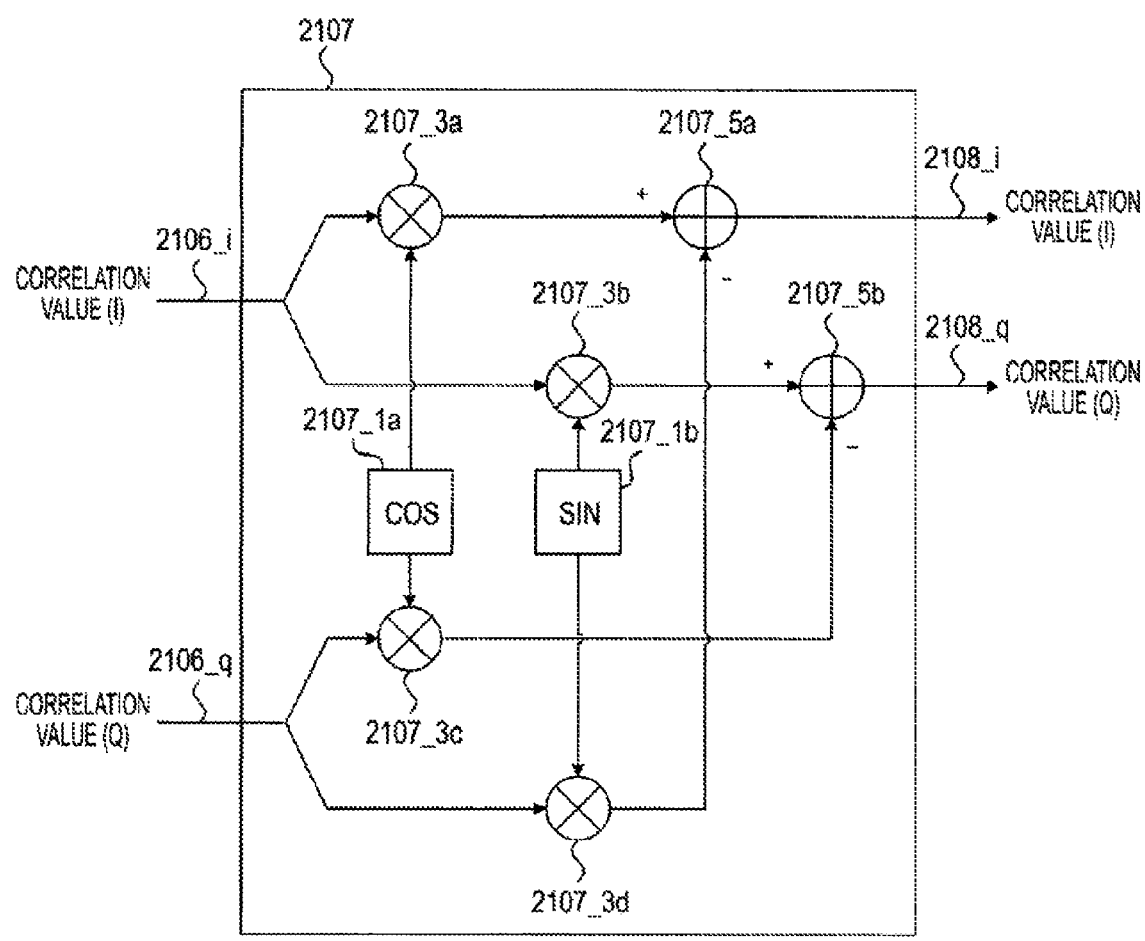
FIG. 57 A schematic view showing a first example of the structure of a phase rotator in the twelfth embodiment.
Figure 58:
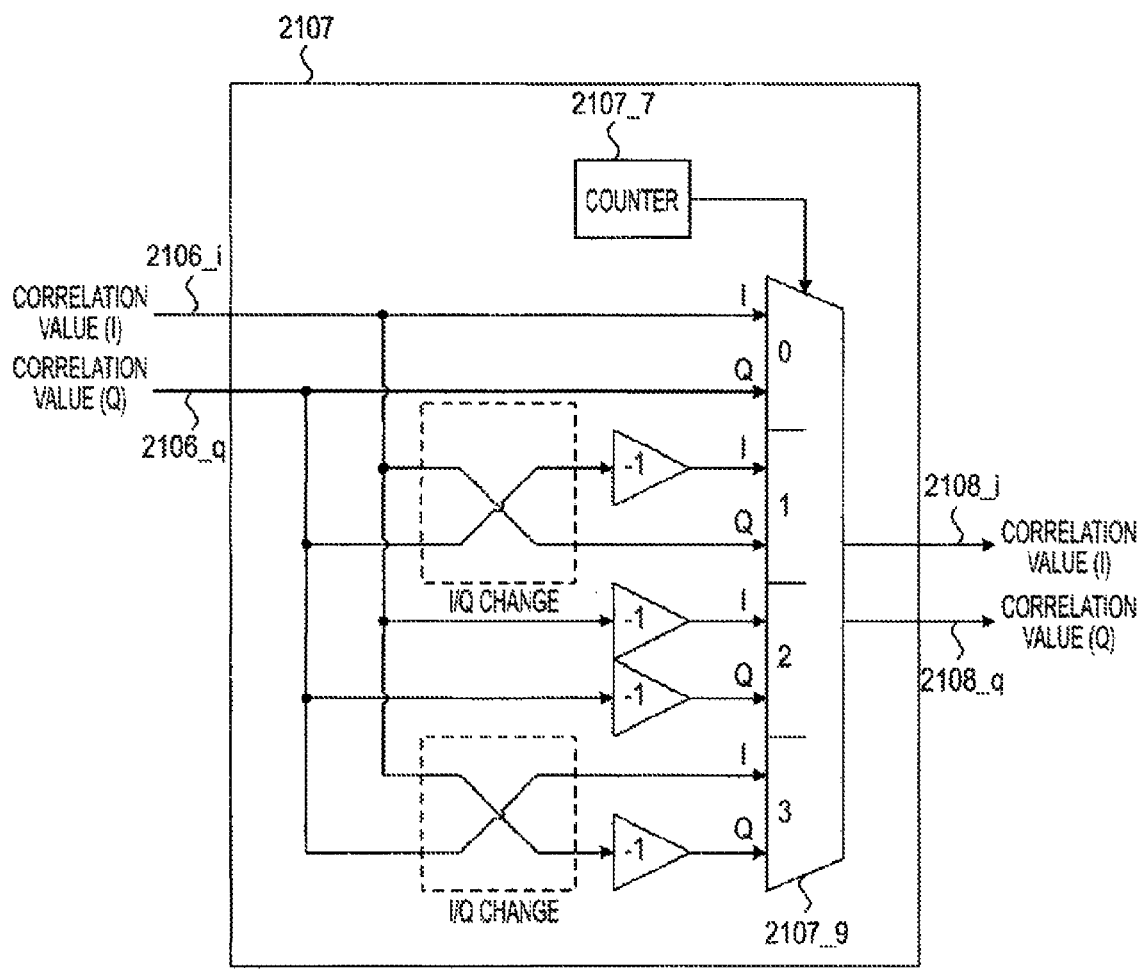
FIG. 58 A schematic view showing a second example of the structure of a phase rotator in the twelfth embodiment.
Figure 59:
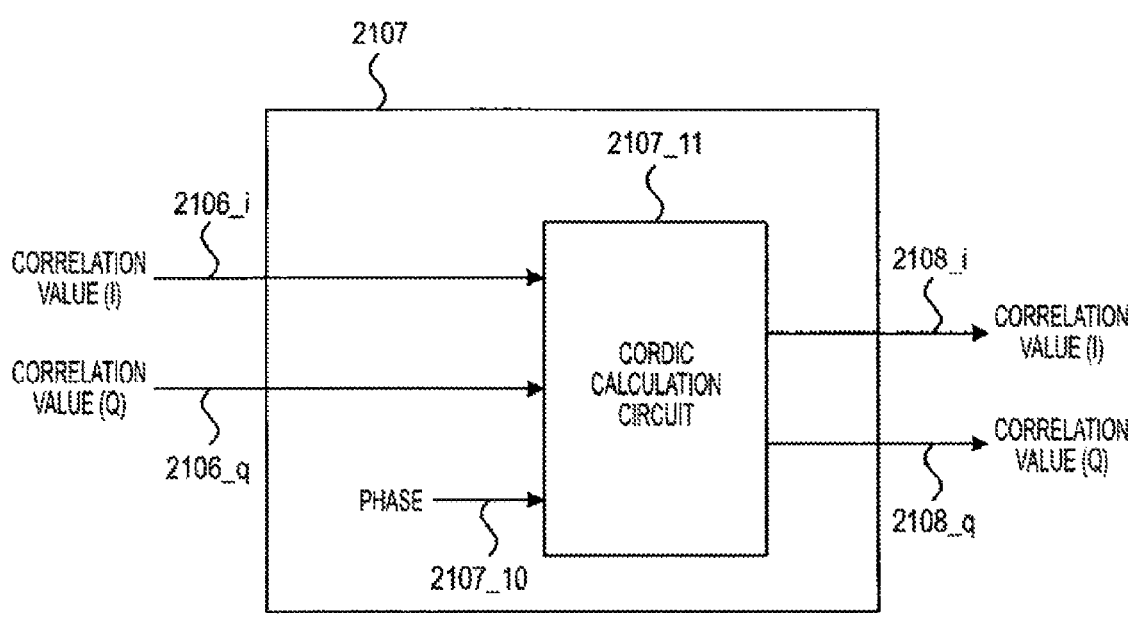
FIG. 59 A schematic view showing a third example of the structure of a phase rotator in the twelfth embodiment.

FIG. 57 to FIG. 59 are schematic views showing structure examples of the phase rotator 2107. Since the correlation value 2106 and the correlation value 2108 are expressed by complex numbers, in FIG. 57 to FIG. 59, the correlation value 2106 and the correlation value 2108 are shown in a state of being divided into I components and Q components.

FIG. 57 is a schematic view showing a structure example in a case where the phase rotator 2107 includes complex multipliers. A cosine wave generator 2107_1 and a sinusoidal wave generator 2107_2 generate a signal that repeats a change every sample. This signal is expressed, for example, by (cos, sin)=(1, 0), (0, 1), (−1, 0), (0, −1). In FIG. 57, the cosine wave generator 2107_1 is represented as "cos", and the sinusoidal wave generator 2107_2 is represented by "sin".

Moreover, multipliers 2107_3a, 2107_3b, 2107_3c and 2107_3d multiply a correlation value 2106_i and a correlation value 2106_q. An adder 2107_5a and an adder 2107_5b add the multiplication result, and output a correlation value 2108_i and a correlation value 2108_q. Thereby, the phase of the correlation value 2106 is rotated by $\pi/2$ radians.

FIG. 58 is a schematic view showing a structure example in a case where the phase rotator 2107 includes a counter and a selector and performs I/Q change and sign inversion. A counter 2107_7 counts every sample, for example, counts as 0, 1, 2, 3, 0, . . . .

On the signal lines connected to the selector numbers "1" and "3" of a selector 2107_9, I/Q change is performed on the correlation value 2106_i and the correlation value 2106_q. Moreover, on the I signal line connected to the selector number "1", the I signal line and the Q signal line connected to the selector number "2" and the I signal line connected to the selector number "3", sign inversion is performed by a sign inverter.

The selector 2107_9 selects a signal according to the count value, for example, selects 0, 1, 2, 3, 0, . . . , and outputs the correlation value 2108_i and the correlation value 2108_q. Thereby, the phase of the correlation value 2106 is rotated by $\pi/2$ radians.

In the structure of FIG. 58, since neither a multiplier nor an adder is used, the circuit size can be reduced compared with the structure of FIG. 57, so that power consumption can be reduced.

FIG. 59 is a schematic view showing a structure example in a case where the phase rotator 2107 uses the CORDIC (Coordinate Rotational Digital Computer) algorithm.

A CORDIC calculation circuit 2107_11 inputs a predetermined phase as phase information 2107_10. The predetermined phase is, for example, 0 radians, $\pi/2$ radians, $\pi$ radians, $3\pi/2$ radians, 0 radians, . . . .

The CORDIC calculation circuit 2107_11 generates the correlation value 2108_i and the correlation value 2108_q from the predetermined phase, the correlation value 2106_i and the correlation value 2106_q and outputs them. Thereby, the phase of the correlation value 2106 is rotated by $\pi/2$ radians.

In the structure of FIG. 59, since no multiplier is used, the circuit size can be reduced compared with the structure of FIG. 57, so that power consumption can be reduced.

Figure 60:
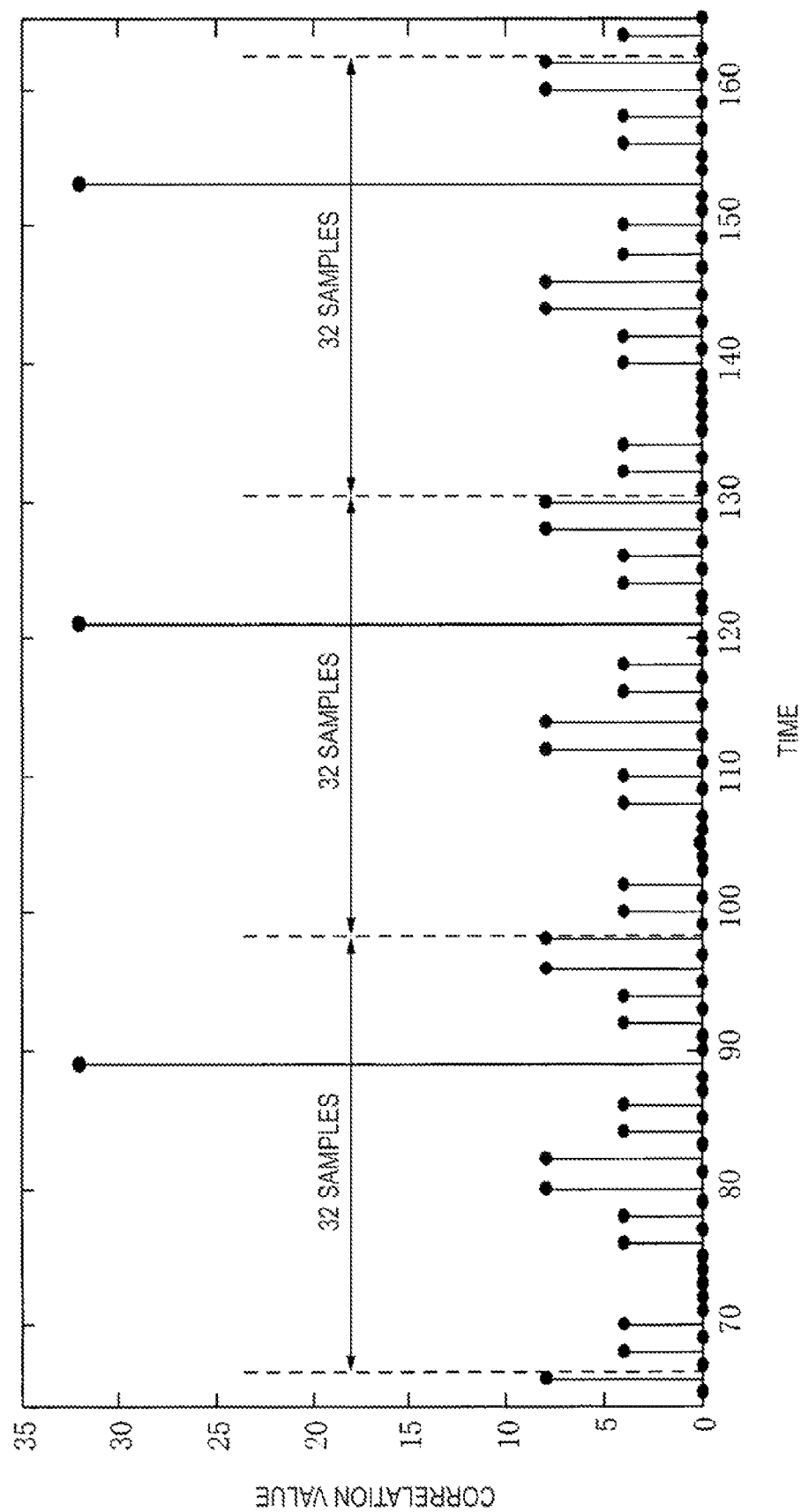
FIG. 60 A schematic view showing an example of the correlation value of each sample in the twelfth embodiment.

When the length of the known signal stream is L, the maximum value detector 2109 detects the correlation value (maximum correlation value) where the power in the L sample period is maximum, from among the successively derived correlation values 2108, and outputs the maximum correlation value 2110. For example, in FIG. 60, when L=32, a plurality of correlation values 2108 are sectioned at every 32 sample periods. The maximum value detector 2109 detects the maximum correlation value 2110 from among the correlation values in the sectioned periods. The L sample period is an example of periods divided according to the length of the known signal stream.

Now, using FIG. 61(A) to 61(C), FIG. 62(A) to FIG. 62(C) and FIG. 63(A) to FIG. 63(C), change of the characteristics of the maximum correlation value considering the carrier frequency error and the sampling frequency error will be described. In FIG. 61(A) to 61(C), FIG. 62(A) to FIG. 62(C) and FIG. 63(A) to FIG. 63(C), it is assumed that the phase rotator 2107 is absent.

Figure 61:
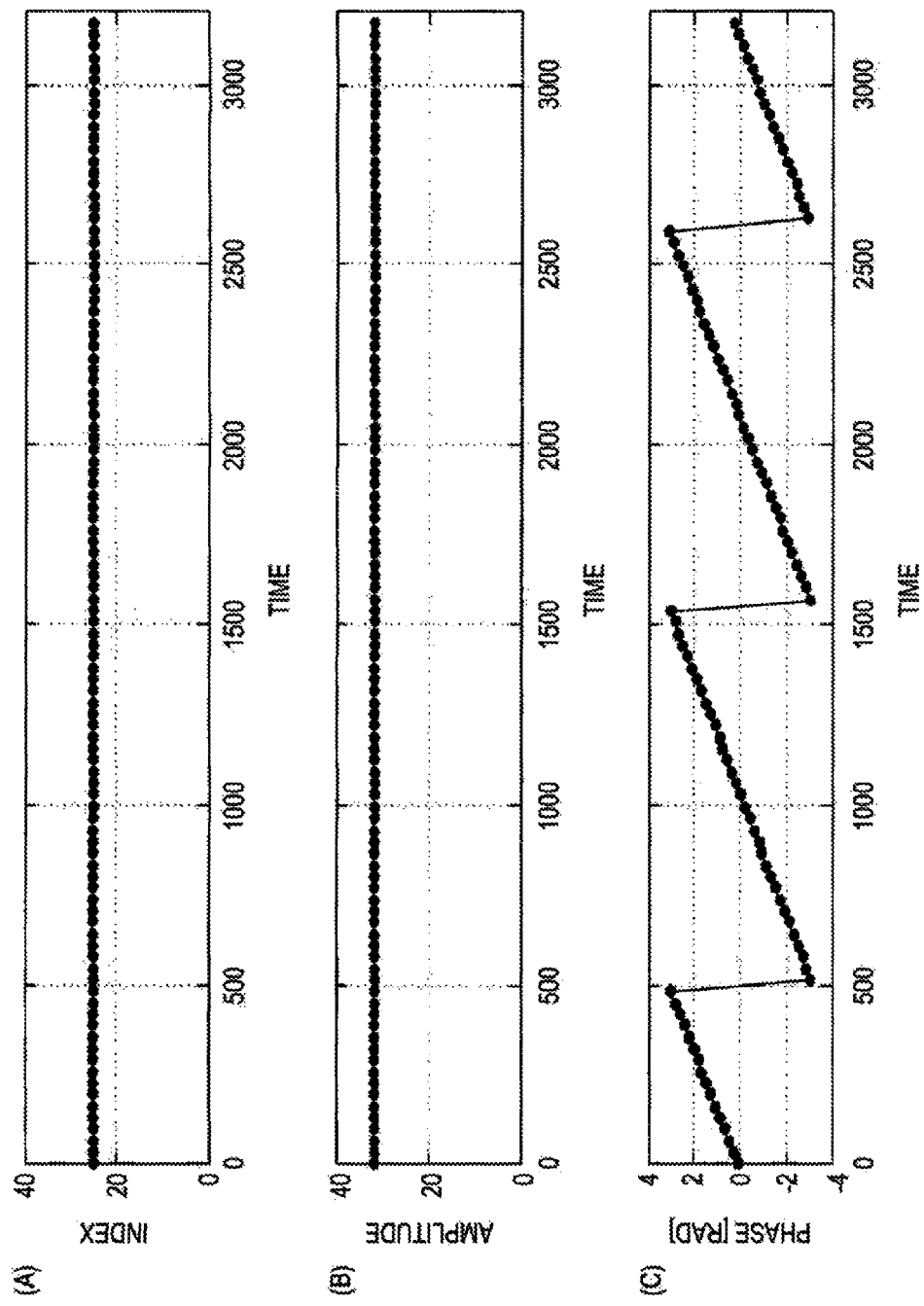
FIG. 61 (A) to (C) are schematic views showing an example of characteristics of the maximum correction value in a case where no phase rotator is present and Fs_t=Fs_r.

FIG. 61(A) is a schematic view showing an example of the time change of the index of the maximum correction value in a case where Fs_t=Fs_r. FIG. 61(B) is a schematic view showing an example of the time change of the amplitude of the maximum correlation value in the case where Fs_t=Fs_r. FIG. 61(C) is a schematic view showing an example of the time change of the phase of the maximum correlation value in the case where Fs_t=Fs_r.

The index of the maximum correlation value is a value representative of the position where the maximum value appears in the range sectioned by the L sample period. For example, when L=32 and the maximum correlation value appears at the 26th one of the 32 samples, the index=26.

In FIG. 61(A) and FIG. 61(B), in the case where Fs_t=Fs_r, the index and amplitude of the maximum correlation value do not change even though time elapses. On the other hand, in FIG. 61(C), the phase of the maximum correlation value is continuously rotated as time elapses because of the influence of the carrier frequency error. That is, the phase is rotated with a substantially fixed rotation amount.

Figure 62:
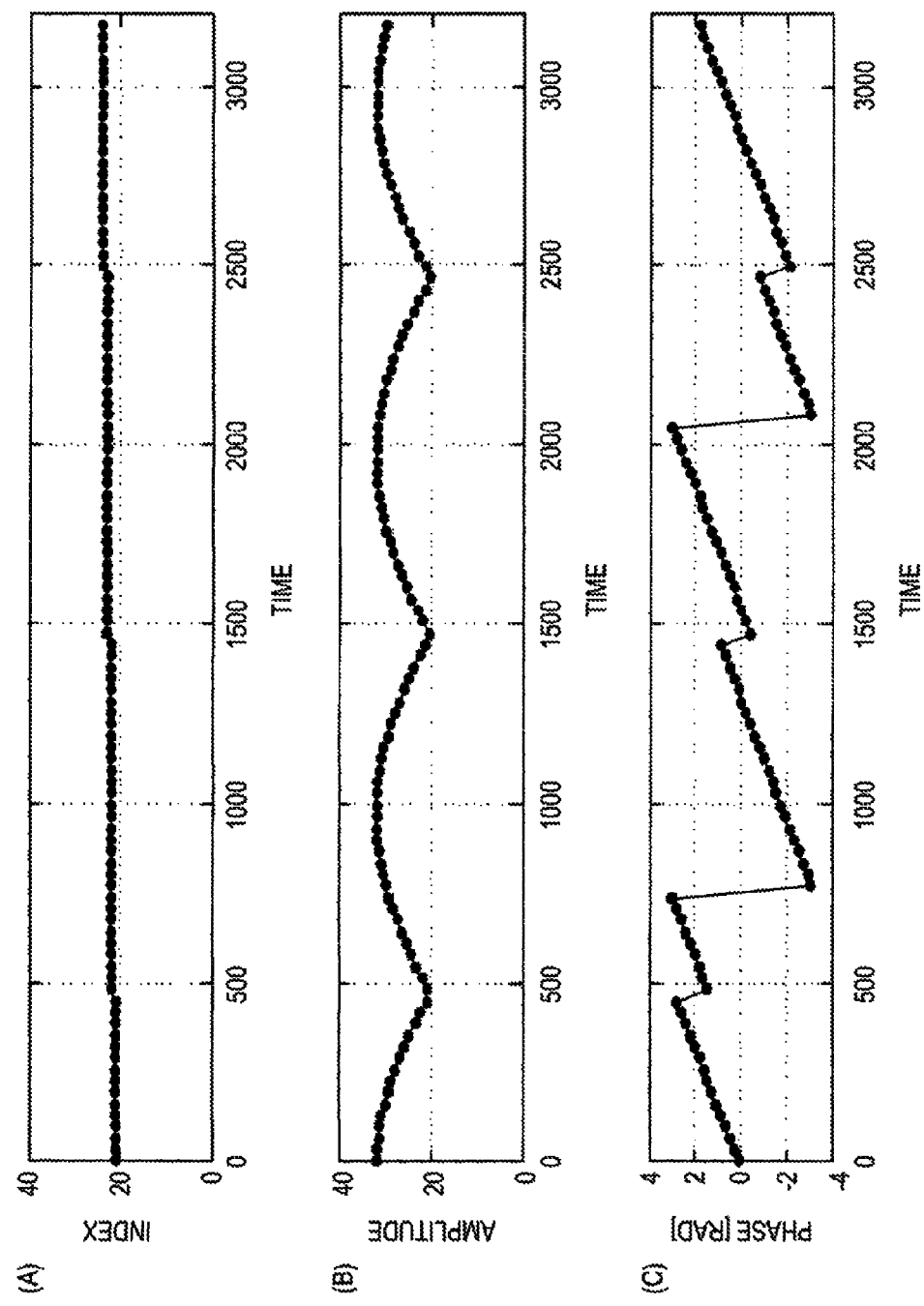
FIG. 62 (A) to (C) are schematic views showing an example of characteristics of the maximum correction value in a case where no phase rotator is present and Fs_t<Fs_r.

FIG. 62(A) is a schematic view showing an example of the time change of the index of the maximum correction value in the conventional case where Fs_t<Fs_r. FIG. 62(B) is a schematic view showing an example of the time change of the amplitude of the maximum correction value in the case where Fs_t<Fs_r. FIG. 62(C) is a schematic view showing an example of the time change of the phase of the maximum correction value in the case where Fs_t<Fs_r.

In the case where Fs_t<Fs_r, since the sample timing of the received signal by the reception apparatus gradually advances with respect to the sample timing of the transmission apparatus, the index increases as time elapses. That is, the position of appearance of the maximum correlation value is shifted to a sampling position in the rear.

Moreover, in a case where Fs_r<Rsym, if the sample timing is shifted, the symbol synchronization timing is shifted. In this case, the amplitude of the maximum correlation value becomes maximum at the point of time when the symbol synchronization timings coincide in the transmission apparatus and the reception apparatus.

On the other hand, the amplitude of the maximum correlation value becomes minimum at the point of time when the symbol synchronization timing is shifted by ½ symbol. Referring to FIG. 62(A) and FIG. 62(B), it can be understood that the index is changed when the amplitude of the maximum correlation value is minimum, that is, when the symbol synchronization timing is shifted by ½ symbol.

The phase of the maximum correlation value is sometimes rotated by $-\pi/2$ radians as in FIG. 55, and is discontinuously changed. When the index is changed, that is, when the symbol synchronization timing is shifted by ½ symbol, a discontinuous change occurs.

Figure 63:
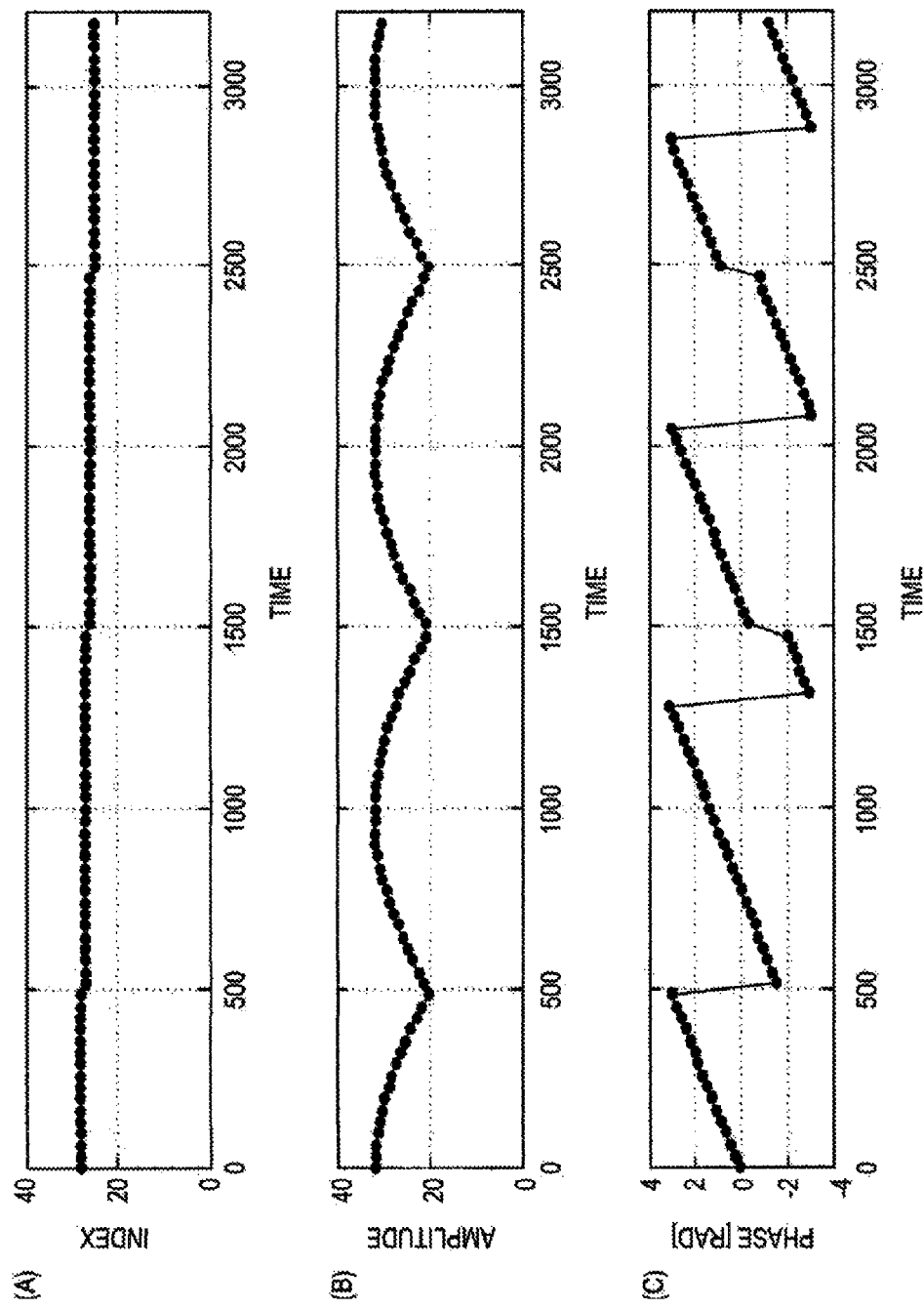
FIG. 63 (A) to (C) are schematic views showing an example of characteristics of the maximum correction value in a case where no phase rotator is present and Fs_t>Fs_r.

FIG. 63(A) is a schematic view showing an example of the time change of the index of the maximum correction value in a case where Fs_t>Fs_r. FIG. 63(B) is a schematic view showing an example of the time change of the amplitude of the maximum correction value in the case where Fs_t>Fs_r. FIG. 63(C) is a schematic view showing an example of the time change of the phase of the maximum correction value in the case where Fs_t>Fs_r.

In the case where Fs_t>Fs_r, since the sample timing of the received signal by the reception apparatus gradually advances with respect to the sample timing of the transmission apparatus, the index decreases as time elapses. That is, the position of appearance of the maximum correlation value is shifted to a sampling position in front.

Moreover, as in the case where Fs_t<Fs_r, the amplitude of the maximum correlation value repetitively increases and decreases, and becomes minimum when the index is changed.

Moreover, as in the case where Fs_t<Fs_r, the phase of the maximum correlation value is discontinuously changed when the index is changed. In this case, the direction of the phase rotation at the discontinuous points is opposite to that in the case where Fs_t<Fs_r, and the phase is rotated by $\pi/2$ radians.

Next, the reason why the phase of the maximum correlation value 2110 is rotated when the index of the maximum correlation value 110 is changed will be described.

FIG. 64 is a schematic view showing an example of the amount of phase rotation by the $\pi/2$ shift of the transmission apparatus and the amount of phase reverse rotation by the $-\pi/2$ shift of the reception apparatus 2000 when the symbol synchronization timings coincide between the transmission and reception apparatuses.

In FIG. 64, the $\pi/2$ shift and the $-\pi/2$ shift are canceled out each other, and the reverse rotation result is 0 radians. The reverse rotation result indicates the result of synthesis of the above phase rotation amount and the above phase reverse rotation amount.

FIG. 65 is a schematic view showing an example of the amount of phase rotation by the $\pi/2$ shift of the transmission apparatus and the amount of phase reverse rotation by the $-\pi/2$ shift of the reception apparatus 2000 when the symbol synchronization timing of the reception apparatus 2000 is earlier than that of the transmission apparatus by one symbol.

Referring to FIG. 65, it can be understood that since the reverse rotation result is $-\pi/2$ radians, when the symbol synchronization timing is one symbol earlier, the phase of the maximum correlation value 2110 is rotated by $-\pi/2$ radians. Here, $+3\pi/2$ radians=$-\pi/2$ radians.

FIG. 66 is a schematic view showing an example of the amount of phase rotation by the $\pi/2$ shift of the transmission apparatus and the amount of phase reverse rotation by the $-\pi/2$ shift of the reception apparatus 2000 when the symbol synchronization timing of the reception apparatus 2000 is later than that of the transmission apparatus by one symbol.

Referring to FIG. 66, it can be understood that since the reverse rotation result is $+\pi/2$ radians, when the symbol synchronization timing is one symbol later, the phase of the maximum correlation value 2110 is rotated by $+\pi/2$ radians. Here, $-3\pi/2$ radians=$+\pi/2$ radians.

When the symbol synchronization timing is shifted by not less than ½ symbol, since the correlation with the adjoining symbol is dominant, the phase of the maximum correlation value 2110 is rotated according to the reverse rotation results of FIG. 65 and FIG. 66.

Moreover, when the symbol synchronization timing of the reception apparatus 2000 is earlier than that of the transmission apparatus by not less than ½ symbol, the index of the maximum correlation value 2110 is increased by one (delayed by one sample). On the other hand, when the symbol synchronization timing of the reception apparatus 2000 is later than that of the transmission apparatus by not less than ½ symbol, the index of the maximum correlation value 2110 is decreased by one (advanced by one sample).

Therefore, it is also said that when the index of the maximum correlation value 2110 is increased by one, the phase of the maximum correlation value 2110 is rotated by $-\pi/2$ radians and when the index of the maximum correlation value 2110 is decreased by one, the phase of the maximum correlation value is rotated by $+\pi/2$ radians.

Figure 67:
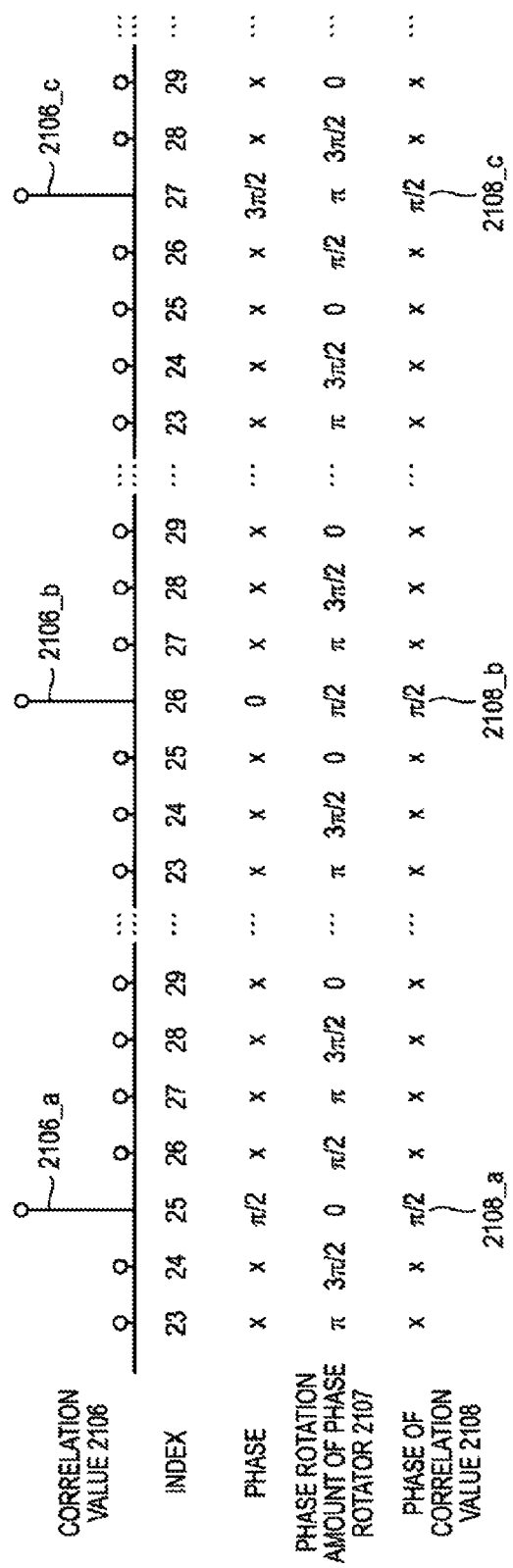
FIG. 67 A schematic view showing an example of correction of the phase of the maximum correlation value in the twelfth embodiment.

Next, using FIG. 67, the correction of the phase of the maximum correlation value 2110 by the phase rotator 2107 will be described. FIG. 67 illustrates, for simplification of description, a case where there is no carrier frequency error between the transmission and reception apparatuses. Here, "x" in FIG. 67 indicates that the phase is unknown.

First, attention is focused on a correlation value 2106_b as the maximum correlation value 2110. The correlation value 2106_b is a reference correlation value here, and is a correlation value obtained when the sample rate is such that Fs_t=Fs_r. It is assumed that the index of the correlation value 2106_b is 26 and the phase of the correlation value 2106_b is 0 radians. When the phase of the correlation value 2106_b is rotated by π/2 radians by the phase rotator 2107, the phase 2108_b of the correlation value 2108 with respect to the correlation value 2106_b is π/2 radians.

Since the period of the index is an integral multiple of the phase rotation period of the phase rotator 2107, the phase rotation amount for the index 26 is always π/2 radians. Likewise, the phase rotation amount for the index 25 is always 0 radians. Likewise, the phase rotation amount for the index 27 is always π radians. As described above, the phase rotation amounts for the indices are fixed.

Subsequently, attention is focused on a correlation value 2016_a as the maximum correlation value 2110. The correlation value 2016_a is, with the correlation value 2016_b as the reference, a correlation value obtained when the sample rate is such that Fs_t>Fs_r. Since the index of the correlation value 2016_a is lower than the index of the correlation value 2016_b by one, the phase is π/2 radians. On the other hand, the amount of phase rotation by the phase rotator 2107 is 0 radians, and is smaller than the amount of phase rotation with respect to the correlation value 2106_b by π/2 radians. Therefore, the phase 2108_a of the correlation value 2108 with respect to the correlation value 2016_a is π/2 radians.

Subsequently, attention is focused on a correlation value 2016_c as the maximum correlation value 2110. The correlation value 2016_c is, with the correlation value 2016_b as the reference, a correlation value obtained when the sample rate is such that Fs_t<Fs_r. Since the index of the correlation value 2016_c is higher by one than the index of the correlation value 2106_b, the phase is 3π/2 radians. On the other hand, the amount of phase rotation by the phase rotator 2107 is π radians, and is larger than the amount of phase rotation with respect to the correlation value 2016_b by π/2 radians. Therefore, the phase 2108_c of the correlation value 2108 with respect to the correlation value 2016_c is π/2 radians.

As described above, by shifting the phase of the correlation value 2106 by π/2 by the phase rotator 2107, the phase rotation of the maximum correlation value 2110 due to the sampling frequency error between the transmission and reception apparatuses can be corrected.

Figure 68:
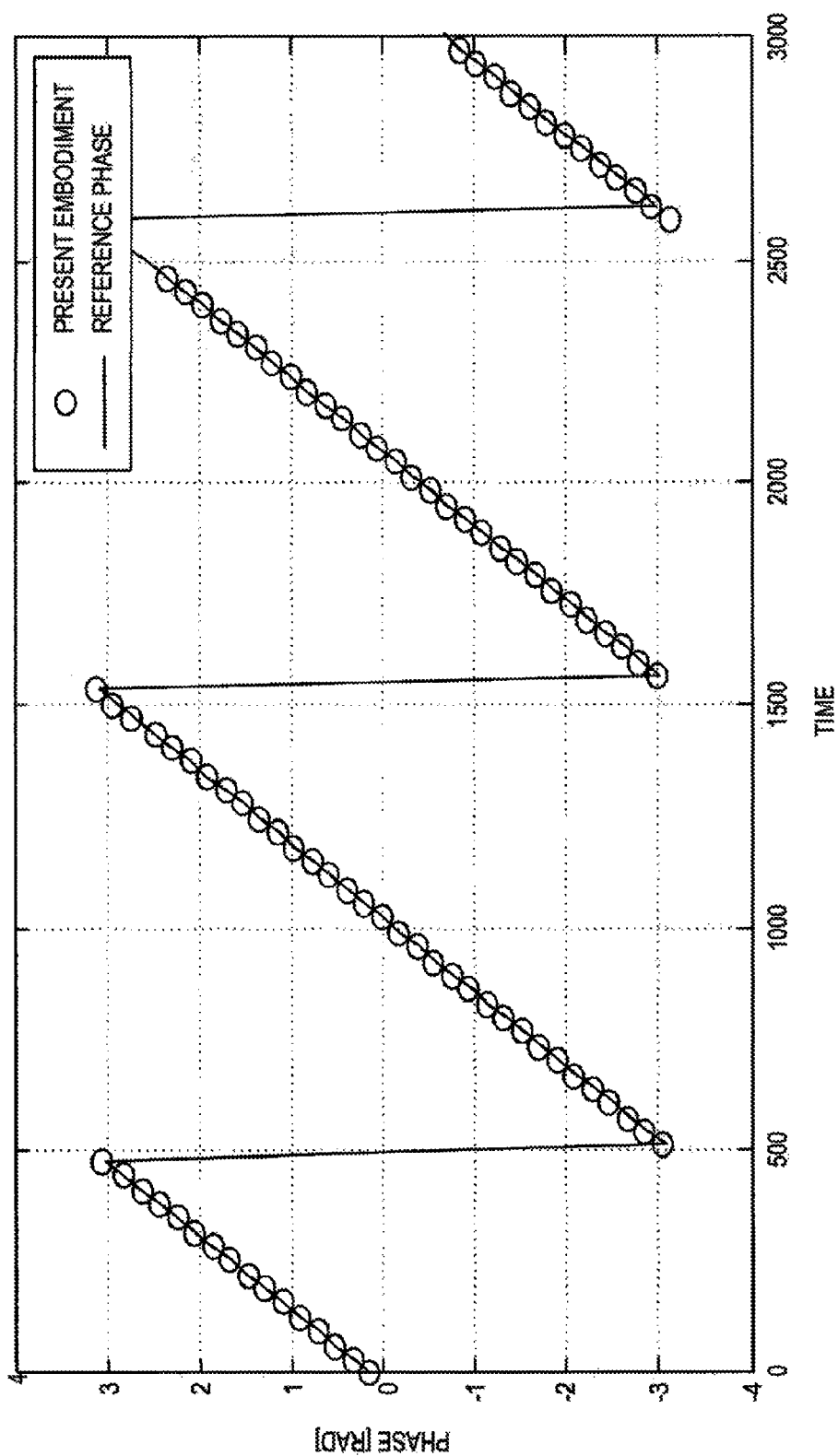
FIG. 68 A schematic view showing an example of characteristics of the phase change of the maximum correlation value and the phase change of the reference phase in the twelfth embodiment.

FIG. 68 is a schematic view showing an example of the result of comparison between the phase change of the maximum correlation value 2110 and the phase change of the reference phase by the reception apparatus 2000. The phase of the maximum correlation value 2110 by the reception apparatus 2000 includes the phases of the maximum correlation value 2110 in the cases where Fs_t=Fs_r and where Fs_t<Fs_r and in the case where Fs_t>Fs_r. The reference phase is the phase of the maximum correlation value 2110 in the case where Fs_t=Fs_r in the conventional example or the present embodiment.

Referring to FIG. 68, it can be understood that according to the reception apparatus 2000, the phase rotation of the maximum correlation value 2110 due to the sampling frequency error between the transmission and reception apparatuses is corrected and substantially coincides with the reference phase.

The phase rotator 2107 and the maximum value detector 2109 are included in a maximum correlation value processor 2150. The maximum correlation value processor 2150 successively outputs, of the successively calculated correlation values, the maximum correlation value which is the maximum value in the periods divided according to the length of the known signal stream and is rotated by the rotation amount compliant with the modulation method.

The carrier frequency error estimator 2111 estimates the carrier frequency error based on the phase rotation amount of the maximum correlation value 2110, and outputs a carrier frequency error estimation value 2112. For example, the carrier frequency error estimator 2111 calculates a phase rotation amount P between the adjoining two maximum correlation values 2110. When the length of the known signal stream is L, the distance between the adjoining maximum correlation values 2110 is L samples, strictly, it is L±1 samples when the index is changed.

For example, the carrier frequency error estimator 2111 divides the phase rotation amount P between the maximum correlation values 2110 by L to calculate the phase rotation amount per sample. The carrier frequency error estimator 2111 outputs the calculation result as the carrier frequency error estimation value 2112.

The frequency corrector 2113 rotates the phase of the received sample 2104 by an amount according to the carrier frequency error estimation value 2112, and outputs a received sample 2114 having undergone carrier frequency error correction.

Figure 69:
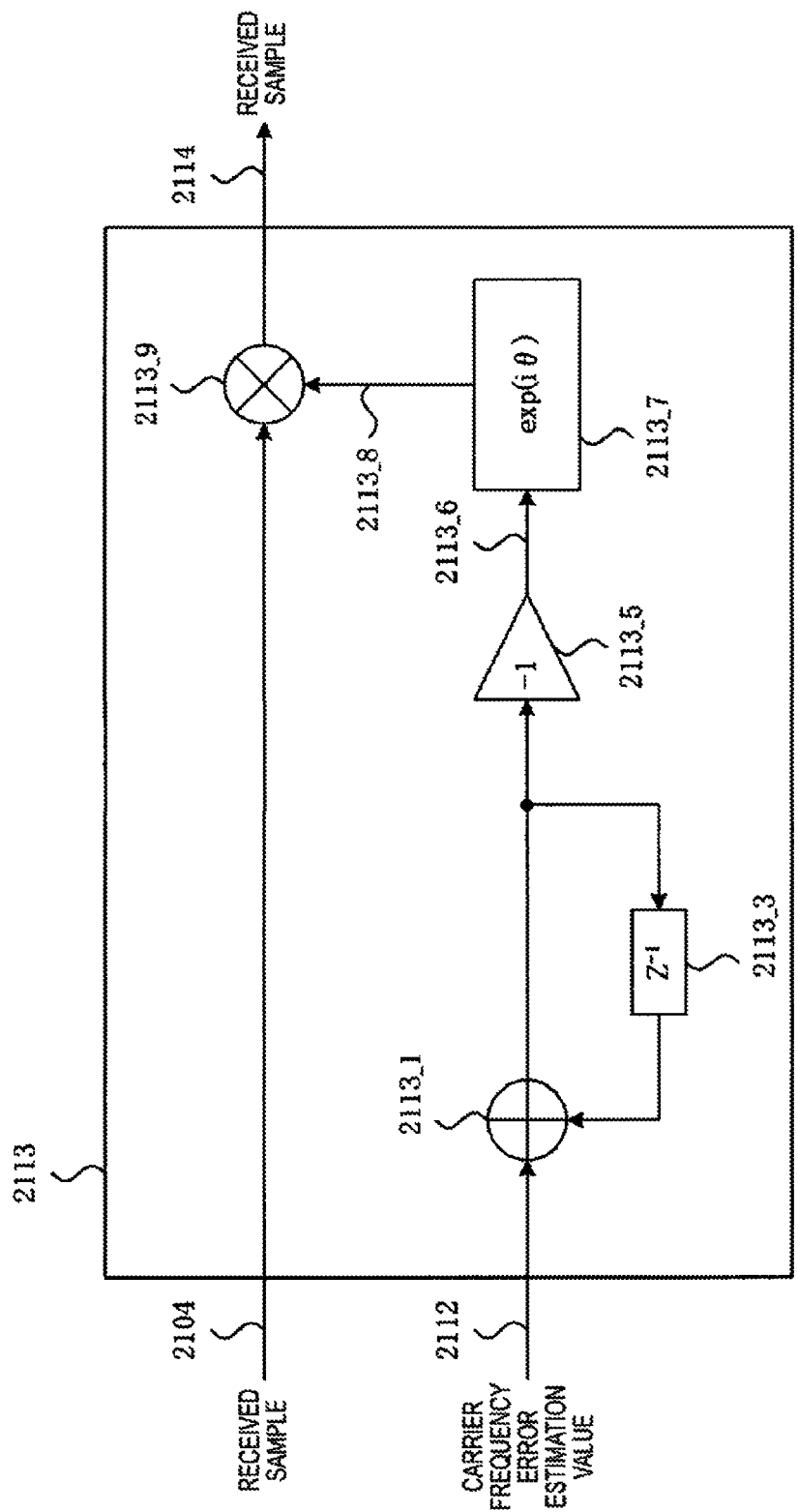
FIG. 69 A schematic view showing a first example of the structure of a frequency corrector in the twelfth embodiment.

FIG. 69 is a schematic view showing a first example of the structure of the frequency corrector 2113. In FIG. 69, the frequency corrector 2113 includes an adder 2113_1, a one sample delay device 2113_3, a sign inversion circuit 2113_5, a correction vector generator 2113_7 and a complex multiplier 2113_9.

The adder 2113_1 and the one sample delay device 2113_3 accumulate the carrier frequency error estimation value 2112. The sign inversion circuit 2113_5 inverts the sign of the accumulated carrier frequency error estimation value. Thereby, a carrier frequency error correction value 2113_6 for each sample is generated.

The correction vector generator 2113_7 calculates exp(i×θ) and generates a correction vector 2113_8. Here, "θ is the carrier frequency error correction value 2113_6. The complex multiplier 2113_9 multiplies the received sample 2104 and the correction vector 2113_8. Thereby, the phase rotation due to the carrier frequency error is corrected.

Figure 70:
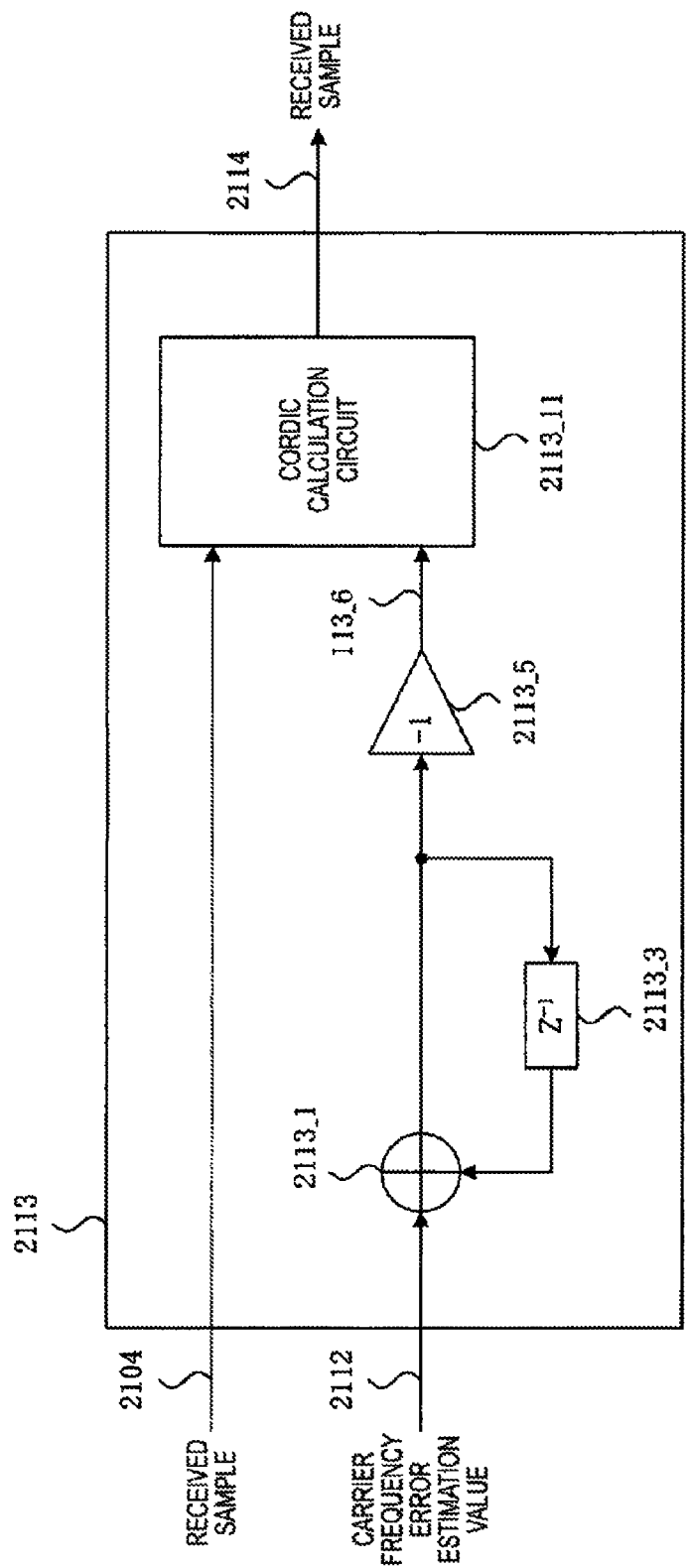
FIG. 70 A schematic view showing a second example of the structure of the frequency corrector in the twelfth embodiment.

FIG. 70 is a schematic view showing a second example of the structure of the frequency corrector 2113. FIG. 70 is a structure where the correction vector generator 2113_7 and the complex multiplier 2113_9 of FIG. 69 are replaced by a CORDIC calculation circuit 2113_11. Since the CORDIC algorithm uses no multiplier, in the structure of FIG. 70, the circuit size can be reduced compared with the structure of FIG. 69, so that power consumption can be reduced.

According to the reception apparatus 2000, the phase rotation of the maximum correlation value 2110 due to the shift of the phase reverse rotation timing (sampling frequency error) of the phase reverse rotator 2103 can be corrected by using the maximum correlation value rotated by the rotation amount compliant with the modulation method by the maximum correlation value processor 2150. For example, by the phase rotator 2107 rotating the phase of the correlation value 2106 by the rotation amount compliant with the modulation method, the phase rotation of the maximum correlation value 2110 due to the sampling frequency error can be corrected. Therefore, even when a sampling frequency error is present between the transmission and reception apparatuses, the precision of the estimation of the carrier frequency error between the transmission and reception apparatuses can be improved, and the precision of the carrier frequency error correction can be improved. Moreover, even in asynchronous condition, the phase of the correlation peak can be stabilized.

The sampling section 2101 may perform N-times (N is an integer) oversampling of the received signal 2100 (that is, Fs_r≅N*Rsym). In this case, the phase reverse rotator 2103 shifts the received sample 2102 by $-\pi/2N$, that is, rotates it by $-\pi/2N$ radians. The phase rotator 2107 shifts the correlation value 2106 by $\pi/2N$, that is, rotates it by $\pi/2N$. The carrier frequency error estimator 2111 divides, for example, the phase rotation amount P between the maximum correlation values by N*L. Thereby, even when N-times oversampling is performed, the precision of the estimation of the carrier frequency error between the transmission and reception apparatuses can be improved, and the precision of the carrier frequency error correction can be improved.

When a modulation method where the phase is rotated by $\pi/M$ (M is an integer) is used, the phase reverse rotator 2103 shifts the received sample 2102 by $-\pi/M$, and the phase rotator 2107 shifts the correlation value 2106 by $\pi/M$. Thereby, even when the modulation method where the phase is rotated by $\pi/M$ (M is an integer) is used, the precision of the estimation of the carrier frequency error between the transmission and reception apparatuses can be improved, and the precision of the carrier frequency error correction can be improved.

Thirteenth Embodiment

Figure 71:
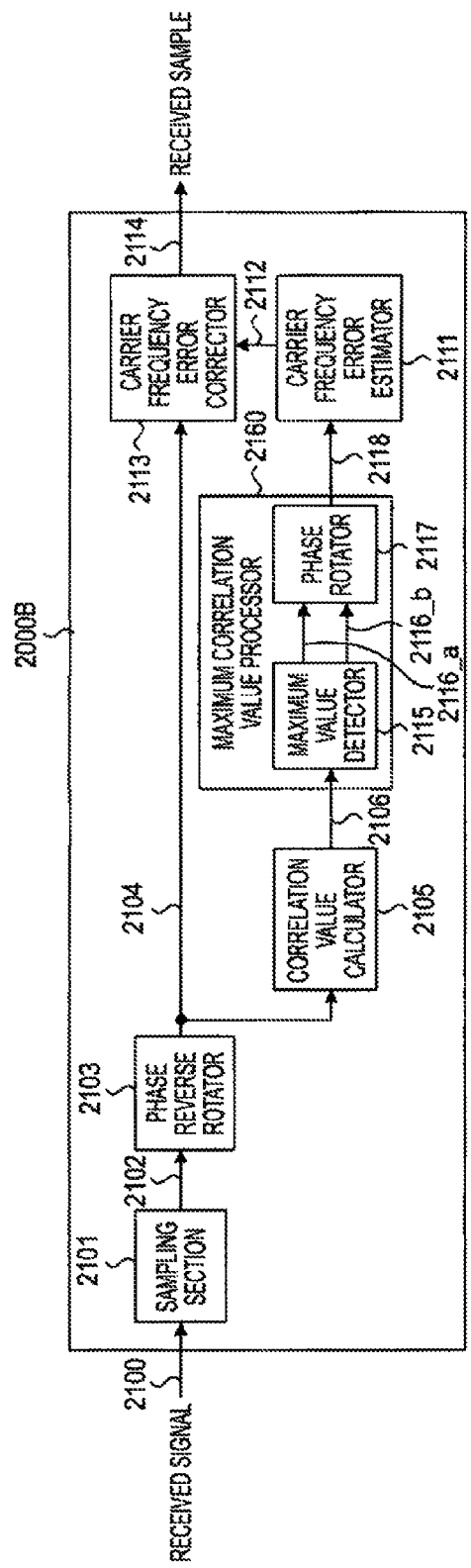
FIG. 71 A block diagram showing a structure example of a reception apparatus in a thirteenth embodiment.

FIG. 71 is a block diagram showing a structure example of a reception apparatus 2000B in a thirteenth embodiment.

The reception apparatus 2000B is provided with the sampling section 2101, the phase reverse rotator 2103, the correlation value calculator 2105, a maximum value detector 2115, a phase rotator 2117, the carrier frequency error estimator 2111 and the frequency corrector 2113.

A difference between FIG. 56 and FIG. 71 is that the positions of the phase rotator and the maximum value detector are reversed. In the reception apparatus 2000B of FIG. 71, elements the same as those of the reception apparatus 2000 of FIG. 56 are denoted by the same reference numerals and signs and descriptions thereof are omitted or simplified.

The maximum value detector 2115 and the phase rotator 2117 are included in a maximum correlation value processor 2160 as a modification of the maximum correlation value processor 2150.

Like the maximum value detector 2109 of the twelfth embodiment, when the length of the known signal stream is L, the maximum value detector 2115 detects a maximum correlation value 2116_a in the L sample period from among the successively derived correlation values 2106. The maximum value detector 2115 outputs the maximum correlation value 2116_a and the index 2116_b of the maximum correlation value.

The phase rotator 2117 rotates the phase of the maximum correlation value 2116_a by the rotation amount compliant with the modulation method, and outputs a phase-rotated maximum correlation value 2118.

Moreover, the phase rotator 2117 may control the phase rotation amount by which the phase of the maximum correlation value 2116_a is rotated, according to the change of the index 2116_b of the maximum correlation value.

Thereby, the phase rotation by the phase rotator 2117 can be sometimes omitted, so that the processing load on the phase rotator 2117 can be reduced.

Figure 72:
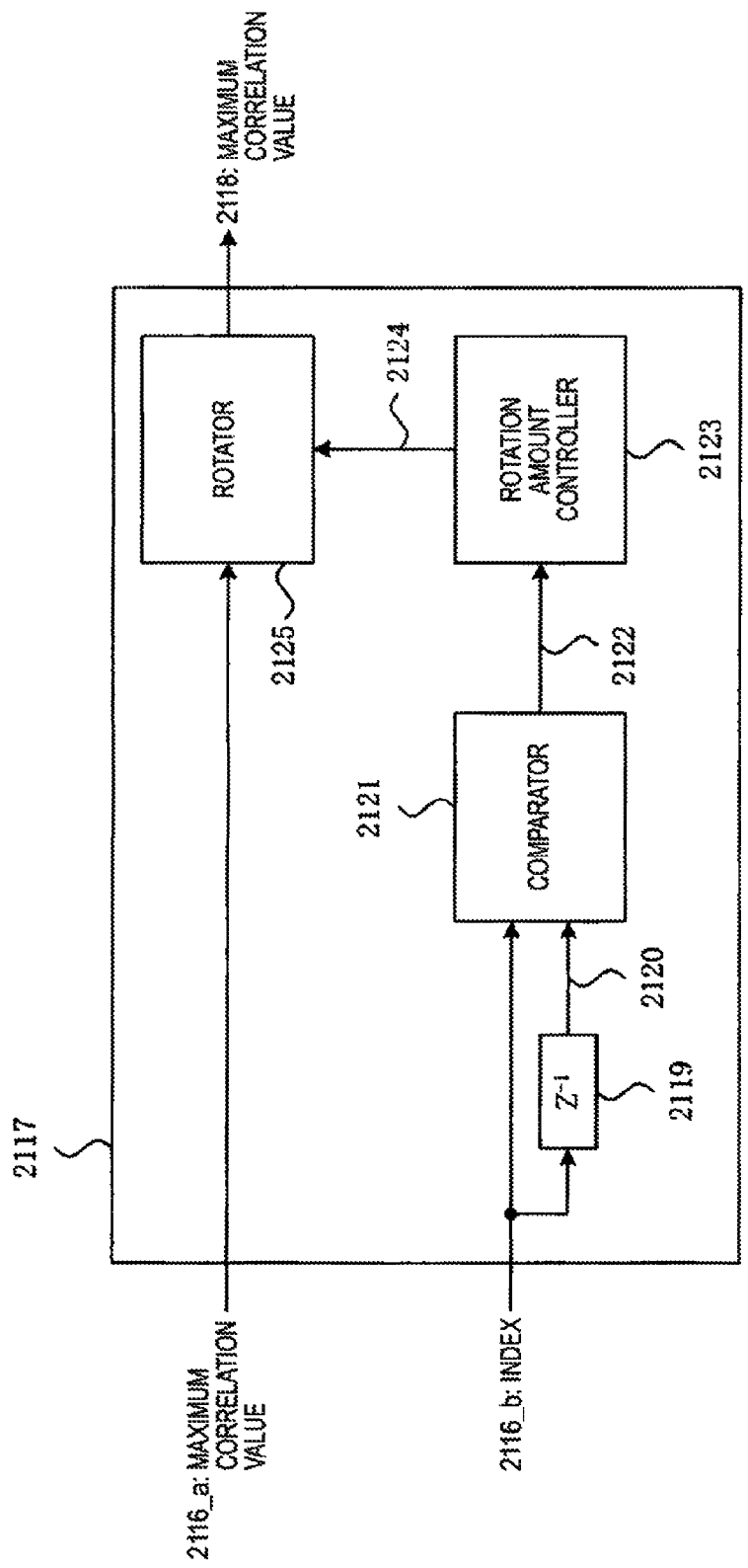
FIG. 72 A schematic view showing a structure example of a phase rotator in the thirteenth embodiment.

FIG. 72 is a block diagram showing a structure example of the phase rotator 2117. The phase rotator 2117 includes a delay section 2119, a comparator 2121, a rotation amount controller 2123 and a rotator 2125.

The delay section 2119 delays the index 2106_b of the maximum correlation value by one sample, and outputs the index 2120 of the maximum value time-delayed by one sample. The comparator 2121 compares the current index with the one sample preceding index, and outputs the comparison result 2122.

For example, when the current index and the one sample preceding index are the same, "0" is outputted as the comparison result 2122. When the current index is higher than the one sample preceding index, "+1" is outputted as the comparison result 2122. When the current index is lower than the one sample preceding index, "−1" is outputted as the comparison result 2122.

The rotation amount controller 2123 controls a phase rotation amount 2124 according to the comparison result 2122. For example, when the comparison result 2122 is "0", the phase rotation amount 2124 is held. That is, when the current index and the one sample preceding index are the same, the rotation amount controller 2123 does not change the current phase rotation amount.

Moreover, when the comparison result 2122 is "+1", the rotation amount controller 2123 adds $+\pi/2$ radians to the phase rotation amount 2124. That is, when the current index is higher than the one sample preceding index, the rotation amount controller 2123 increases the phase rotation amount.

Moreover, when the comparison result 2122 is "−1", the rotation amount controller 2123 adds $-\pi/2$ radians to the phase rotation amount 2124. That is, when the current index is lower than the one sample preceding index, the rotation amount controller 2123 reduces the phase rotation amount.

The rotator 2125 rotates the phase of the maximum correlation value 2116_a by the phase rotation amount 2124, and outputs the phase-rotated maximum correlation value 2118.

According to the reception apparatus 2000B, by rotating the maximum correlation value 2116_a by the rotation amount compliant with the modulation method after detecting the maximum correlation value 2116_a, the phase rotation of the maximum correlation value 2116_a due to the sampling frequency error can be corrected. For example, the phase of the maximum correlation value 2116_a is rotated by using the phase rotation amount 2124 controlled according to the change of the index 2116_b of the maximum correlation value detected by the maximum value detector 2115. Thereby, the phase rotation of the maximum correlation value 2116_a due to the shift of the phase reverse rotation timing (sampling frequency error) of the phase reverse rotator 2103 can be corrected. Therefore, even when a sampling frequency error is present between the transmission and reception apparatuses, the precision of the estimation of the carrier frequency error between the transmission and reception apparatuses can be improved, and the precision of the carrier frequency error correction can be improved.

The sampling section 2101 may perform N-times (N is an integer) oversampling of the received signal 2100 (that is, Fs_r≅N*Rsym). In this case, when "the comparison result 2122=+1", the rotation amount controller 2123 adds $+\pi/2N$ radians to the phase rotation amount 2124, and when "the comparison result 2122=−1", the rotation amount controller 2123 adds −π/2N radians to the phase rotation amount 2124.

When the modulation method where the phase is rotated by π/M (M is an integer) is used, when "the comparison result 2122=+1", the rotation amount controller 2123 adds +π/M radians to the phase rotation amount 2124, and when "the comparison result 2122=−1", the rotation amount controller 2123 adds −π/M radians to the phase rotation amount 2124.

While various embodiments have been described with reference to the drawings, it is to be noted that the present disclosure is not limited to such examples. It is obvious that one of ordinary skill in the art can arrive at various change examples or modification examples within the category described in the claims, and it is to be understood that those naturally belong to the technical scope of the present disclosure. Moreover, elements in the above-described embodiments may be arbitrarily combined without departing from the gist of the disclosure.

While in the above-described embodiments, the present disclosure is described by using as an example a case of implementation using hardware, the present disclosure may also be implemented by software in conjunction with hardware.

Moreover, the functional blocks used for the description of the embodiments are typically implemented as an LSI which is an integrated circuit. These may be individually formed as one chip, or may be formed as one chip so as to include some or all of the functional blocks. While LSI is mentioned here, it is sometimes called IC, system LSI, super LSI or ultra LSI according to the difference in integration degree.

Moreover, the method of circuit integration is not limited to LSI but a dedicated circuit or a general-purpose processor may be used for implementation. An FPGA (Field Programmable Gate Array) where programming can be performed after LSI manufacture or a reconfigurable processor where the connection and setting of the circuit cells in the LSI are reconfigurable may be used.

Further, if a circuit integration technique replacing the LSI comes out with the advancement of the semiconductor technology or by a different technology being derived, as a natural consequence, the functional blocks may be integrated by using the different technique. The application of biotechnology or the like has a potential.

The present disclosure may be expressed as a phase error estimation method or a phase error correction method executed in a reception apparatus or a wireless communication apparatus. Moreover, the present disclosure may be expressed as a phase error estimation apparatus or a phase error correction apparatus as an apparatus that has the function to execute a phase error estimation method or a phase error correction method, or a program that causes a computer to operate a phase error estimation method or apparatus or a phase error correction method or apparatus. That is, the present disclosure may be expressed in any of the apparatus, method and program categories.

(Summary of One Mode of the Present Disclosure)

(1) A reception apparatus having:

a phase error estimator that extracts a specific reference signal from a received signal which is a received transmitted signal having the specific reference signal, and obtains a received reference signal in a frequency domain in a receiver, compares, for each frequency, the received reference signal in the frequency domain and a transmitted reference signal which is the specific reference signal in the transmitted signal expressed in the frequency domain, and obtains a plurality of error vectors, and obtains, from the error vectors, a phase error inclination and a phase error offset in the frequency domain possessed by the received reference signal, and estimates a phase error according to the frequency by the phase error inclination and the phase error offset; and a phase error corrector that corrects the phase error for the received signal by using a phase error estimation value obtained by the phase error estimator.

(2) A phase error estimation method, having:

extracting a specific reference signal from a received signal which is a received transmitted signal having the specific reference signal, and obtaining a received reference signal in a frequency domain in a receiver;

comparing, for each frequency, the received reference signal in the frequency domain and a transmitted reference signal which is the specific reference signal in the transmitted signal expressed in the frequency domain, and obtaining a plurality of error vectors;

dividing the error vectors into not less than two groups, obtaining a representative value of each group and obtaining a plurality of representative vectors; and obtaining the phase error inclination and the phase error offset in the frequency domain possessed by the received reference signal based on the representative vectors, and estimating a phase error according to the frequency by the phase error inclination and the phase error offset.

(3) The above-described phase error estimation method, wherein in the estimation of the phase error, the representative vectors are converted from vectors into phases, and when the phases between the representative vectors are discontinuous, a predetermined phase value is added or subtracted when the phase error inclination and the phase error offset are obtained.

(4) The above-described phase error estimation method, wherein in the obtaining of the representative vectors, the groups are divided according to a magnitude of the frequency with respect to the error vectors, and are groups of a predetermined number of error vectors extracted in decreasing order of a magnitude of an amplitude.

(5) The above-described phase error estimation method, wherein in the obtaining of the representative vectors, as the representative value of each group, a mean value is obtained by vector mean of the error vectors.

(6) The above-described phase error estimation method, wherein in the obtaining of the representative vectors, the mean value is obtained by adding the error vectors.

(7) The above-described phase error estimation method, wherein in the obtaining of the representative vectors, by using a plurality of error vectors to which a predetermined weight is assigned according to a magnitude of an amplitude by the frequency with respect to the error vectors, the mean value is obtained by adding the error vectors.

(8) The above-described phase error estimation method, wherein in the estimation of the phase error, it is determined that the phases between the representative vectors are discontinuous when an absolute value of a phase difference between two target representative vectors of the representative vectors is not less than π.

(9) The above-described phase error estimation method, wherein in the estimation of the phase error, the representative vectors are converted from vectors into phases, and for phases of two target representative vectors of the representative vectors, wrapping subtraction of the phase of a low frequency from the phase of a high frequency is performed so that a calculation result falls within a range of ±π and division by a frequency difference between the two representative vectors is performed to thereby obtain the phase error inclination.

(10) The above-described phase error estimation method, wherein in the estimation of the phase error, the representative vectors are converted from vectors into phases, phases of two target representative vectors of the representative vectors are added and gain multiplication by ½ is performed, and when the phases between the representative vectors are discontinuous, wrapping addition of π to a result of the gain multiplication is performed so that a calculation result falls within a range of ±π to thereby obtain the phase error offset.

(11) The above-described phase error estimation method, wherein in the obtaining of the representative vectors, the groups are divided into not less than three groups and a representative value of each group is obtained, and in the estimation of the phase error, the representative vectors are converted from vectors into phases, unwrapping processing is performed on the phases after the conversion and linear approximation by an LSM is performed to thereby obtain the phase error inclination and offset.

(12) A reception method having: obtaining a phase error according to the frequency by the phase error estimation of the phase error estimation method described in any of the above; and performing correction of the phase error on the received signal.

(13) A reception method having: obtaining a phase error according to the frequency by the phase error estimation of the phase error estimation method described in any of the above;

obtaining a phase by a transmission characteristic possessed by a transmission path between a transmitter and a receiver by transmission path estimation; and performing phase correction of the phase error obtained by the phase error estimation and the phase of the transmission characteristic obtained by the transmission path estimation together.

(14) A phase error estimation apparatus having:

a signal extractor that extracts a specific reference signal from a received signal which is a received transmitted signal having the specific reference signal, and obtains a received reference signal in a frequency domain in a receiver;

an error vector calculator that compares, for each frequency, the received reference signal in the frequency domain and a transmitted reference signal which is the specific reference signal in the transmitted signal expressed in the frequency domain, and obtains a plurality of error vectors;

a representative vector calculator that divides the error vectors into not less than two groups, obtains a representative value of each group and obtains a plurality of representative vectors; and a correction value calculator that obtains the phase error inclination and the phase error offset in the frequency domain possessed by the received reference signal based on the representative vectors, and estimates a phase error according to the frequency by the phase error inclination and the phase error offset.

(15) A reception apparatus having:

the above-described phase error estimation apparatus; and a phase corrector that performs correction of the phase error on the received signal.

(16) A reception apparatus having:

the above-described phase error estimation apparatus;

a transmission path estimator that obtains a phase by a transmission characteristic possessed by a transmission path between a transmitter and a receiver by transmission path estimation; and a transmission path corrector that performs phase correction of the phase error obtained by the phase error estimation apparatus and the phase of the transmission characteristic obtained by the transmission path estimator together.

(17) A carrier frequency offset correction method having:
extracting a specific reference signal from a received signal which is a received transmitted signal having the specific reference signal, and obtaining a received reference signal in a frequency domain after rough carrier frequency offset correction and rough symbol synchronization shift correction in a receiver;

comparing, for each frequency, the received reference signal in the frequency domain and a transmitted reference signal which is the specific reference signal in the transmitted signal expressed in the frequency domain, and obtaining a plurality of error vectors;

estimating a phase error by linear approximation in the frequency domain from the error vectors, and obtaining the phase error inclination as a residual symbol synchronization shift and the phase error offset as a residual carrier frequency offset;

performing correction of the residual symbol synchronization shift in the frequency domain; and performing correction of the residual carrier frequency offset on the received signal converted from the frequency domain into the time domain.

(18) A carrier frequency offset correction method having:
extracting a specific reference signal from a received signal which is a received transmitted signal having the specific reference signal, and obtaining a received reference signal in a frequency domain after rough carrier frequency offset correction and rough symbol synchronization shift correction in a receiver;

comparing, for each frequency, the received reference signal in the frequency domain and a transmitted reference signal which is the specific reference signal in the transmitted signal expressed in the frequency domain, and obtaining a plurality of error vectors;

estimating a phase error by linear approximation in the frequency domain from the error vectors, and obtaining the phase error inclination as a residual symbol synchronization shift and the phase error offset as a residual carrier frequency offset; and performing correction of the residual symbol synchronization shift and correction of the residual carrier frequency offset on the received signal converted from the frequency domain into the time domain.

(19) The above-described carrier frequency offset correction method, wherein in the estimation of the phase error, the error vectors are converted from vectors into phases, unwrapping processing is performed on the phases after the conversion and linear approximation is performed.

(20) The above-described carrier frequency offset correction method, wherein in the correction of the residual carrier frequency offset in the time domain, the phase error offset is converted from a phase into a vector, a conjugate complex number of the vector after the conversion is set as a correction value and the correction value and the received signal in the time domain are complex-multiplied to thereby correct the residual carrier frequency offset.

(21) The above-described carrier frequency offset correction method, wherein in the correction of the residual carrier frequency offset in the time domain, a phase which is the phase error offset multiplied by −1 is set as a correction value and a CORDIC calculation of the correction value and the received signal in the time domain together is performed to thereby correct the residual carrier frequency offset.

(22) The above-described carrier frequency offset correction method, wherein in the correction of the residual symbol synchronization shift in the frequency domain, the phase error inclination and a coefficient corresponding to the frequency are multiplied to obtain a symbol synchronization shift amount of each frequency and for each frequency, the symbol synchronization shift amount is converted from a phase into a vector, a conjugate complex number of the vector after the conversion is set as a correction value and the correction value and the received signal in the frequency domain are complex-multiplied to thereby correct the residual symbol synchronization shift.

(23) The above-described carrier frequency offset correction method, wherein in the correction of the residual symbol synchronization shift in the frequency domain, the phase error inclination and a coefficient corresponding to the frequency are multiplied to obtain a symbol synchronization shift amount of each frequency and for each frequency, a phase which is the symbol synchronization shift amount multiplied by −1 is set as a correction value and a CORDIC calculation of the correction value and the received signal in the frequency domain together is performed to thereby correct the residual symbol synchronization shift.

(24) The above-described carrier frequency offset correction method, wherein in the correction of the residual symbol synchronization shift in the time domain, a filter performing synchronization correction is used, the phase error inclination is converted into a symbol synchronization shift amount, a filter coefficient corresponding to the symbol synchronization shift amount is selected and the received signal in the time domain is passed through the filter to thereby correct the residual symbol synchronization shift.

(25) The above-described carrier frequency offset correction method, wherein in the time domain, after the correction of the residual carrier frequency offset is performed, the correction of the residual symbol synchronization shift is performed.

(26) The above-described carrier frequency offset correction method, wherein in the time domain, after the correction of the residual symbol synchronization shift is performed, the correction of the residual carrier frequency offset is performed.

(27) A carrier frequency offset correction apparatus having:
a signal extractor that extracts a specific reference signal from a received signal which is a received transmitted signal having the specific reference signal, and obtains a received reference signal in a frequency domain after rough carrier frequency offset correction and rough symbol synchronization shift correction in a receiver;
an error vector calculator that compares, for each frequency, the received reference signal in the frequency domain and a transmitted reference signal which is the specific reference signal in the transmitted signal expressed in the frequency domain, and obtains a plurality of error vectors;
a residual phase error calculator that estimates a phase error by linear approximation in the frequency domain from the error vectors, and obtains the phase error inclination as a residual symbol synchronization shift and the phase error offset as a residual carrier frequency offset;
a residual symbol synchronization shift corrector that performs correction of the residual symbol synchronization shift in the frequency domain;
a frequency-time converter that converts the received signal in the frequency domain into a time domain; and
a residual carrier frequency offset corrector that performs correction of the residual carrier frequency offset on the received signal converted from the frequency domain into the time domain.

(28) A carrier frequency offset correction apparatus having:
a signal extractor that extracts a specific reference signal from a received signal which is a received transmitted signal having the specific reference signal, and obtains a received reference signal in a frequency domain after rough carrier frequency offset correction and rough symbol synchronization shift correction in a receiver;
an error vector calculator that compares, for each frequency, the received reference signal in the frequency domain and a transmitted reference signal which is the specific reference signal in the transmitted signal expressed in the frequency domain, and obtains a plurality of error vectors;
a residual phase error calculator that estimates a phase error by linear approximation in the frequency domain from the error vectors, and obtains the phase error inclination as a residual symbol synchronization shift and the phase error offset as a residual carrier frequency offset;
a frequency-time converter that converts the received signal in the frequency domain into a time domain;
a residual carrier frequency offset corrector that performs correction of the residual carrier frequency offset on the received signal converted from the frequency domain into the time domain; and
a time domain residual symbol synchronization shift corrector that performs correction of the residual symbol synchronization shift on the received signal converted from the frequency domain into the time domain.

(29) A reception apparatus that receives a signal modulated by a modulation method where a phase is rotated, from a transmission apparatus, the reception apparatus having:
a phase reverse rotator that reversely rotates a phase of a signal which is a received signal sampled at a predetermined sampling frequency, by a rotation amount according to the modulation method;
a correlator that successively calculates a correlation value between a signal whose phase is reversely rotated by the phase reverse rotator and a predetermined signal;
a maximum correlation value processor that successively outputs a maximum correlation value which is, of the correlation values successively calculated by the correlator, a maximum value in a period divided according to a length of the predetermined signal, and that is rotated by a rotation amount according to the modulation method;
a carrier frequency error estimator that estimates a carrier frequency error between the transmission apparatus and the reception apparatus according to an amount of phase rotation between a plurality of maximum correlation values successively outputted from the maximum correlation value processor; and
a carrier frequency error corrector that rotates the phase of the sampled signal according to the carrier frequency error estimated by the carrier frequency error estimator.

(30) The above-described receiver,
wherein the maximum correlation value processor is provided with:
a phase rotator that rotates a phase of the correlation value successively calculated by the correlator, by the rotation amount according to the modulation method; and
a maximum value detector that detects, of the correlation values whose phases are rotated by the phase rotator, the maximum value included in the period, as the maximum correlation value.

(31) The above-described reception apparatus,
wherein the maximum correlation value processor is provided with:
a maximum value detector that detects, of the correlation values successively calculated by the correlator, the maximum value included in the period according to the length of the predetermined signal, as the maximum correlation value; and
a phase rotator that rotates a phase of the maximum correlation value detected by the maximum value detector, by the rotation amount according to the modulation method.

(32) The above-described reception apparatus, wherein the phase rotator controls the phase rotation amount by which the phase of the maximum correlation value is rotated, according to a change of an index representative of a position of the maximum correlation value in the period.

(33) The above-described reception apparatus, wherein the modulation method includes π/2 shift BPSK (Binary Phase Shift Keying).

(34) The above-described reception apparatus,
wherein the phase reverse rotator reversely rotates the phase of an N-times oversampled received signal, by −π/2 radians, and
the phase rotator rotates the phase of the correlation value by π/2N radians.

(35) A reception method in a reception apparatus that receives a signal modulated by a predetermined modulation method, from a transmission apparatus, the reception method having:
a step of reversely rotating a phase of a signal which is a received signal sampled at a predetermined sampling frequency, by a rotation amount according to the modulation method;
a step of successively calculating a correlation value between a signal whose phase is reversely rotated and a predetermined signal;
a step of successively outputting a maximum correlation value that is included in the period according to the length of the predetermined signal, is a maximum value of the successively calculated correlation values, and is rotated by a rotation amount according to the modulation method;
a step of estimating a carrier frequency error between the transmission apparatus and the reception apparatus according to an amount of phase rotation between the successively outputted maximum correlation values; and
a step of rotating the phase of the sampled signal according to the estimated carrier frequency error.

The present application is based upon Japanese Patent Application (No. 2013-037684) filed on Feb. 27, 2013, Japanese Patent Application (No. 2013-041054) filed on Mar. 1, 2013 and Japanese Patent Application (No. 2013-049364) filed on Mar. 12, 2013, the contents of which are incorporated herein by reference.

INDUSTRIAL APPLICABILITY

The present disclosure has an advantage in that a highly precise phase correction value can be obtained even if the phase error or the noise level is high. Moreover, the present disclosure has an advantage in that the carrier frequency offset can be appropriately corrected and the received data can be correctly demodulated. The present disclosure is useful, for example, as a wireless apparatus performing high-speed transmission, a phase error estimation method and a phase error correction method applied to a wireless apparatus.

DESCRIPTION OF REFERENCE NUMERALS AND SIGNS

1 RF processor
2 ADC section
4 Synchronization detector
5 Frequency corrector
6 S/P converter
7 DFT section
8, 8A Transmission path corrector
80 Transmission path estimator
81-00 to 81-63 Multiplier
82-00 to 82-63 Rotator
83-00 to 83-63 Wrapping adder
84-00 to 84-63 Flip-flop circuit
85-00 to 85-63 Wrapping adder
9 Phase error corrector
90 Signal extractor
91 Error vector calculator
910-00 to 910-07 Complex multiplier
92 Representative vector calculator
920-L, 920-H Complex adder
93 Correction value calculator
930-L, 930-H, 930-M Vector-phase converter
931, 931-LM, 931-MH Phase inclination calculator
9310 Wrapping subtractor
9311 Gain multiplicator
932, 932-LM, 932-MH Phase offset calculator
9320 Adder
9321 Gain multiplier
9322 Wrapping adder
9323 Selector
9324 Determiner
93240 Adder
93241a, 93241b Inequality sign determiner
93242 OR circuit
933 Frequency-by-frequency correction value calculator
9330-00 to 9330-63 Multipliers
9331-00 to 9331-63 Adders
934 Phase inclination averaging section
9340 Adder
9341 Gain multiplicator
935 Phase offset averaging section
9350 Adder
9351 Gain multiplicator
9352 Wrapping adder
9353 Selector
9354 Determiner
938 Phase unwrapping section
939 LSM approximator
94 Phase corrector
940-00 to 940-63 Phase-vector converter
941-00 to 941-63 Conjugate converter
942-00 to 942-63 Complex multiplier
95 Phase error estimator
10 IDFT section
11 P/S converter
13 Demodulator 15 Selector
1001 RF processor
1002 ADC section
1003 AGC section
1004 Synchronization detector
1005 Frequency corrector
1006 S/P converter
1007 DFT section
1008 Transmission path corrector
1009 Phase error corrector
1090 Signal extractor
1091 Error vector calculator
1910-00 to 1910-07 Complex multiplier
1092 Phase error calculator
1920-00 to 1920-07 Vector-phase converter
1021-00 to 1921-07 Unwrapping section
1093 Residual phase error calculator
1094 Residual symbol synchronization shift calculator
1940-00 to 1940-63 Multiplier
1095 Residual symbol synchronization shift corrector
1950-00 to 1950-63 Phase-vector converter
1951-00 to 1951-63 Conjugate converter
1952-00 to 1952-63 Complex multiplier
1953-00 to 1953-63 Gain multiplicator
1954-00 to 1954-63 CORDIC section
1010 IDFT section
1011 P/S converter
1012, 1012A Residual carrier frequency offset corrector
1120 Phase-vector converter
1121 Conjugate converter
1122 Complex multiplier
1123 Gain multiplicator
1124 CORDIC section
1013 Demodulator
1015 Phase error estimator
1016 Time domain residual symbol synchronization shift corrector
1160 IQ separator
1161 Correction coefficient selector
1162-I-00 to 1162-I-09, 1162-Q-00 to 1162-Q-09 FF section
1163-1-00 to 1163-I-10, 1163-Q-00 to 1163-Q-10 Multiplier
1164-I, 1164-Q Adder
1165 IQ unification section
2000, 2000B Reception apparatus
2100 Received signal
2101 Sampling section
2102 Received sample
2103 Phase reverse rotator
2104 Phase-reversely-rotated received sample
2105 Correlation value calculator
2106 Correlation value
2106_i I component of correlation value 2016
2016_q Q component of correlation value 2016
2016_a Correlation value
2016_b Correlation value
2016_c Correlation value
2107 Phase rotator
2107_1a Cosine wave generator
2107_1b Sinusoidal wave generator
2107_3a Multiplier
2107_3b Multiplier
2107_3c Multiplier
2107_3d Multiplier
2107_5a Multiplier
2107_5b Multiplier
2107_7 Counter
2107_9 Selector
2107_10 Phase information
2107_11 CORDIC calculation circuit
2108 Phase-rotated correlation value
2108_i I component of correlation value 2108
2108_q Q component of correlation value 2108
2108_a Phase of correlation value 2108
2108_b Phase of correlation value 2108
2108_c Phase of correlation value 2108
2109 Maximum value detector
2110 Maximum correlation value
2111 Carrier frequency error estimator
2112 Carrier frequency error estimation value
2113 Frequency corrector
2113_1 Adder
2113_3 One sample delay device
2113_5 Sign inversion circuit
2113_6 Carrier frequency error correction value
2113_7 Correction vector generator
2113_8 Correction vector
2113_9 Complex multiplier
2113_11 CORDIC calculation circuit
2114 Received sample having undergone carrier frequency error correction
2115 Maximum value detector
2116_a Maximum correlation value
2116_b Index of maximum correlation value
2117 Phase rotator
2118 Phase-rotated maximum correlation value
2119 Delay section
2120 Index of maximum value time-delayed by one sample
2121 Comparator
2122 Comparison result
2123 Rotation amount controller
2124 Phase rotation amount
2125 Rotator
2150 Maximum correlation value processor

The invention claimed is:

1. A reception apparatus comprising:
phase error estimation circuitry which, in operation, estimates a phase error estimation value in a frequency domain based on a received signal; and
phase error correction circuitry which, in operation, uses the phase error estimation value to correct a phase error of the received signal,
wherein the phase error estimation circuitry includes:
signal extraction circuitry which, in operation, extracts a specific reference signal from the received signal to obtain a reception reference signal in the frequency domain;
error vector calculation circuitry which, in operation, obtains a plurality of error vectors by comparing the reception reference signal in the frequency domain and a transmission reference signal in the frequency domain, wherein the transmission reference signal corresponds to the specific reference signal extracted from the received signal;
correction value calculation circuitry which, in operation, obtains an amount of phase error change and a phase error offset in the frequency domain that are included in the reception reference signal based on the plurality of error vectors, and obtains the phase error estimation value in the frequency domain based on the amount of phase error change and the phase error offset; and representative vector calculation circuitry which, in operation, divides the plurality of error vectors into at least two groups, and obtains at least two representative vectors for the at least two groups, respectively, wherein the correction value calculation circuitry, in operation, obtains the amount of phase error change and the phase error offset based on the at least two representative vectors.

2. The reception apparatus according to claim 1, wherein the signal extraction circuitry, in operation, extracts the specific reference signal after rough carrier frequency offset correction and rough symbol synchronization shift correction;

wherein the correction value calculation circuitry, in operation, obtains the phase error estimation value with linear approximation by obtaining the amount of phase error change as a residual symbol synchronization shift and the phase error offset as a residual carrier frequency offset; and wherein the phase error correction circuitry, in operation, performs correction of the residual symbol synchronization shift in the frequency domain, converts the received signal in the frequency domain into a time domain, and performs correction of the residual carrier frequency offset on the received signal converted into the time domain.

3. The reception apparatus according to claim 1, wherein the signal extraction circuitry, in operation, extracts the specific reference signal after rough carrier frequency offset correction and rough symbol synchronization shift correction;

wherein the correction value calculation circuitry, in operation, obtains the phase error estimation value with linear approximation by obtaining the amount of phase error change as a residual symbol synchronization shift and the phase error offset as a residual carrier frequency offset; and wherein the phase error correction circuitry, in operation, converts the received signal in the frequency domain into a time domain, performs correction of the residual carrier frequency offset on the received signal converted into the time domain, and performs correction of the residual symbol synchronization shift on the received signal converted into the time domain.

4. A phase error estimation method, comprising:

extracting, by signal extraction circuitry, a specific reference signal from a received signal to obtain a reception reference signal in a frequency domain;

obtaining, by error vector calculation circuitry, a plurality of error vectors by comparing the reception reference signal in the frequency domain and a transmission reference signal in the frequency domain, wherein the transmission reference signal corresponds to the specific reference signal extracted from the received signal;

dividing, by representative vector calculation circuitry, the plurality of error vectors into at least two groups to obtain at least two representative vectors for the at least two groups, respectively;

obtaining, by correction value calculation circuitry, an amount of phase error change and a phase error offset in the frequency domain that are included in the reception reference signal based on the at least two representative vectors, and estimating a phase error estimation value in the frequency domain based on the amount of phase error change and the phase error offset.

5. The phase error estimation method according to claim 4, wherein in the obtaining of the amount of phase error change and the phase error offset, the at least two representative vectors are converted from vectors into phases, and when the phases of the at least two representative vectors are discontinuous, a determined phase value is added or subtracted to the phases.

6. The phase error estimation method according to claim 5, wherein in the obtaining of the amount of phase error change and the phase error offset, it is determined that the phases of the at least two representative vectors are discontinuous when an absolute value of a phase difference between two of the representative vectors is at least $\pi$.

7. The phase error estimation method according to claim 4, wherein in the obtaining of the at least two representative vectors, the plurality of error vectors respectively associated with frequencies are divided into the at least two groups according to levels of the frequencies in decreasing order to form a first group that includes a determined number of the error vectors starting from the error vector having the highest level of frequency.

8. The phase error estimation method according to claim 4, wherein in the obtaining of the at least two representative vectors, at least two vector means are obtained from the error vectors included in the at least two groups, respectively.

9. The phase error estimation method according to claim 8, wherein in the obtaining of the at least two representative vectors, the at least two vector means are obtained by adding the error vectors included in the at least two groups, respectively.

10. The phase error estimation method according to claim 8, wherein in the obtaining of the at least two representative vectors, weights corresponding to levels of frequencies associated with the plurality of error vectors are added to the plurality of error vectors, respectively, and the at least two vector means are obtained by adding the weight-added error vectors included in the at least two groups, respectively.

11. The phase error estimation method according to claim 4, wherein in the obtaining of the amount of phase error change and the phase error offset, the at least two representative vectors are converted from vectors into phases, and for the phases of two of the representative vectors, wrapping subtraction of the phase of a low frequency from the phase of a high frequency is performed so that a calculation result falls within a range of $\pm\pi$, and the calculation result is divided by a frequency difference between the two of the representative vectors.

12. The phase error estimation method according to claim 4, wherein in the obtaining of the amount of phase error change and the phase error offset, the at least two representative vectors are converted from vectors into phases, the phases of two of the representative vectors are added and gain multiplication by ½ is performed, and when the phases of the at least two representative vectors are discontinuous, wrapping addition of $\pi$ to a result of the gain multiplication is performed so that a calculation result falls within a range of $\pm\pi$.

13. The phase error estimation method according to claim 4, wherein in the obtaining of the at least two representative vectors, the plurality of error vectors are divided into at least three groups and at least three representative vectors are obtained for the at least three groups, respectively; and wherein in the obtaining of the amount of phase error change and the phase error offset, the at least three representative vectors are converted from vectors into phases, unwrapping processing is performed on the phases, and linear approximation by a Least Squares Method (LSM) is performed.

14. A phase error correction method comprising:
performing rough carrier frequency offset correction and rough symbol synchronization shift correction on a received signal;
extracting a specific reference signal from the received signal after performing rough carrier frequency offset correction and rough symbol synchronization shift correction to obtain a reception reference signal in a frequency domain;
obtaining a plurality of error vectors by comparing the reception reference signal in the frequency domain and a transmission reference signal in the frequency domain, wherein the transmission reference signal corresponds to the specific reference signal extracted from the received signal;
estimating a phase error estimation value with linear approximation by obtaining an amount of phase error change as a residual symbol synchronization shift and a phase error offset as a residual carrier frequency offset;
performing correction of the residual symbol synchronization shift in the frequency domain; and
performing correction of the residual carrier frequency offset on the received signal converted from the frequency domain into a time domain.

15. The phase error correction method according to claim 14, wherein in the estimating of the phase error estimation value, the plurality of error vectors are converted from vectors into phases, unwrapping processing is performed on the phases, and linear approximation is performed.

16. The phase error correction method according to claim 14, wherein in the performing correction of the residual carrier frequency offset in the time domain, the phase error offset is converted from a phase into a vector, a conjugate complex number of the vector after the conversion is set as a correction value, and the correction value and the received signal in the time domain are complex-multiplied.

17. The phase error correction method according to claim 14, wherein in the performing correction of the residual carrier frequency offset in the time domain, a phase which is the phase error offset multiplied by −1 is set as a correction value, and a Coordinate Rotational Digital Computer (CORDIC) calculation of the correction value and the received signal in the time domain is performed.

18. The phase error correction method according to claim 14, wherein in the performing correction of the residual symbol synchronization shift in the frequency domain, the amount of phase error change and a coefficient in the frequency domain are multiplied to obtain an amount of the residual symbol synchronization shift, the amount of the residual symbol synchronization shift is converted from a phase into a vector, a conjugate complex number of the vector after the conversion is set as a correction value, and the correction value and the received signal in the frequency domain are complex-multiplied.

19. The phase error correction method according to claim 14, wherein in the performing correction of the residual symbol synchronization shift in the frequency domain, the amount of phase error change and a coefficient corresponding to a frequency of each error vector are multiplied to obtain an amount of the residual symbol synchronization shift, a phase which is the amount of the symbol synchronization shift multiplied by −1 is set as a correction value, and a Coordinate Rotational Digital Computer (CORDIC) calculation of the correction value and the received signal in the frequency domain is performed.

20. A phase error correction method comprising:
performing rough carrier frequency offset correction and rough symbol synchronization shift correction on a received signal;
extracting a specific reference signal from the received signal after performing rough carrier frequency offset correction and rough symbol synchronization shift correction to obtain a reception reference signal in a frequency domain;
obtaining a plurality of error vectors by comparing the reception reference signal in the frequency domain and a transmission reference signal in the frequency domain, wherein the transmission reference signal corresponds to the specific reference signal extracted from the received signal;
estimating a phase error estimation value with linear approximation by obtaining an amount of phase error change as a residual symbol synchronization shift and a phase error offset as a residual carrier frequency offset; and
performing correction of the residual symbol synchronization shift on the received signal converted from the frequency domain into a time domain and correction of the residual carrier frequency offset on the received signal converted from the frequency domain into the time domain.

21. The phase error correction method according to claim 20, wherein in the performing correction of the residual symbol synchronization shift in the frequency domain, the amount of phase error change is converted into an amount of the residual symbol synchronization shift by using a synchronization correction filter, and the received signal in the time domain is passed through the filter using a filter coefficient corresponding to the amount of the symbol synchronization shift.

22. The phase error correction method according to claim 20, wherein in the time domain, after the correction of the residual carrier frequency offset is performed, the correction of the residual symbol synchronization shift is performed.

23. The phase error correction method according to claim 20, wherein in the time domain, after the correction of the residual symbol synchronization shift is performed, the correction of the residual carrier frequency offset is performed.

* * * * *